US011598552B2

(12) United States Patent
Amirian et al.

(10) Patent No.: US 11,598,552 B2
(45) Date of Patent: Mar. 7, 2023

(54) STANDOFF REGULATOR

(71) Applicant: WINDGATE PRODUCTS COMPANY, INC., San Fernando, CA (US)

(72) Inventors: Hayghaz Amirian, San Fernando, CA (US); Saro Amirian, San Fernando, CA (US); Sevak Amirian, San Fernando, CA (US)

( * ) Notice: Subject to any disclaimer, the term of this patent is extended or adjusted under 35 U.S.C. 154(b) by 0 days.

(21) Appl. No.: 17/150,674

(22) Filed: Jan. 15, 2021

(65) Prior Publication Data

US 2021/0148601 A1 May 20, 2021

Related U.S. Application Data

(63) Continuation of application No. 15/693,465, filed on Aug. 31, 2017, now Pat. No. 10,928,095.

(60) Provisional application No. 62/383,357, filed on Sep. 2, 2016.

(51) Int. Cl.
| F16K 1/22 | (2006.01) |
| F24F 13/10 | (2006.01) |
| F16K 31/60 | (2006.01) |
| F16K 35/04 | (2006.01) |
| F16K 37/00 | (2006.01) |
| F24F 13/14 | (2006.01) |

(52) U.S. Cl.
CPC .............. *F24F 13/10* (2013.01); *F16K 1/221* (2013.01); *F16K 31/602* (2013.01); *F16K 35/04* (2013.01); *F16K 37/0008* (2013.01); *F24F 2013/146* (2013.01)

(58) Field of Classification Search
CPC ...... F24F 13/10; F24F 2013/146; F16K 1/221; F16K 31/602; F16K 35/04; F16K 37/0008
USPC ............. 251/305–308, 297, 99, 96; 137/553, 137/556–556.6
See application file for complete search history.

(56) References Cited

U.S. PATENT DOCUMENTS

| 926,174 | A | ‡ | 6/1909 | Clark | ............. F16K 1/2261 126/292 |
| 1,230,882 | A | ‡ | 6/1917 | Filbey | ............. F23L 13/02 126/292 |
| 2,345,997 | A | ‡ | 4/1944 | Anderson | ............. B63J 2/02 74/531 |
| 2,505,145 | A | ‡ | 4/1950 | Ryan | ............. F16K 21/06 251/64 |
| 2,936,778 | A | ‡ | 5/1960 | Stillwagon | ............. F16K 1/22 137/454.6 |

(Continued)

OTHER PUBLICATIONS

All Steel Stand-Off Publication From Windgate Products, Inc. www.WindGateProducts.com, https://windgate.com/portfolio-item/all-steel-stand-off/ ; Visite Date: Approximately in Feb. or Mar. 2019 for This Phone on a Photo; This product has been sold for over 15 years (since 2004).‡

(Continued)

*Primary Examiner* — John Bastianelli
(74) *Attorney, Agent, or Firm* — Patent Law Agency, LLC; Peter Ganjian

(57) ABSTRACT

A standoff comprising a handle that is adjustably associated with a bracket, with the handle self-latching in relation to bracket at a desired position and at a desired quantifiable torque in relation to the bracket.

12 Claims, 47 Drawing Sheets

(56) References Cited

U.S. PATENT DOCUMENTS

| | | | | |
|---|---|---|---|---|
| 3,858,843 | A ‡ | 1/1975 | Hartmann | F16K 35/00 |
| | | | | 251/99 |
| 3,921,955 | A ‡ | 11/1975 | Haddad, Jr. | F16K 1/221 |
| | | | | 251/297 |
| 4,840,083 | A ‡ | 6/1989 | Hagan | F16C 11/103 |
| | | | | 188/378 |
| 6,783,113 | B2 ‡ | 8/2004 | Schommer | F16K 31/602 |
| | | | | 137/556 |
| 7,472,699 | B2 ‡ | 1/2009 | Martin | F16K 31/602 |
| | | | | 126/285 R |
| 7,690,626 | B2 ‡ | 4/2010 | Stunkard | F16K 5/0642 |
| | | | | 251/174 |
| 8,146,887 | B1 ‡ | 4/2012 | Amirian | F16K 1/222 |
| | | | | 251/30 |
| 9,474,919 | B2 ‡ | 10/2016 | Petrossian | F24F 13/14 |
| 9,835,354 | B2 ‡ | 12/2017 | Yoskowitz | F24F 13/14 |
| 2008/0113613 | A1 ‡ | 5/2008 | Petrossian | A62C 2/12 |
| | | | | 454/369 |
| 2015/0147955 | A1 ‡ | 5/2015 | Yoskowitz | F24F 13/14 |
| | | | | 454/333 |

OTHER PUBLICATIONS

Elgen Super Standoff; Elgen Manufacturing; 2013.‡

‡ imported from a related application

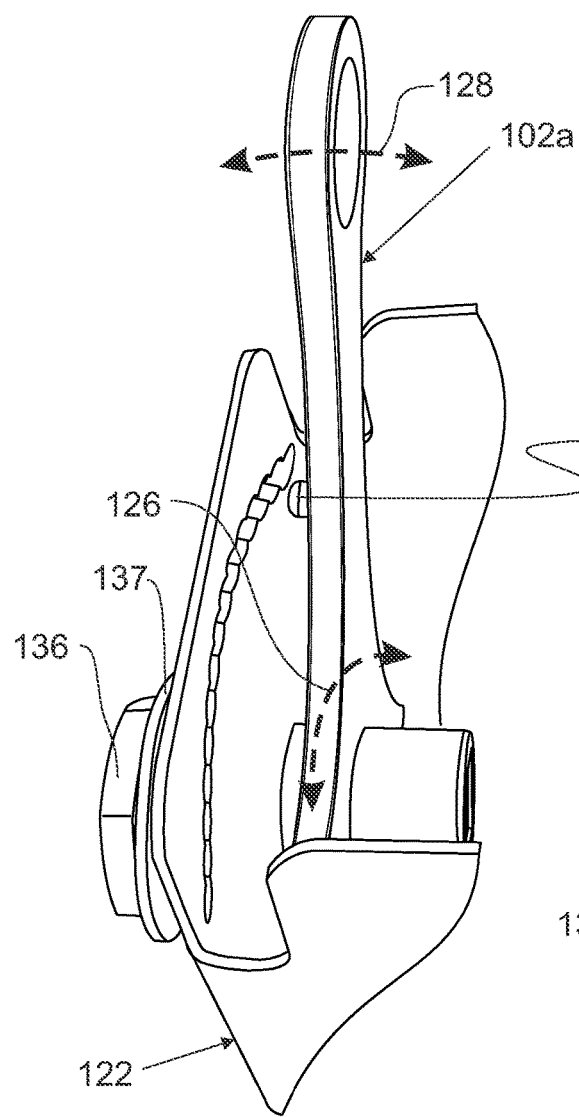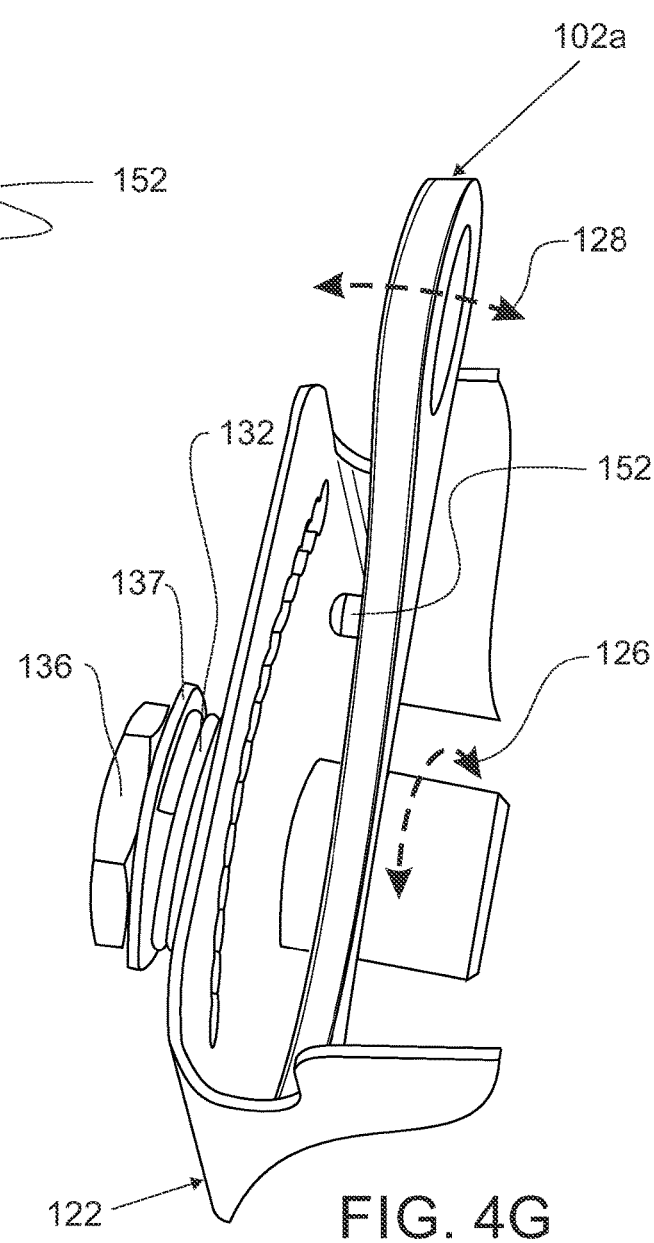
FIG. 4F
FIG. 4G

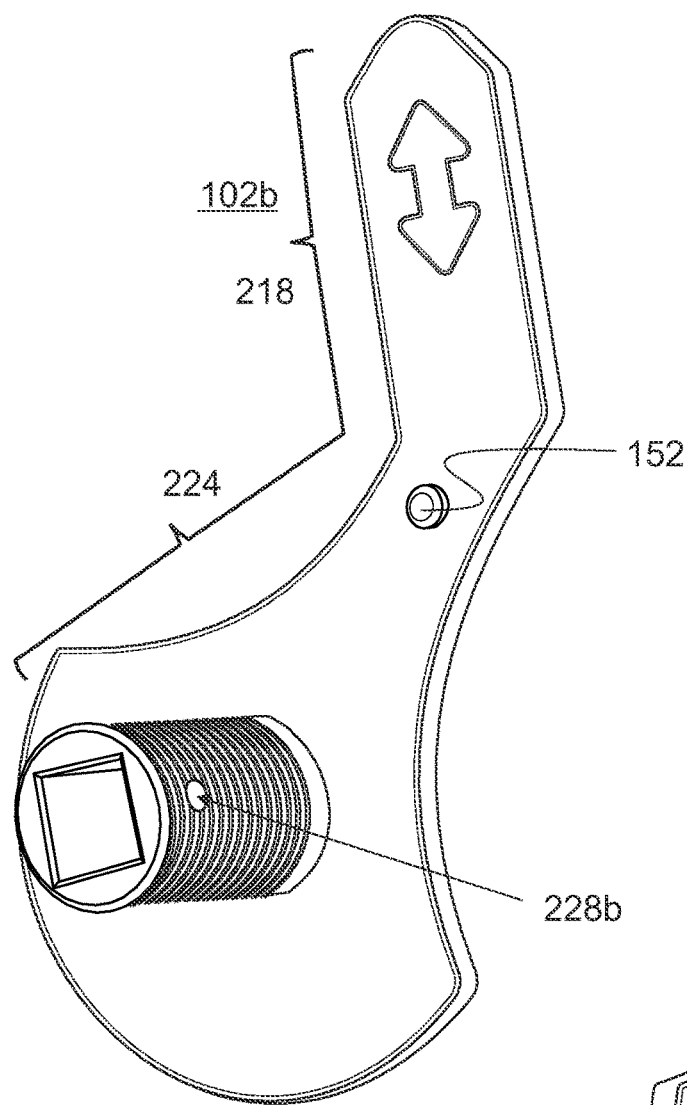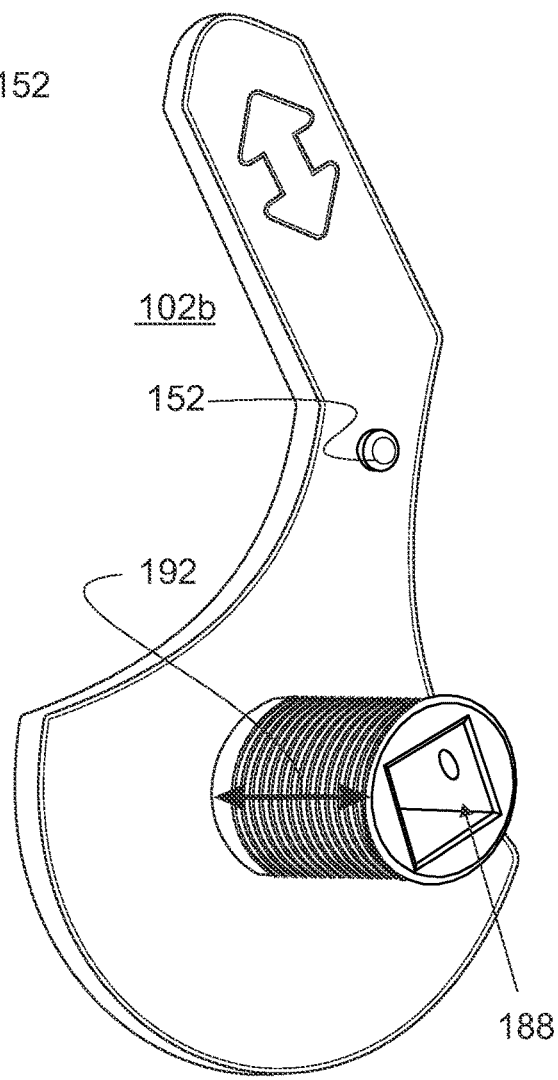
FIG. 8A
FIG. 8B

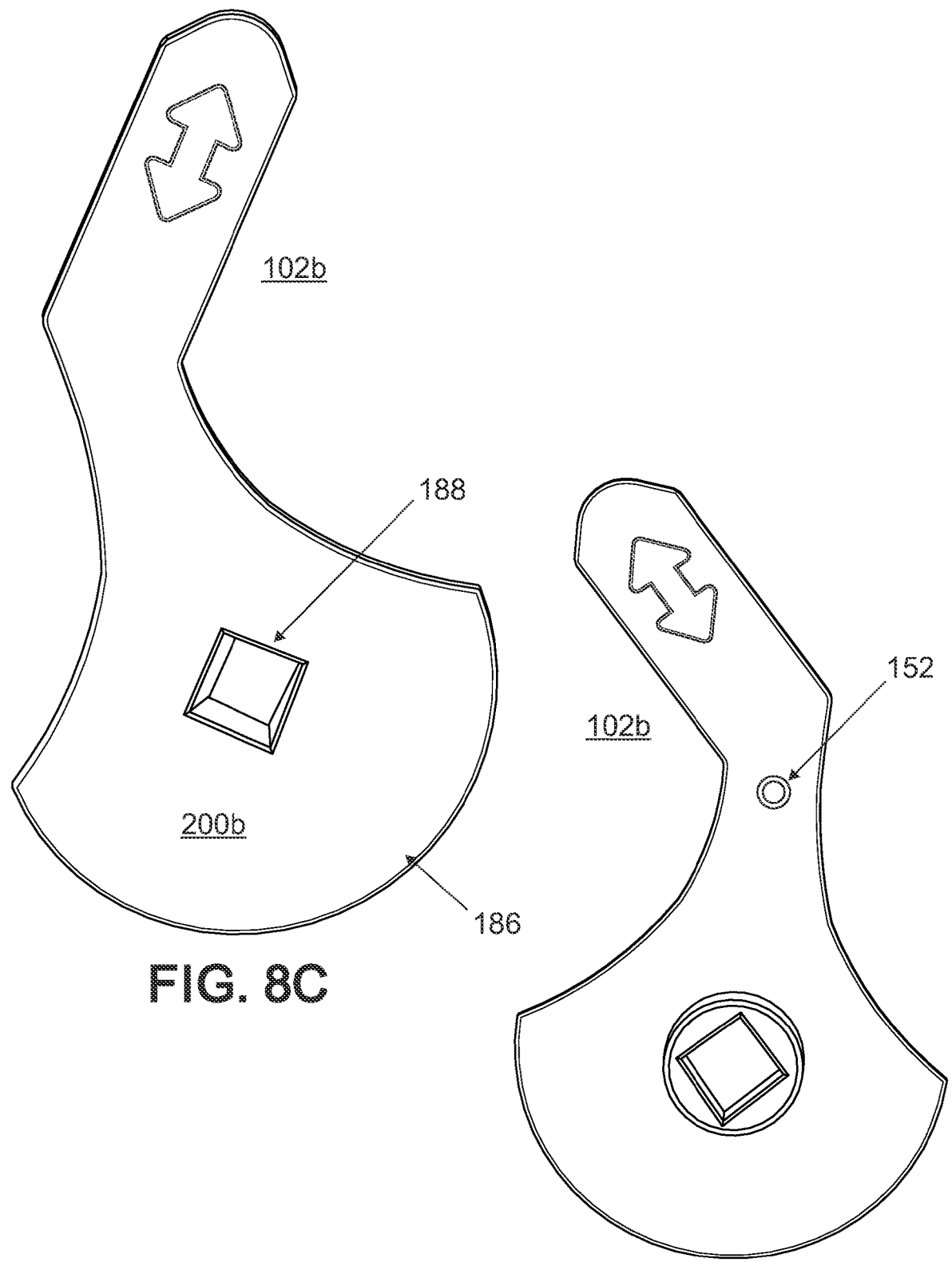

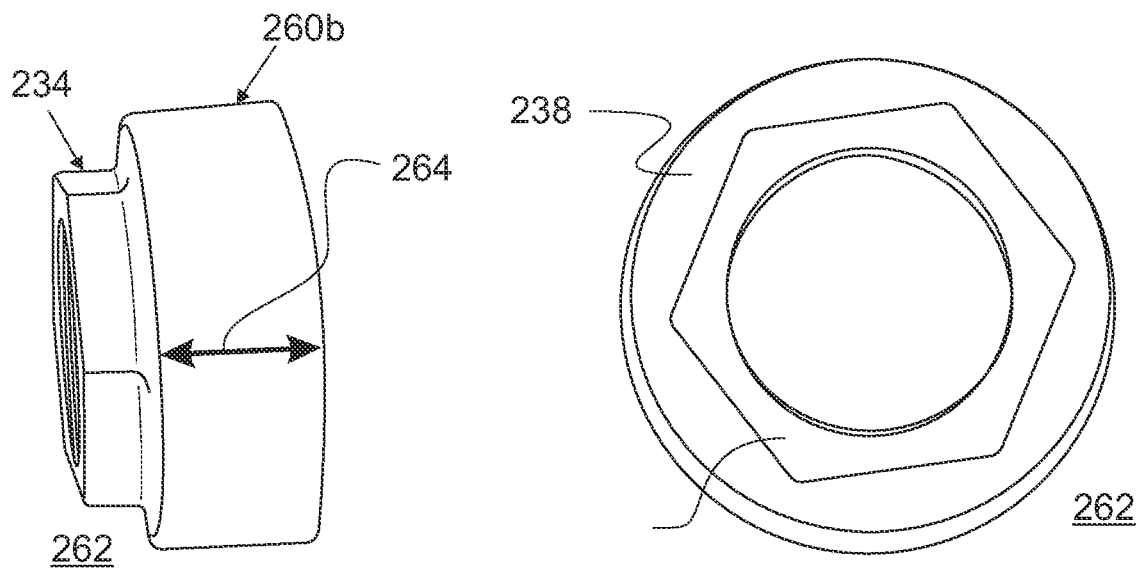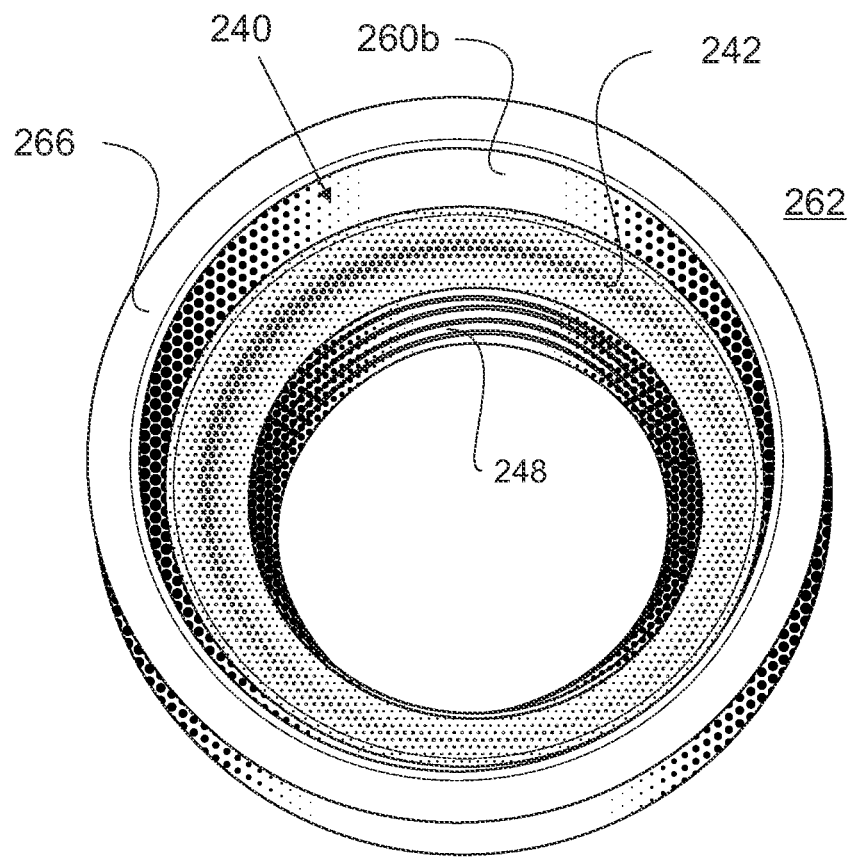

STANDOFF REGULATOR

CROSS-REFERENCE TO RELATED APPLICATIONS

This Application is a CONTINUATION Non-Provisional Utility Application that claims the benefit of priority of the co-pending U.S. Non-provisional Utility application Ser. No. 15/693,465 with filing date 31 Aug. 2017, which claims the benefit of priority of U.S. Provisional Utility Patent Application No. 62/383,357 with a filing date 2 Sep. 2016, the entire disclosures of all of which applications are expressly incorporated by reference in their entirety herein.

All documents mentioned in this specification are herein incorporated by reference to the same extent as if each individual document was specifically and individually indicated to be incorporated by reference.

It should be noted that throughout the disclosure, where a definition or use of a term in any incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

One or more embodiments of the present invention relate to a regulator for selectively directing and or balancing airflows (amount of air in ft³/min or Cubic Feet per Minute (CFM)) between zones.

Description of Related Art

Conventional standoff regulators for selectively directing flow of air (direction and rate of volume of air in CFM) between zones are well known and have been in use for a number of years.

A drawback with conventional standoff regulators is that vibrations from the damper (due to flow of air vibrating the damper) may eventually loosen handle connection. That is, as air flows through the sleeve and over damper blade assembly, that flow of air may vibrate the damper and as the damper vibrates, the generated torque from the vibration of the damper may eventually loosen the handle connection. Unfortunately, once loose, the handle would immediately move from its desired position, which, in turn, would move and re-orient the damper blade at an undesired position.

Accordingly, in light of the current state of the art and the drawbacks to current standoff regulators mentioned above, a need exists for a standoff that would provide sufficiently granulated position-settings so that a handle may be adjusted to a correct desired position setting. Further, a need exists for a standoff that would allow a handle to be self-latched and fixed at a desired position setting as well as at a desired quantifiable torque. Further, a need exists for a standoff that would dampen most vibratory forces emanating from the damper blade, which would thereby prevent loosening of the engagement of handle with the bracket of the standoff.

BRIEF SUMMARY OF THE INVENTION

A non-limiting, exemplary aspect of an embodiment of the present invention provides a standoff, comprising:

a bracket;
a handle that is adjustably associated with the bracket, with the handle self-latching in relation to the bracket at a desired position;
an adjustable coupler assembly that allows the handle to self-latch at the desired position, but at a desired quantifiable torque in relation to the bracket.

Another non-limiting, exemplary aspect of an embodiment of the present invention provides a standoff, comprising:

a bracket;
a handle that is adjustably associated with the bracket, with the handle self-latching in relation to the bracket at a desired position;
an adjustable coupler assembly that allows the handle to self-latch at the desired position, but adjustably fixed at that position at a desired quantifiable torque in relation to the bracket.

Still another non-limiting, exemplary aspect of an embodiment of the present invention provides a standoff, comprising:

a bracket;
a handle that is adjustably associated with the bracket by an engagement portion, with the handle self-latching in relation to the bracket at a desired position;
the handle includes a first portion that is oriented at an angle in relation to a second portion, which mimics an orientation position of a damper; and
an adjustable coupler assembly that allows the handle to self-latch at the desired position, but adjustably fixed at that position at a desired quantifiable torque in relation to the bracket.

These and other features and aspects of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 2 to 3H are non-limiting, exemplary illustrations of various views the standoff regulator illustrated in FIGS. 1A-1 to 1C-3 in accordance with one or more embodiments of the present invention;

FIGS. 4A to 4G are non-limiting, exemplary illustrations, progressively illustrating a non-limiting, exemplary method of moving and repositioning handle of standoff regulator illustrated in FIGS. 1A-1 to 3H in accordance with one or more embodiments of the present invention;

FIGS. 6A-1 to 9G are non-limiting, exemplary illustrations of standoff with a different handle and a coupler in accordance with one or more embodiments of the present invention;

FIGS. 8A to 8D are non-limiting, exemplary views of a handle in accordance with one or, more embodiments of the present invention;

FIGS. 9A to 9G are non-limiting, exemplary illustrations of a coupler illustrated in FIGS. 6A-1 to 8D in accordance with one or more embodiments of the present invention.

DETAILED DESCRIPTION OF THE INVENTION

Figures 1, 1A:
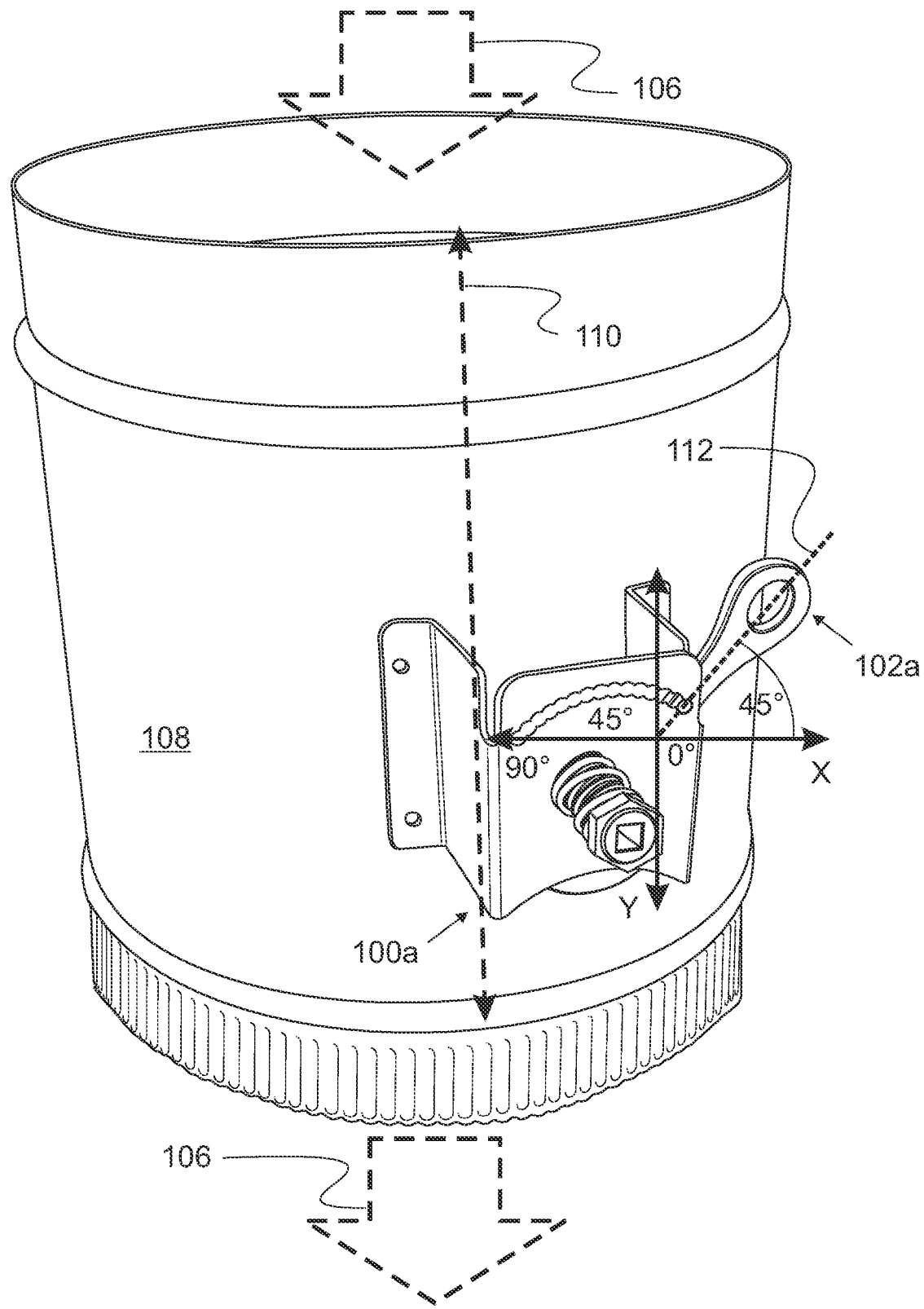
FIGS. 1A-1 to 1C-3 are non-limiting, exemplary illustrations of various views of a standoff regulator mounted on, a sleeve in accordance with one or more embodiments of the present invention.

The detailed description set forth below in connection with the appended drawings is intended as a description of presently preferred embodiments of the invention and is not intended to represent the only forms in which the present invention may be constructed and or utilized.

It is to be appreciated that certain features of the invention, which are, for clarity, described in the context of separate embodiments, may also be provided in combination in a single embodiment. Conversely, various features of the invention that are, for brevity, described in the context of a single embodiment may also be provided separately or in any suitable sub-combination or as suitable in any other described embodiment of the invention. Stated otherwise, although the invention is described below in terms of various exemplary embodiments and implementations, it should be understood that the various features and aspects described in one or more of the individual embodiments are not limited in their applicability to the particular embodiment with which they are described, but instead can be applied, alone or in various combinations, to one or more of the other embodiments of the invention.

In the description given below and or the corresponding set of drawing figures, when it is necessary to distinguish the various members, elements, sections/portions, components, parts, or any other aspects (functional or otherwise) or features or concepts or operations of a device(s) or method (s) from each other, the description and or the corresponding drawing figures may follow reference numbers with a small alphabet character such as (for example) "handle 102a, 102b, and etc." If the description is common to all of the various members, elements, sections/portions, components, parts, or any other aspects (functional or otherwise) or features or concepts or operations of a device(s) or method (s) such as (for example) to all handles 102a, 102b, etc., then they may simply be referred to with reference number only and with no alphabet character such as (for example) "handle 102."

It should be noted that the terms "duct," "sleeve," "damper sleeve," and so on are deemed equivalent and may interchangeably be used throughout the disclosure.

One or more embodiments of the present invention provide a standoff with sufficiently granulated position-settings that allows a handle of the standoff be adjusted to a correct desired position setting. Further, one or more embodiments of the present invention provide a standoff that allows a handle to be self-latched and fixed at a desired position setting and at a desired quantifiable torque. Additionally, one or more embodiments of the present invention provide a standoff that dampens most vibratory forces emanating from the damper blade to thereby prevent loosening of the engagement of the handle with the bracket of the standoff.

FIGS. 1A-1 to 1C-3 are non-limiting, exemplary illustrations of various views of a standoff regulator mounted on a damper sleeve in accordance with one or more embodiments of the present invention. FIGS. 1A-1 to 1C-3 progressively illustrate a movement of a handle 102a of standoff regulator 100a to move a damper blade 104 in various corresponding views from a closed position (FIGS. 1A-1 to 1A-3) that close-off airflow 106 through sleeve 108, to a fully open position (FIGS. 1C-I to 1C-3).

FIGS. 1A-1 to 1A-3 are various views of standoff regulator 100a and damper blade 104 in a fully closed position (plane of damper blade 104 and hence, damper blade 104 itself is oriented at 0° angle) in accordance with one or more embodiments of the present invention. In other words, when fully closed, damper blade 104 is oriented perpendicular central longitudinal axis 110 of sleeve 108. In this non-limiting, exemplary embodiment, when damper blade 104 is at 0° and fully closed, handle 102a is oriented at 45° to one side as best shown by line 112 in FIG. 1A-1 superimposed on handle 102a.

Figures 1, 1A, 2:
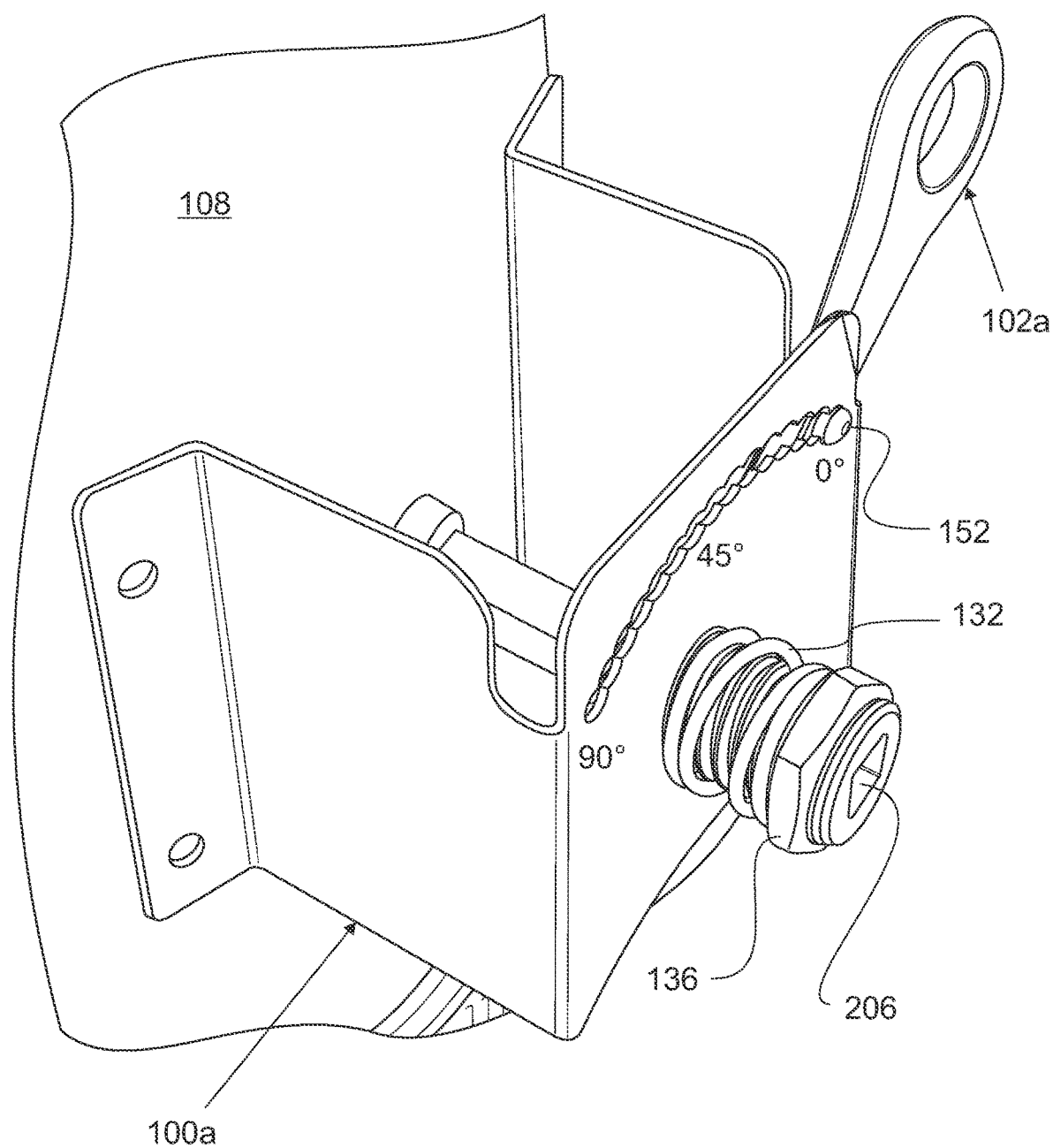
Figures 1, 1A, 2, 3:
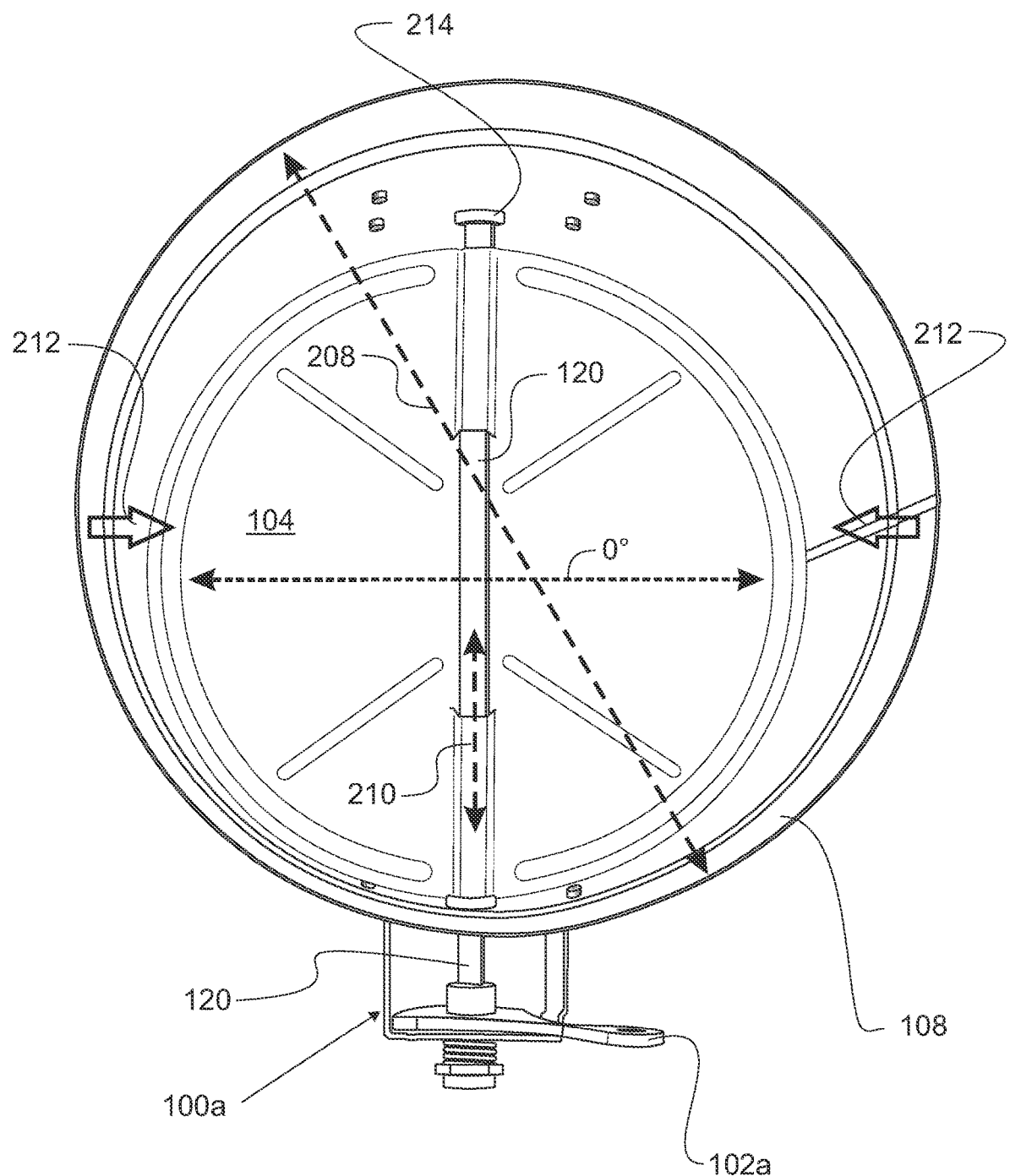
Figures 1, 1B:
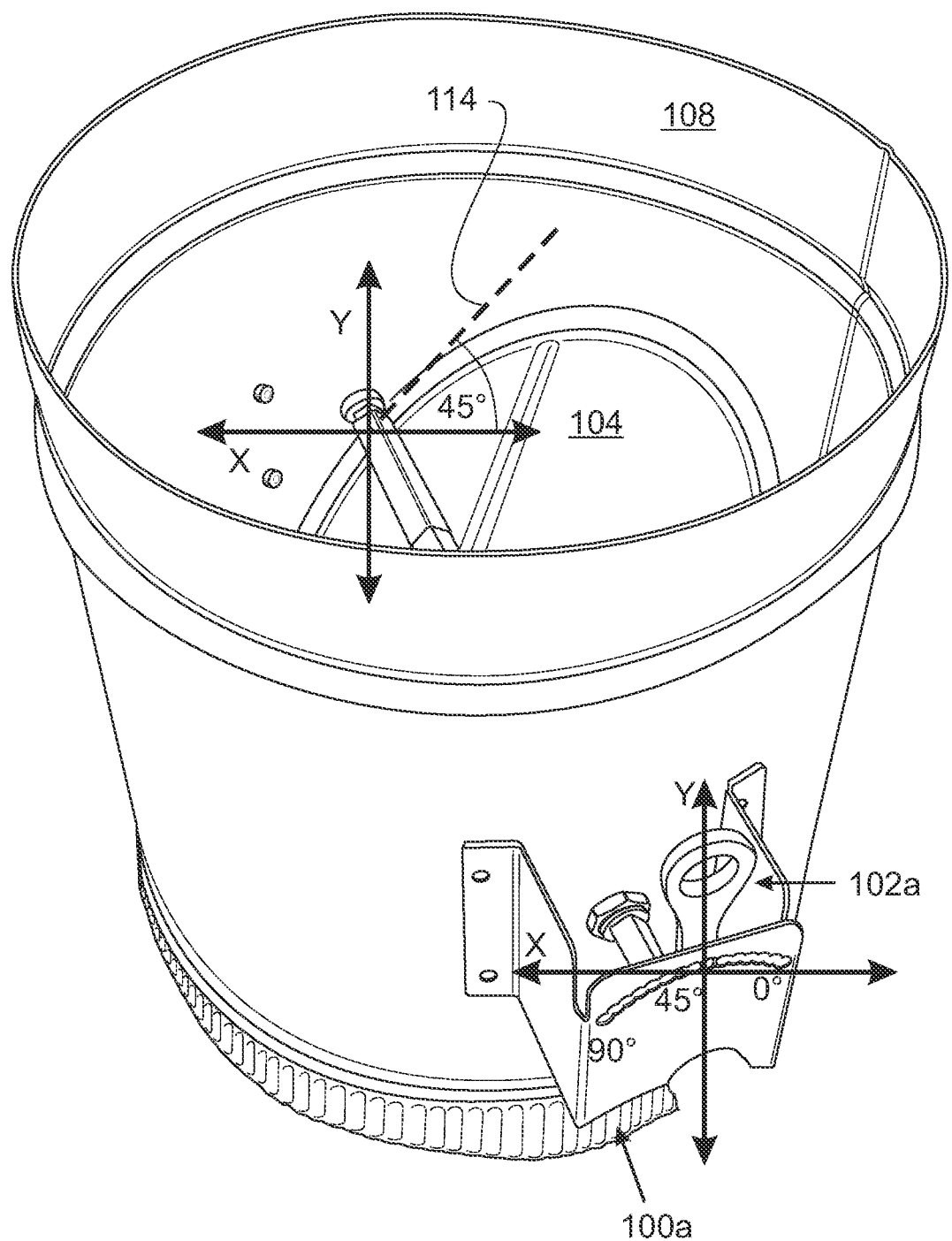
Figures 1, 1B, 2:
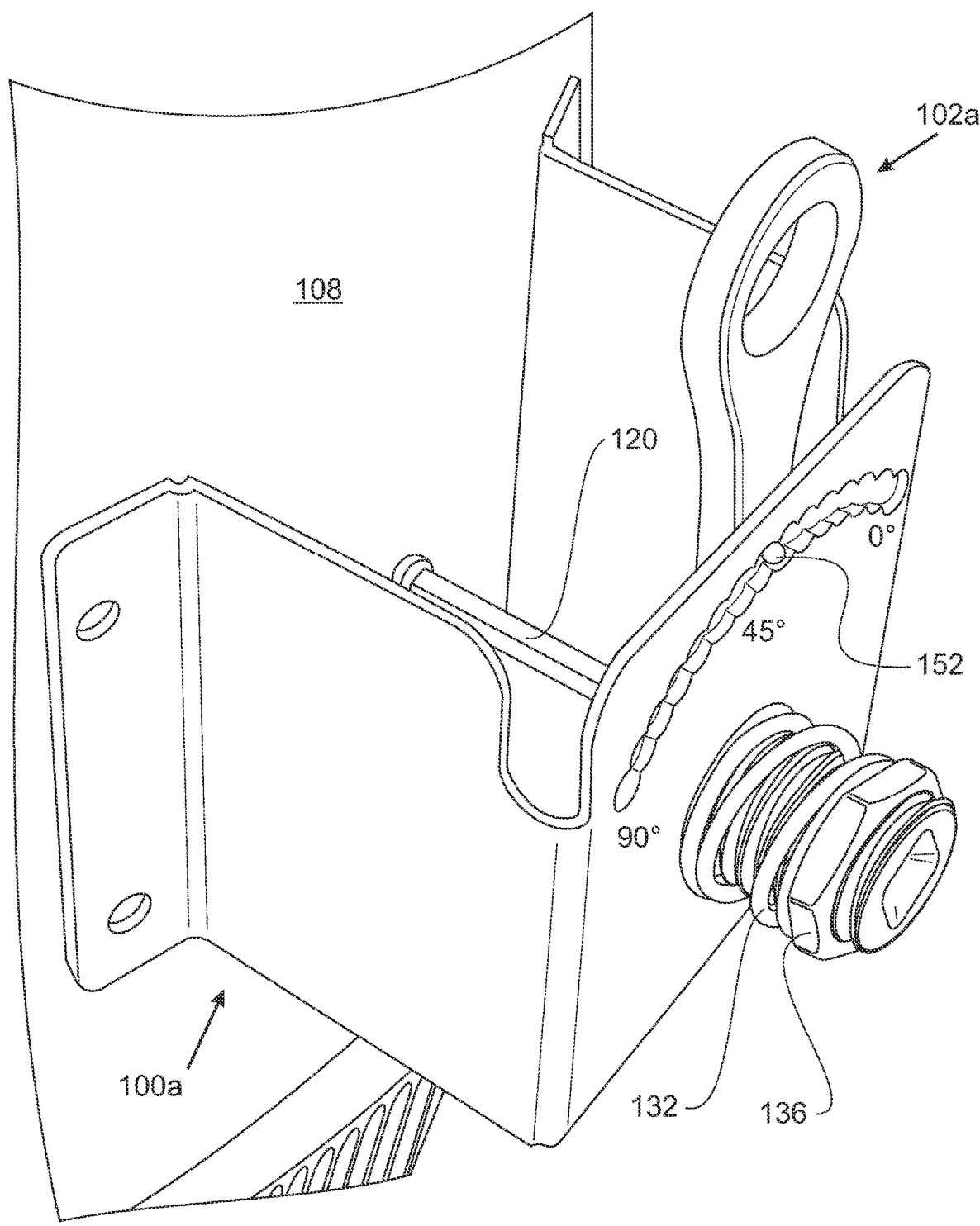
Figures 1, 1B, 2, 3:
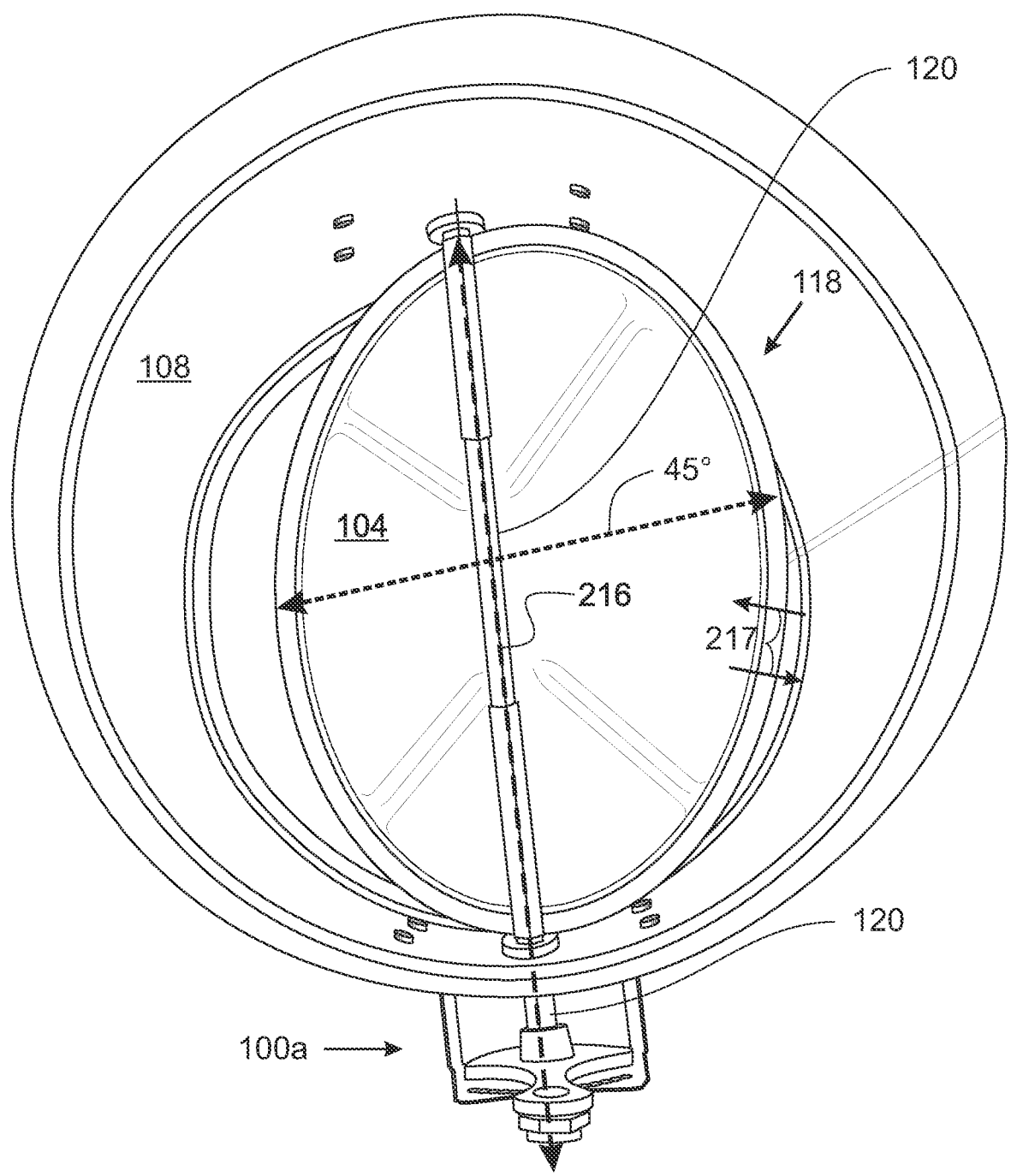

FIGS. 1B-1 to 1B-3 are various views of standoff regulator 100a and damper blade 104, with damper blade 104 partially open and oriented at about 45° angle (as shown by line 114 in FIG. 1B-1) in accordance with one or more embodiments of the present invention. That is, when partially open, plane of damper blade 104 and hence, damper blade 104 itself is oriented at 45° angle in relation to central longitudinal axis 110 of sleeve 108. In this non-limiting, exemplary embodiment, when damper blade 104 is at 45° and partially closed (or partially open), handle 102a is oriented at 90° in the middle as best shown in FIG. 1B-1 where a Y-axis is superimposed on handle 102a.

FIGS. 1C-1 to 1C-3 are various views of standoff regulator 100a and damper blade 104 in a fully open position (damper at 90° angle) in accordance with one or more embodiments of the present invention. In other words, when fully open, plane of damper blade 104 and hence, damper blade 104 itself is oriented at 90° angle, parallel central longitudinal axis 110 of sleeve 108. In this non-limiting, exemplary embodiment, when damper blade 104 is at 90° and fully open, handle 102a is oriented at 45° to another side (opposite the fully closed side) as best shown by line 116 in FIG. 1C-1 superimposed on handle 102a.

Figures 1, 1C:
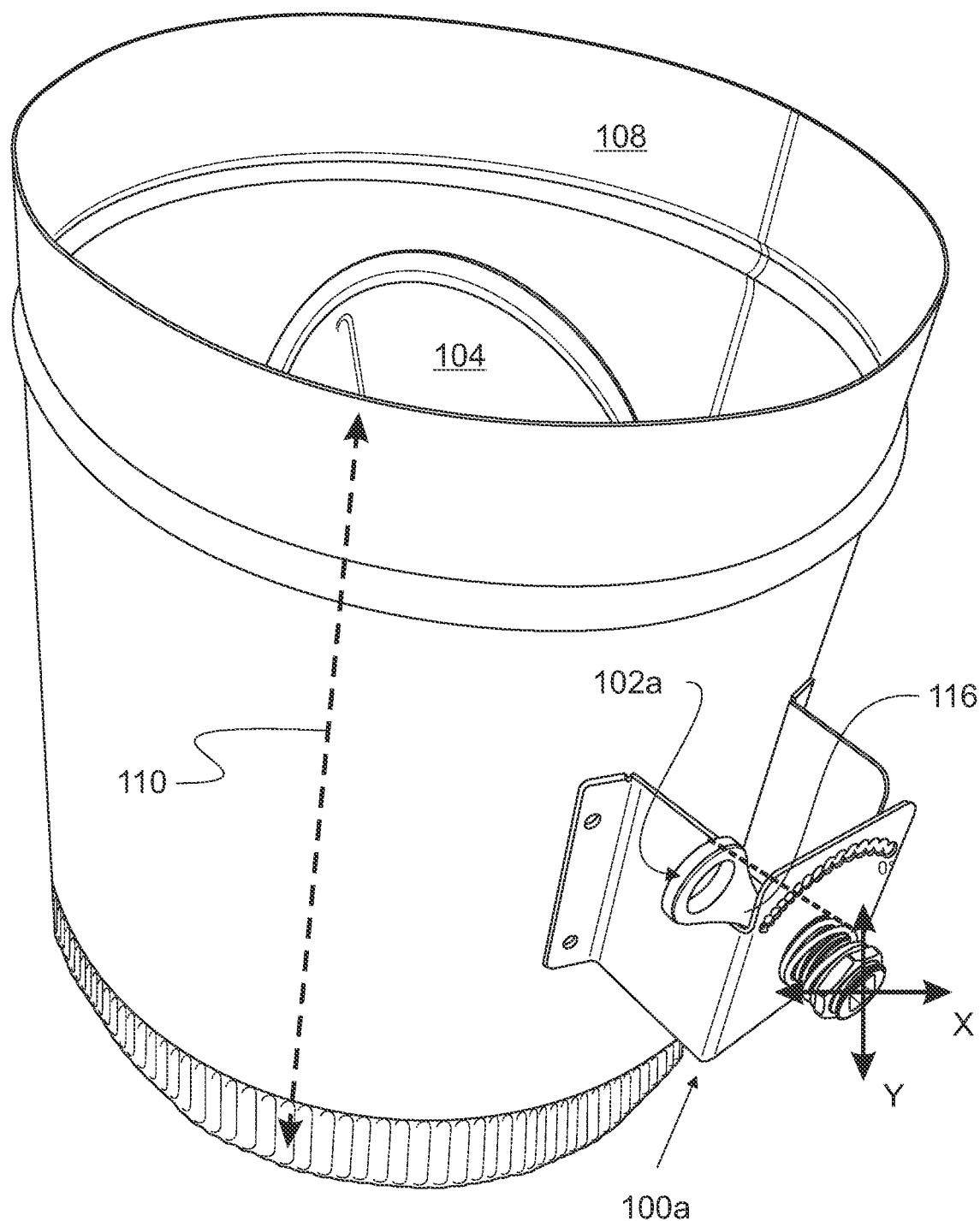
Figures 1, 1C, 2:
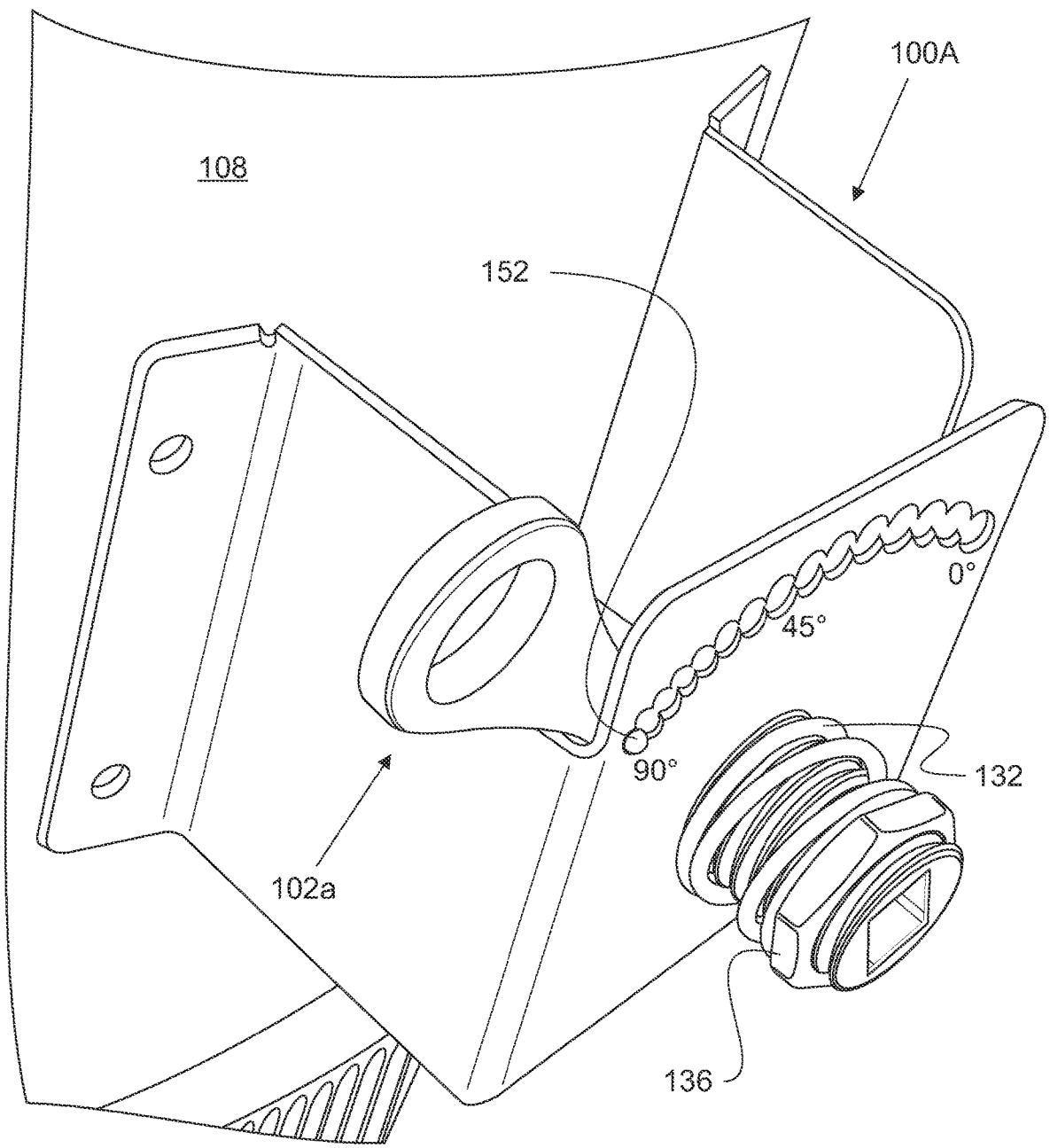
Figures 1, 1C, 2, 3:
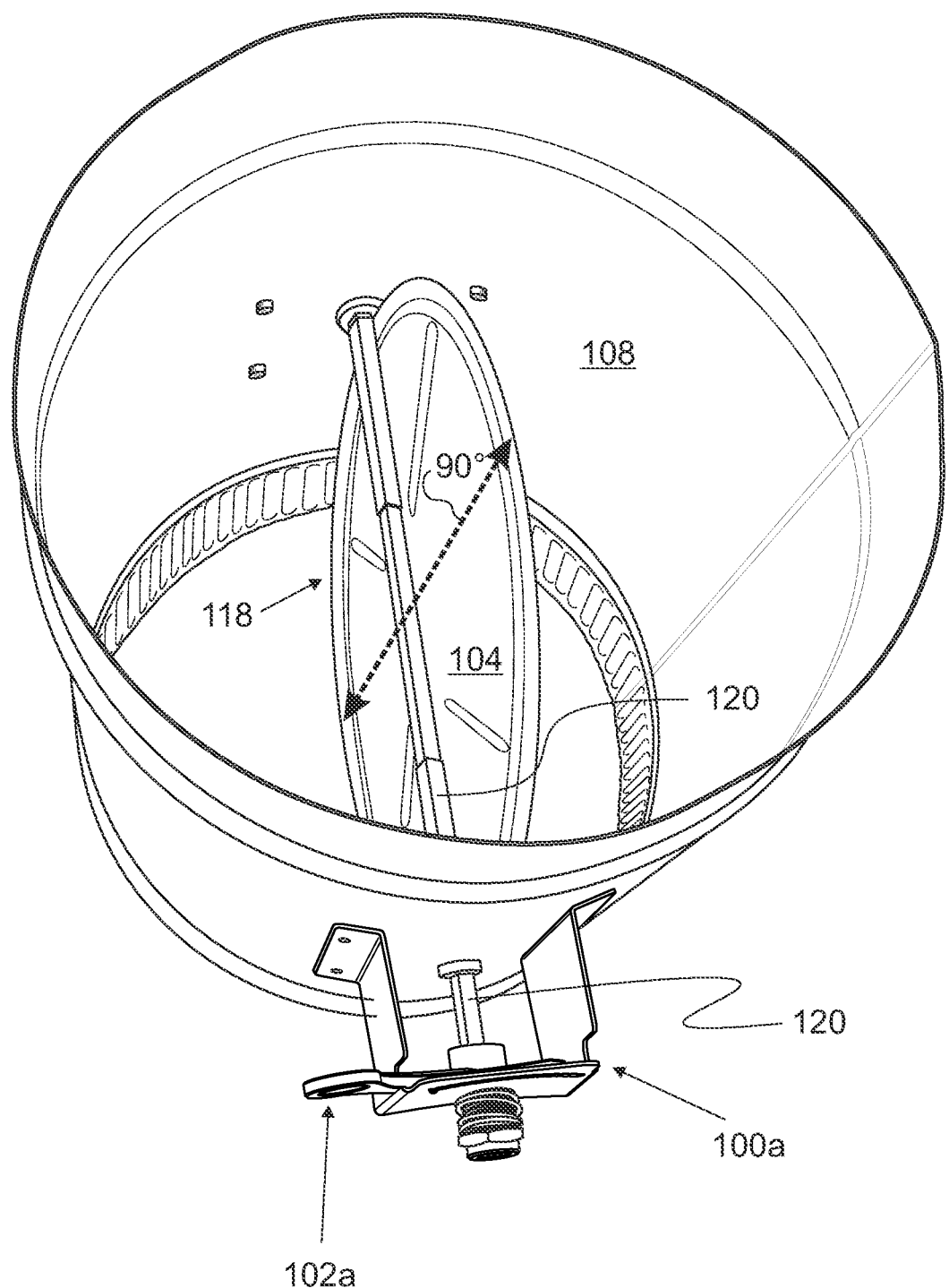
Figure 2:
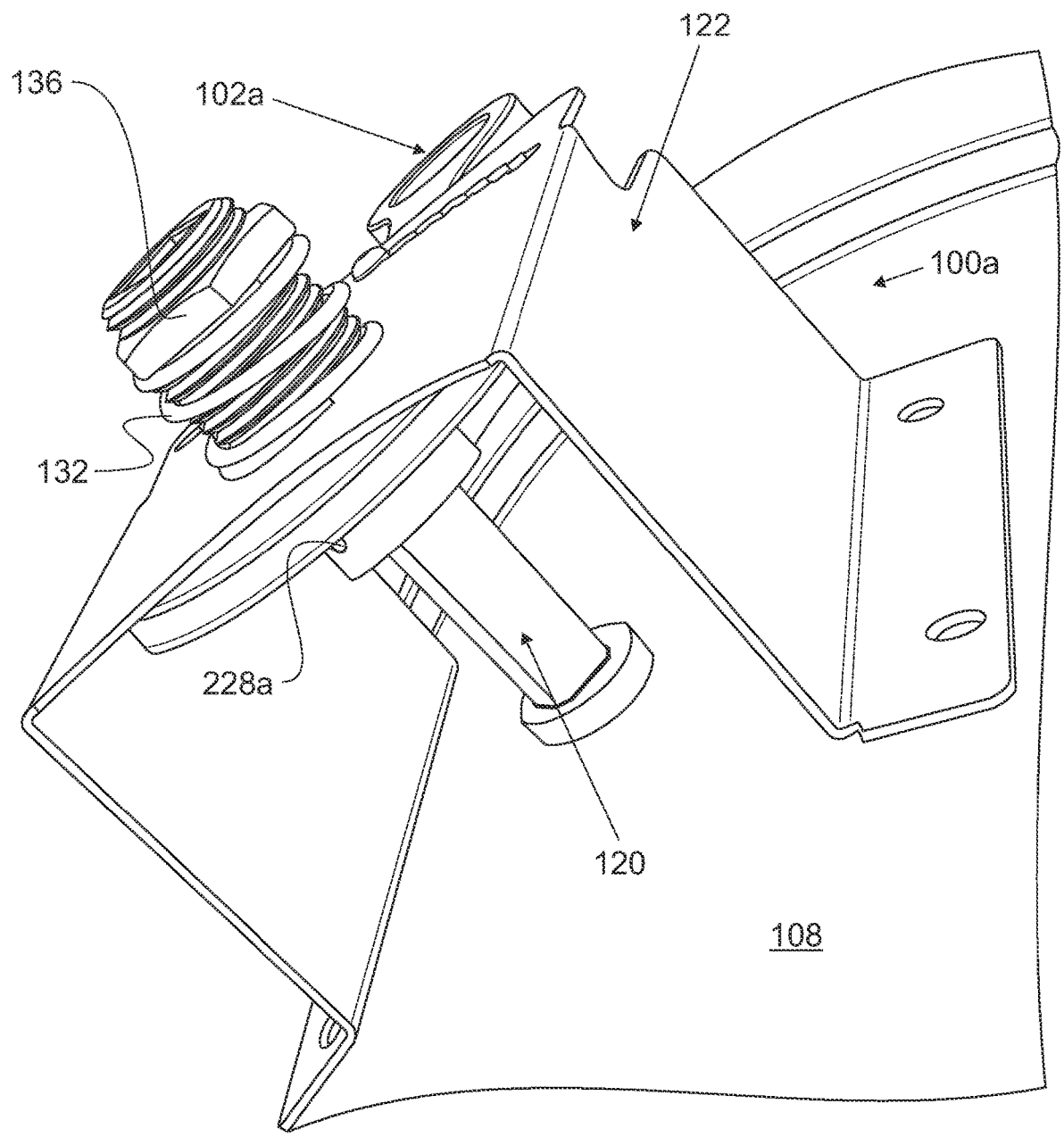

In particular, FIGS. 1A-1, 1B-1, 1C-1 exemplarily illustrate from a perspective front view the progressive movement and position-setting of handle 102a of standoff regulator 100a for a fully closed position damper blade 104 orientation (FIG. 1A-1) to a fully open position damper blade 104 orientation (FIG. 1C-1).

FIGS. 1A-2, 1B-2, 1C-2 are close-up views of standoff 100a of FIGS. 1A-1, 1B-1, 1C-1 and are used to exemplary illustrate the progressive movement and position-setting of handle 102a of standoff regulator 100a in the exact corresponding positions shown in the perspective front views of FIGS. 1A-1, 1B-1, 1C-1, from a fully closed position (FIG. 1A-2) to a fully open position (FIG. 1C-2).

FIGS. 1A-3, 1B-3, 1C-3 are perspective top views of standoff 100a and damper blade 104, and are used to exemplary illustrate the progressive opening of damper blade 104 in the exact corresponding positions shown in the perspective front views of FIGS. 1A-1, 1B-1, 1C-1 from a fully closed position (FIG. 1A-3) to a fully open position (FIG. 1C-3).

As illustrated in FIGS. 1A-1 to 1C-3, and FIG. 2, one or more embodiments of the present invention provide a regulator system, comprising a standoff regulator 100a in accordance with one or more embodiments of the present, invention mounted on a conventional damper sleeve 108 that includes a conventional damper blade, assembly 118. Damper blade assembly 118 includes damper blade 104 connected (or mounted on) a shaft 120 that is connected to standoff regulator 100a.

FIGS. 3A to 3H are non-limiting, exemplary illustrations of various views the standoff regulator illustrated in FIGS. 1A-1 to 2 in accordance with one or more embodiments of the present invention. As illustrated, standoff regulator 100a is comprised of an adaptor in a form of a non-limiting, exemplary bracket 122 that is generally associated with sleeve 108. Further included is handle 102a that is adjustably associated with bracket 122, with handle 102a self-latching in relation to bracket 122 at a desired position. Standoff regulator 100a also includes an adjustable coupler assembly 124a that allows handle 102a to self-latch at the desired position in addition to being secured at a desired quantifiable torque in relation to bracket 122.

Figure 3A:
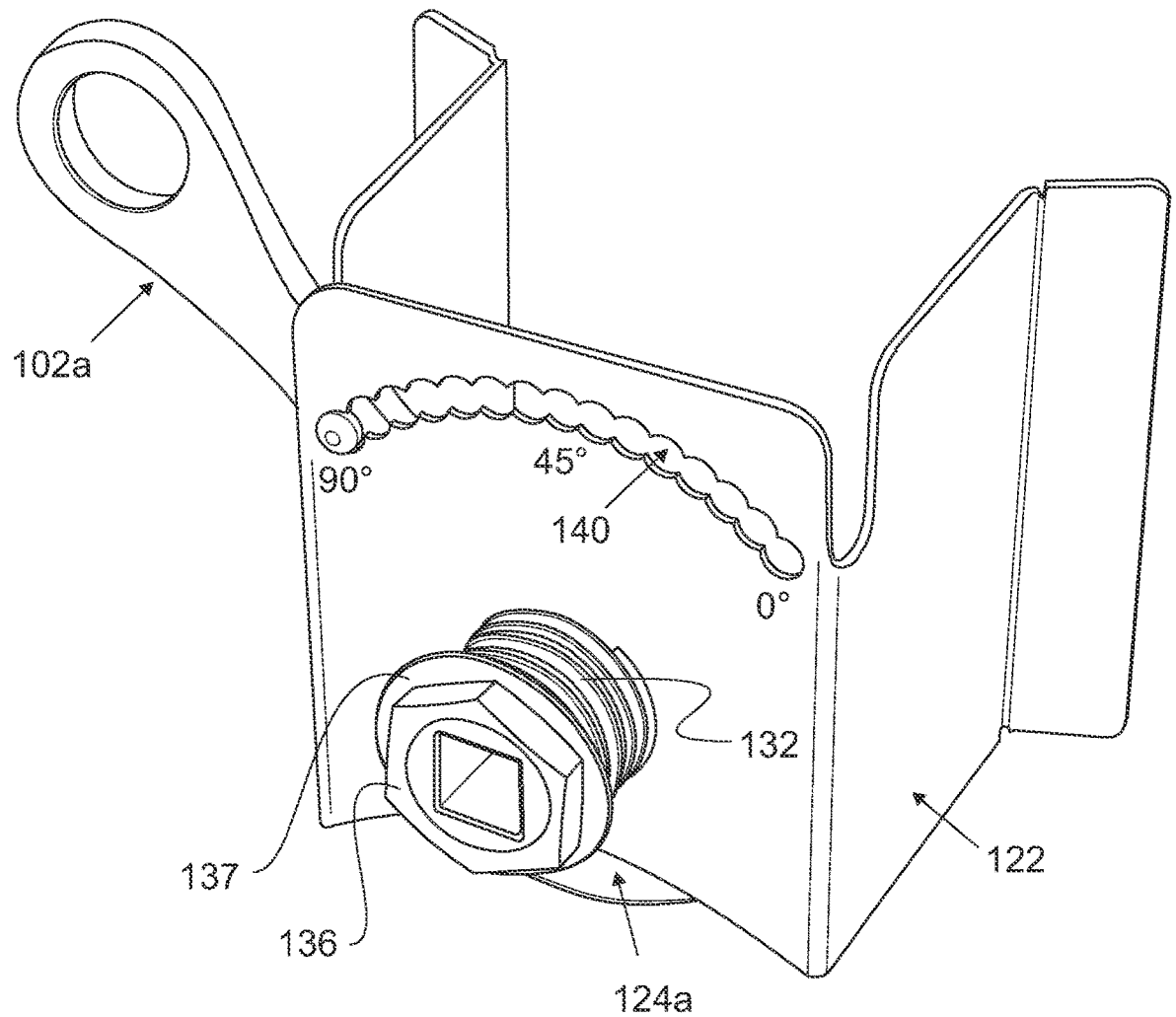
Figure 3B:
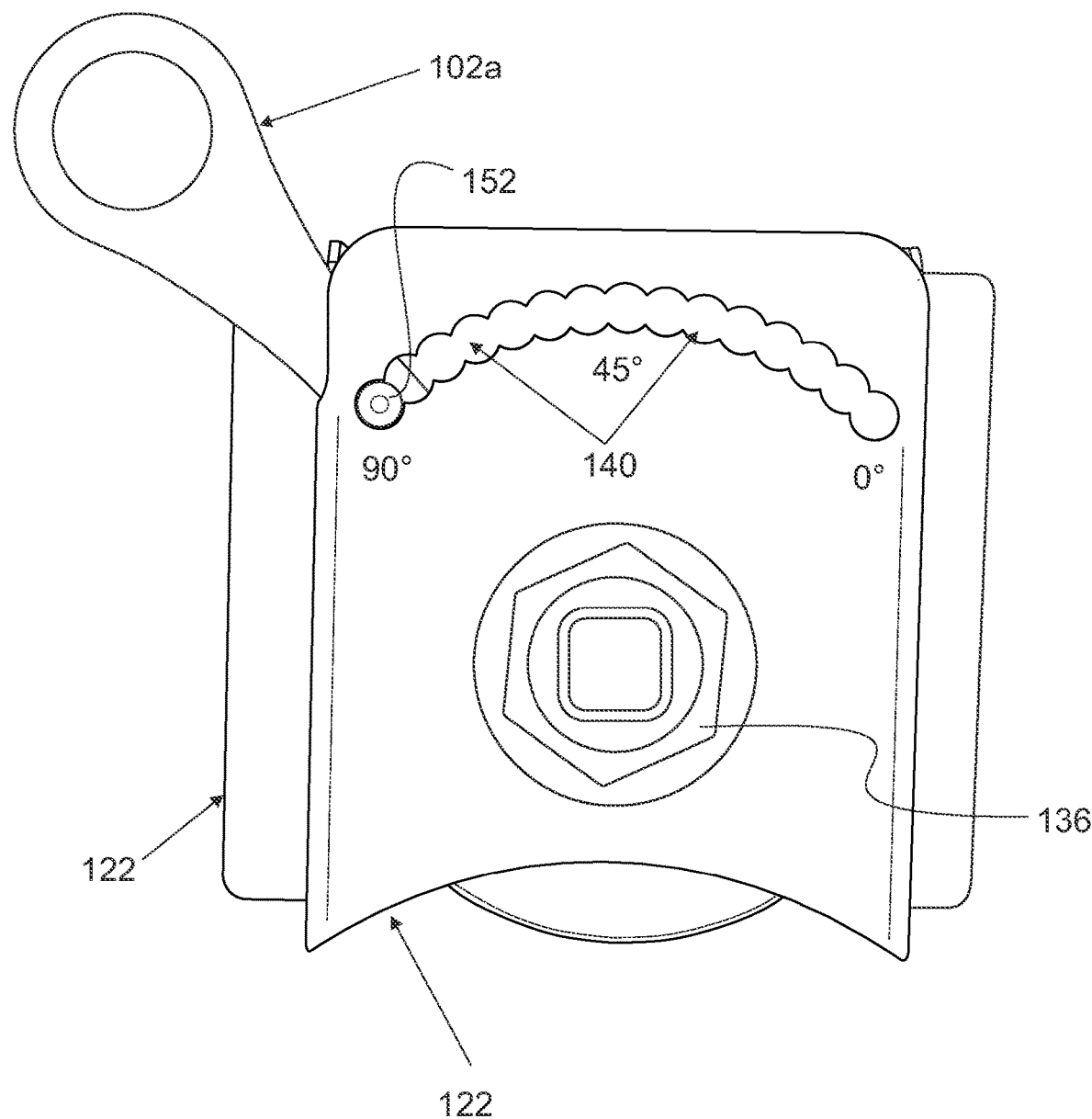
Figure 3C:
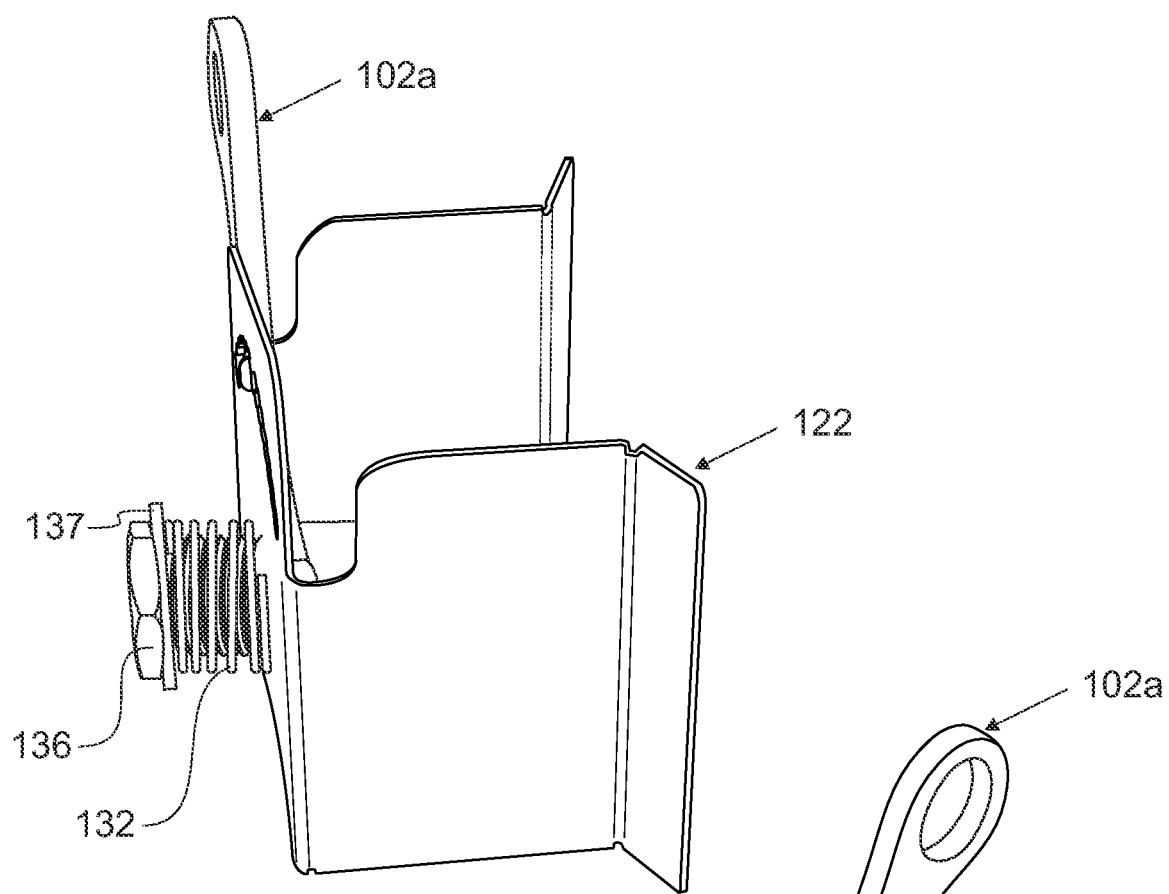
Figure 3D:
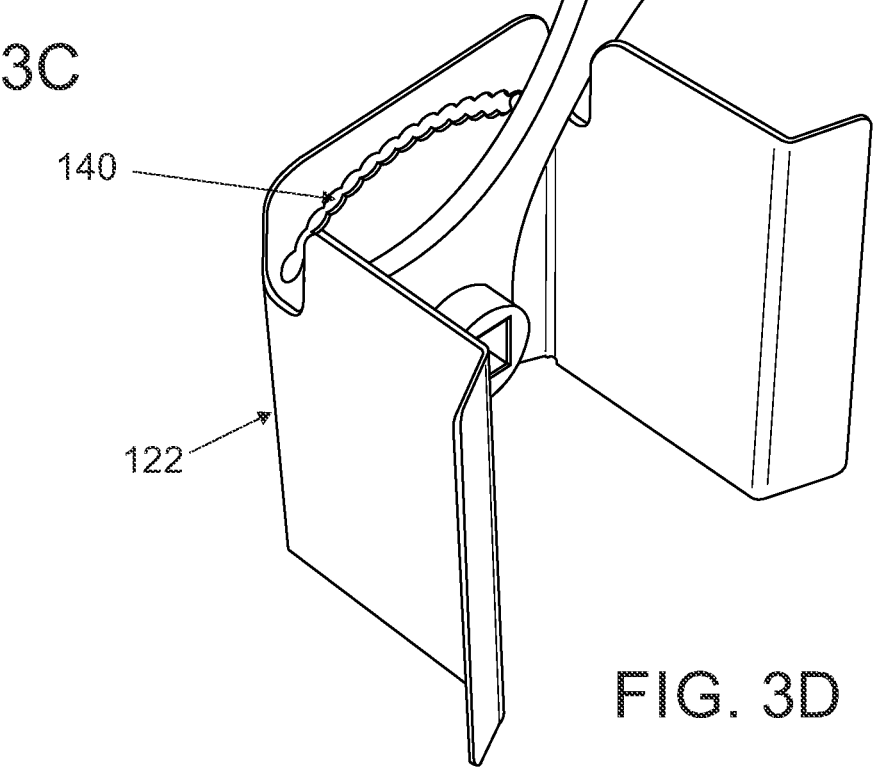
Figure 3E:
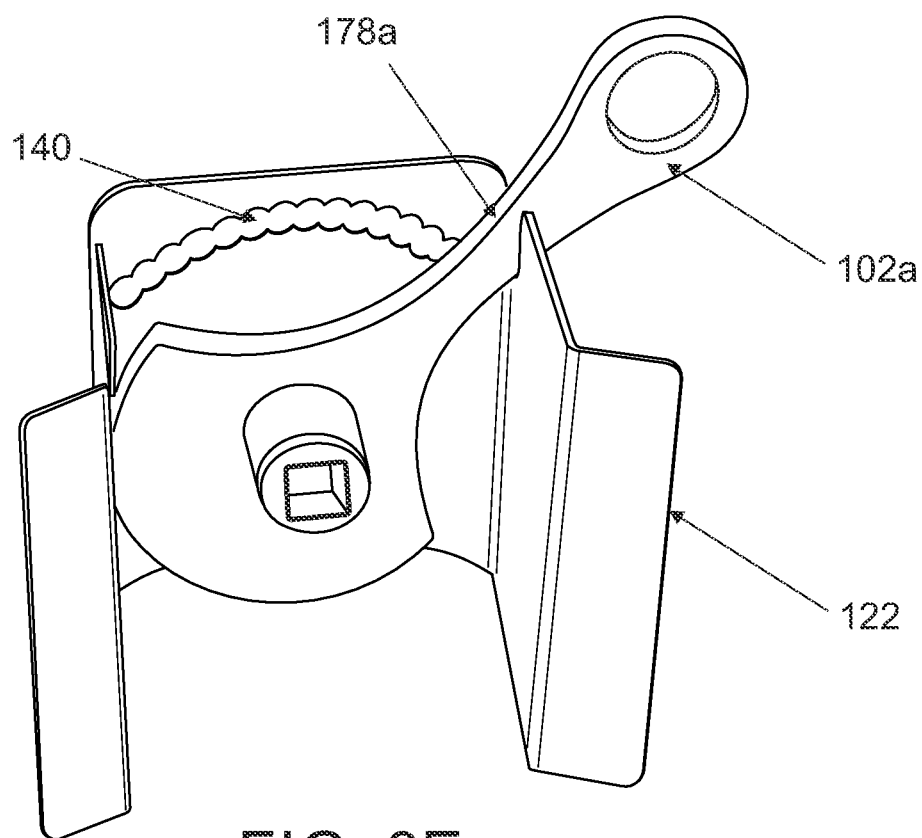
Figure 3F:
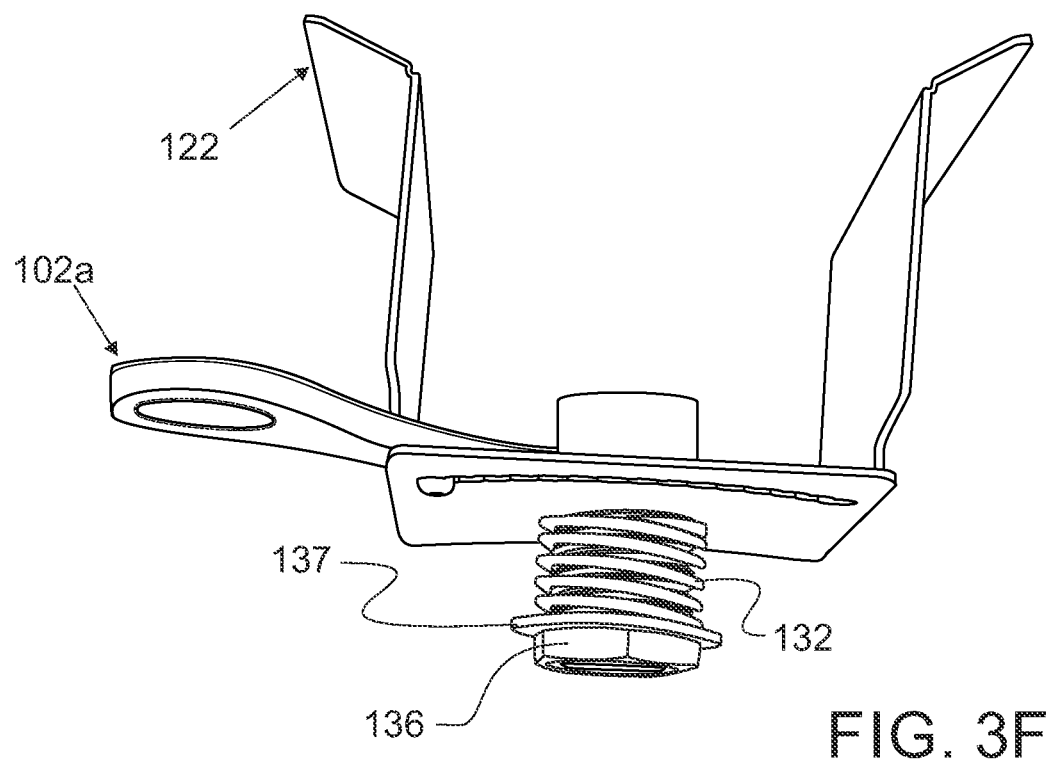
Figure 3G:
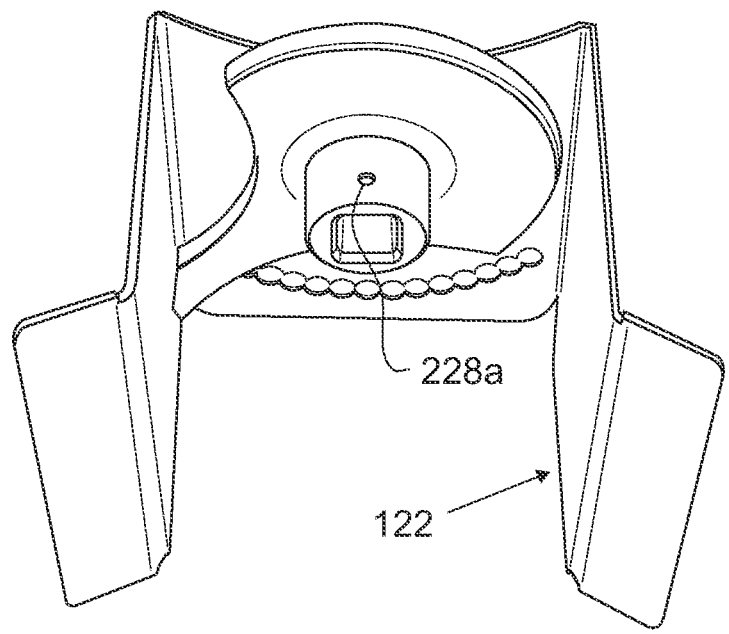
Figure 3H:
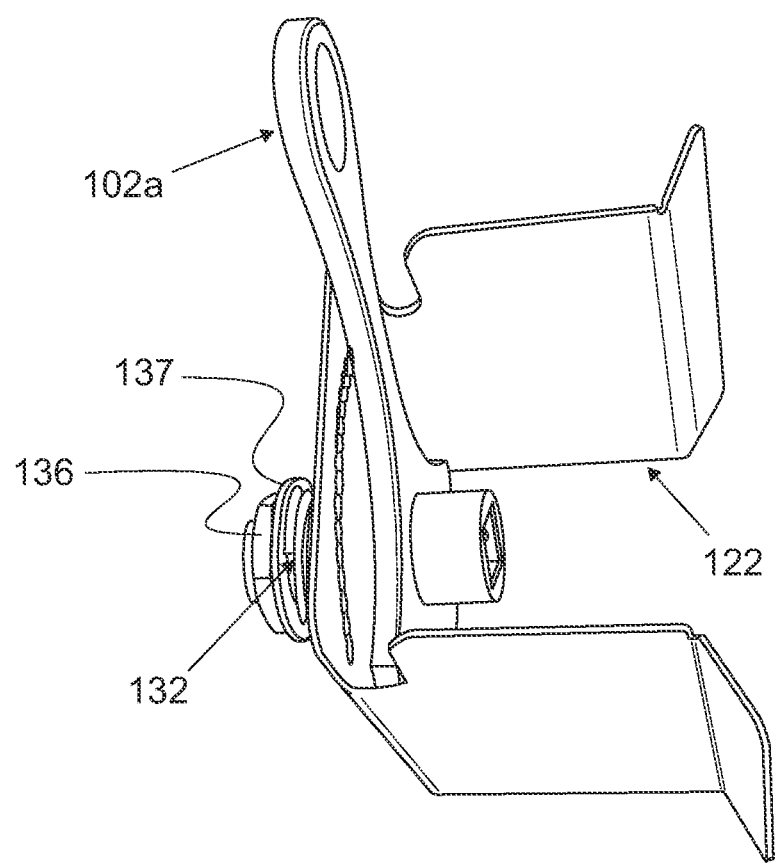

FIGS. 4A to 4G are non-limiting, exemplary illustrations, progressively illustrating a non-limiting, exemplary method of moving and repositioning handle 102a of standoff regulator 100a illustrated in FIGS. 1A-1 to 3H in accordance with one or more embodiments of the present invention. As illustrated, handle 102a of standoff regulator 100a may easily be moved and repositioned to a new position-setting to thereby reorient damper blade 104 to a desired angle.

Standoff regulator 100a includes adjustable coupler assembly 124a that enables reciprocating back-and-forth motion of handle 102a as shown by arrow 128 as well as reciprocating lateral movement of handle 102a as shown by arrow 126 to reorient damper blade 104 to a desired angle. For example, handle 102a may be pulled (or "pushed" depending on the orientation of the user's hand) by top portion 130a and tilted away from bracket 122 against the biasing force of a biasing mechanism 132 of adjustable coupler assembly 124a as shown by arrow 128 in FIGS. 4A, 4C, 4E, 4F 4G. Biasing mechanism 132 is compressed as shown, as handle 102a is tilted away from bracket 122.

Figure 4A:
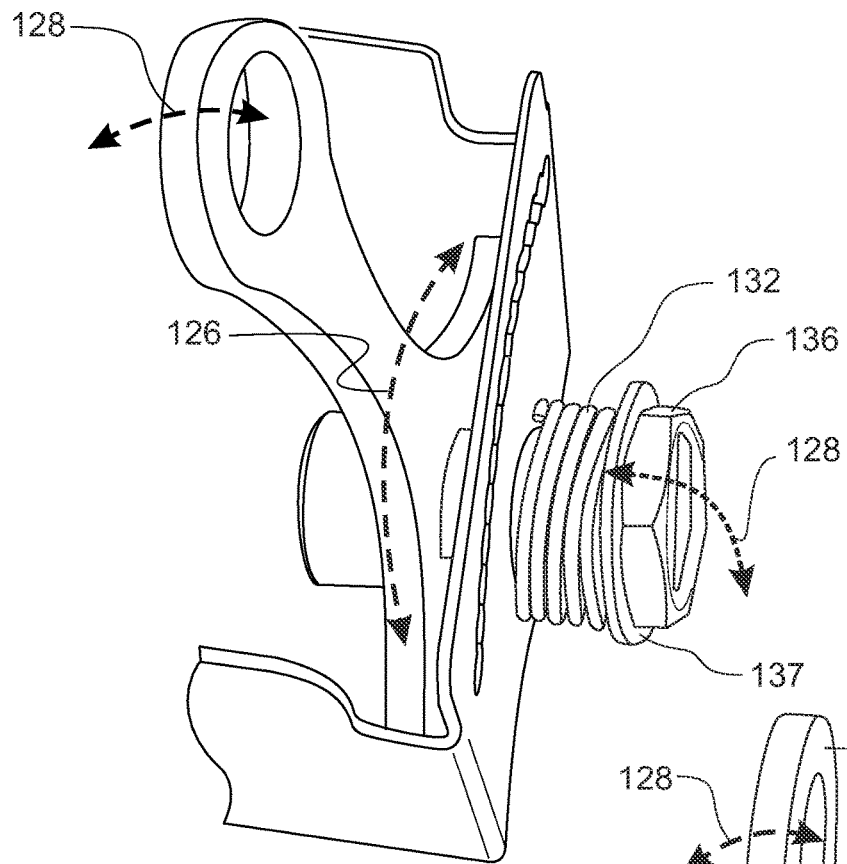
Figure 4B:
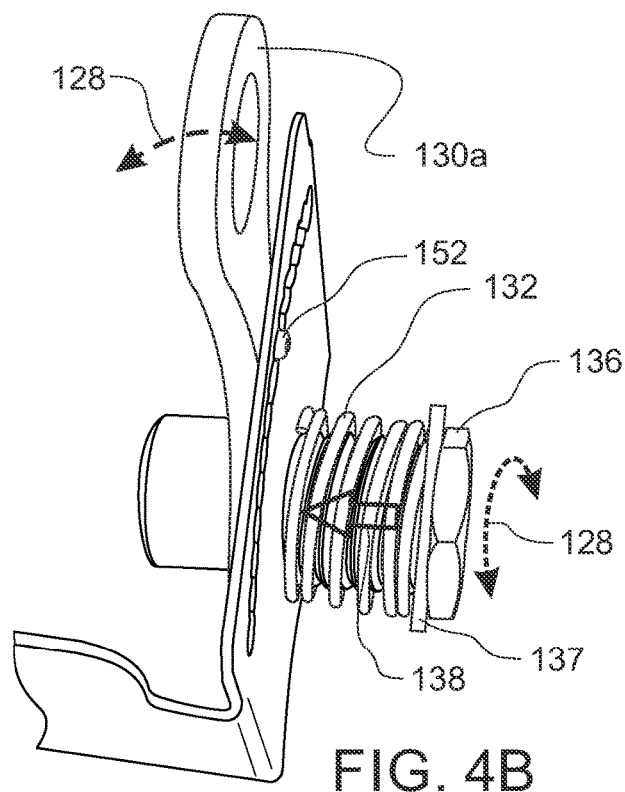
Figure 4C:
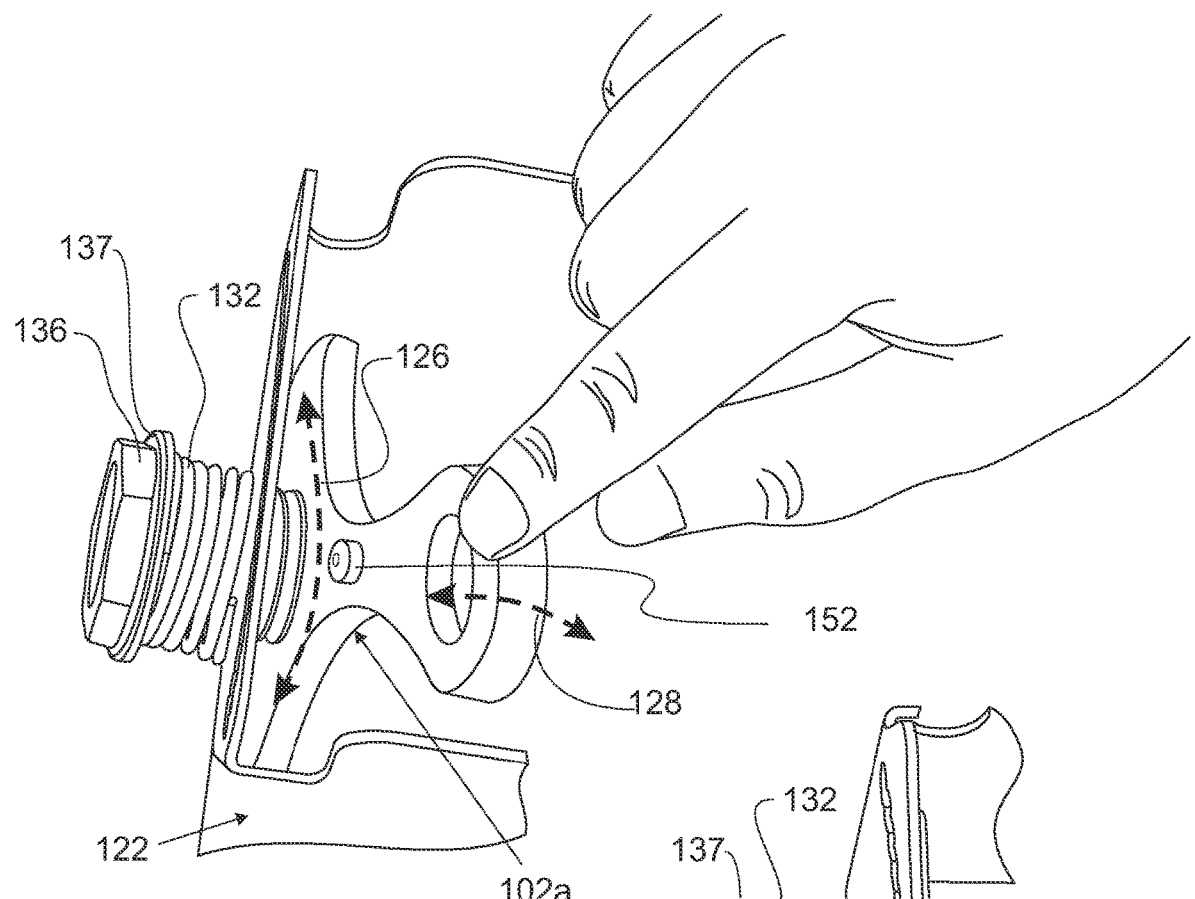
Figure 4D:
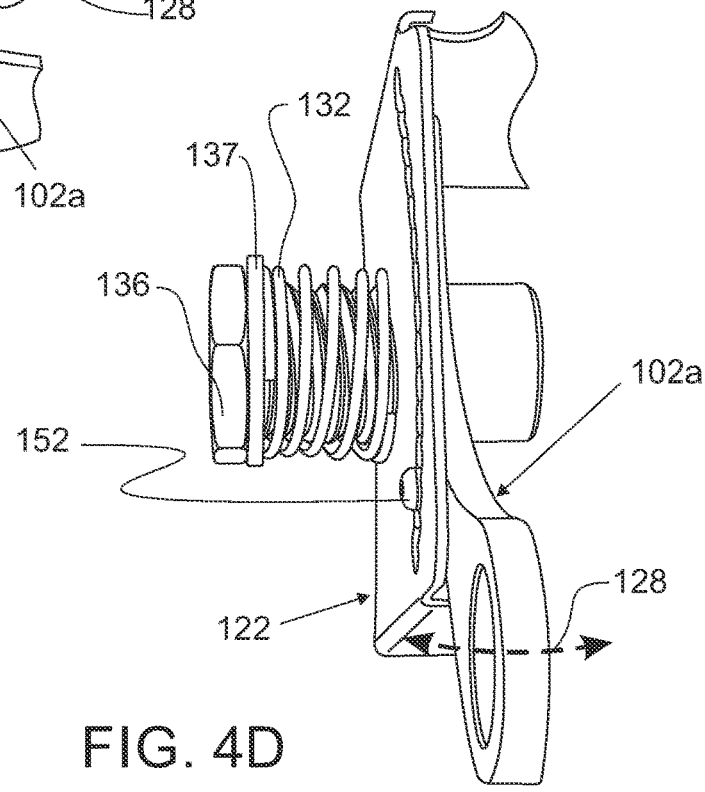
Figure 4E:
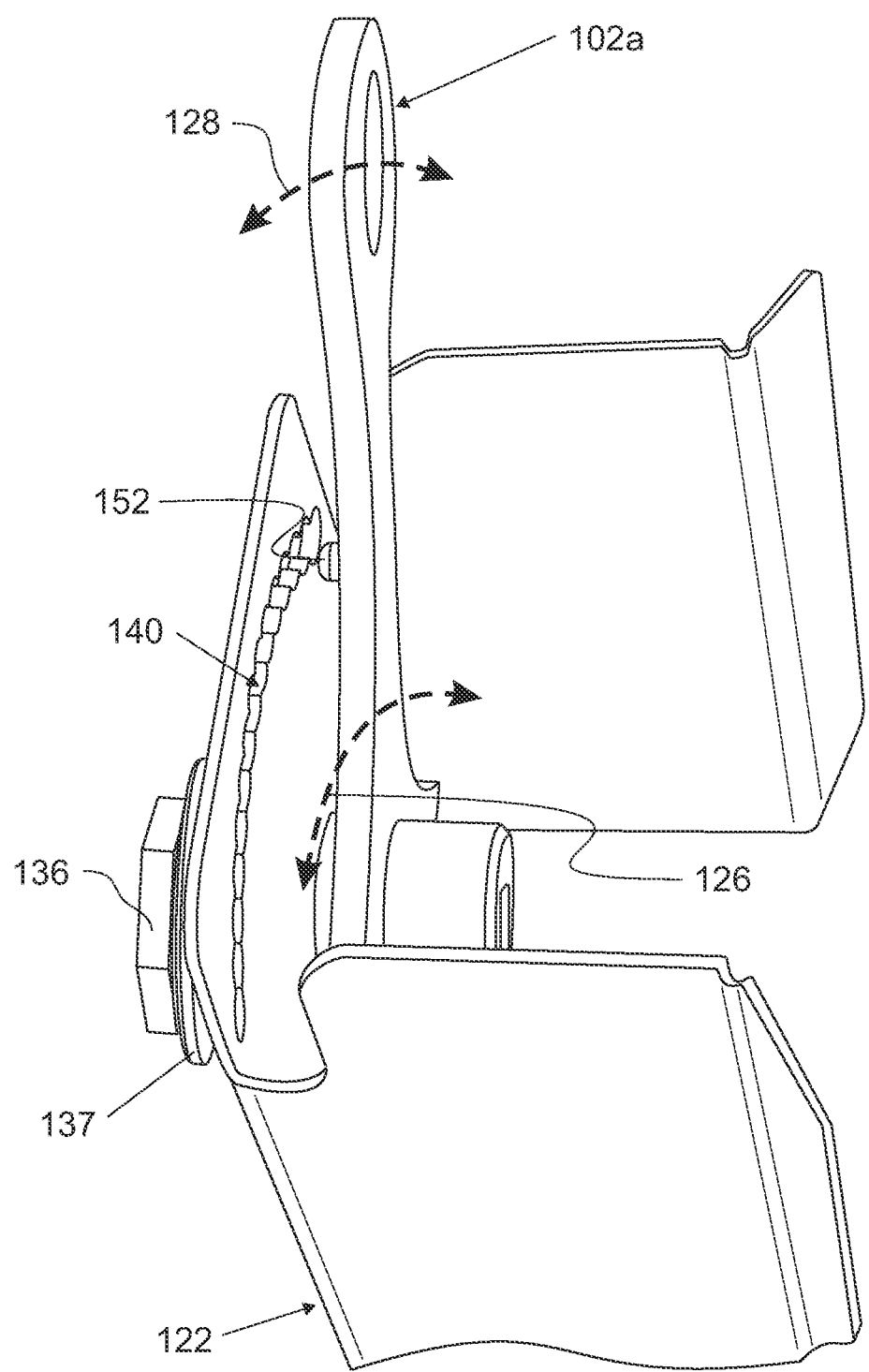

Once free from engagement with bracket 122 (detailed below), handle 102a may then be easily moved laterally as shown by arrow 126 to thereby reorient damper blade 104 to a desired angle. As shown in FIGS. 4B and 4D, handle 102a may then be released where it snaps into desired position by biasing mechanism 132 of adjustable coupler assembly 124a (further detailed below). Accordingly, adjustable coupler assembly 124a enables easy repositioning and self-latching of handle 102a at a desired position.

As illustrated in FIGS. 4B and 4D, once handle 102a is self-latched at some desired position, a desired quantifiable torque shown by arrow 134 may then be applied to fix handle 102a at the desired position and at a quantifiable torque using a torque wrench on a coupler 136. As coupler 136 is rotated, it moves along direction shown by arrow 138 further pushing an accompanying (optional) washer 137 (FIG. 4A), which, in turn, compresses biasing mechanism 132 against bracket 122.

Compression of biasing mechanism 132 applies a tightening force against bracket 122, which further secures (or more securely fixes) handle 102a at desired position and at a desired holding strength. Accordingly, adjustable coupler assembly 124a enables easy repositioning and self-latching of handle 102a at a desired position and at a desired quantifiable holding strength by an application of a quantifiable torque.

FIGS. 5A to 5E are non-limiting, exemplary disassembled view illustrations of the various components of the standoff regulator shown in FIGS. 1A-1 to 4G in accordance with one or more embodiments of the present invention. The disassembled views illustrate separate, individual components, including their cooperative working relationship, orientation, positioning, and exemplary manner of re-assembly in accordance with one or more embodiments of the present invention, with each component detailed below.

Figure 5A:
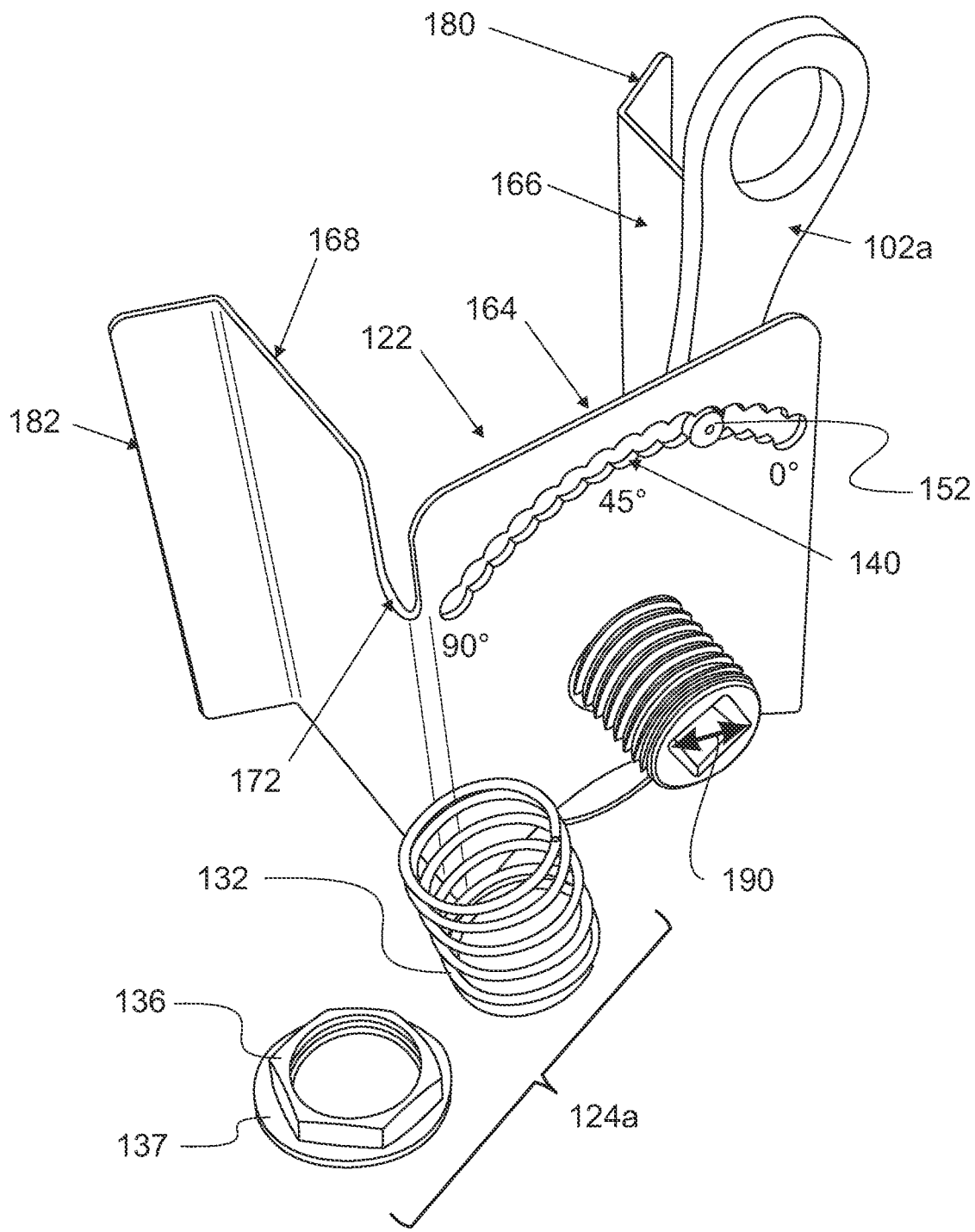
FIGS. 5A to 5E are non-limiting, exemplary disassembled view illustrations of the various components of the standoff regulator shown in FIGS. 1A-1 to 4G in accordance with one or more embodiments of the present invention.
Figure 5B:
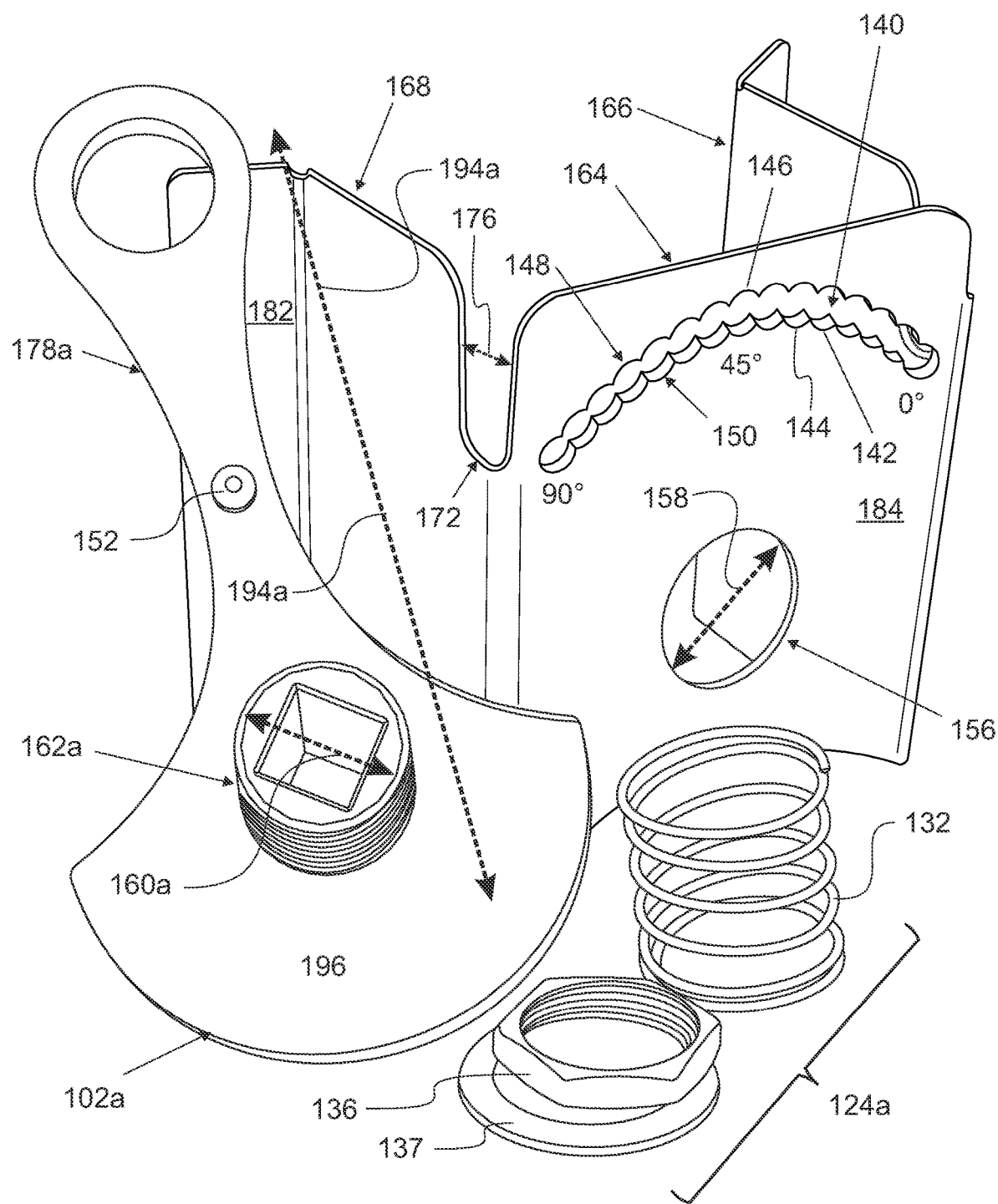
Figure 5C:
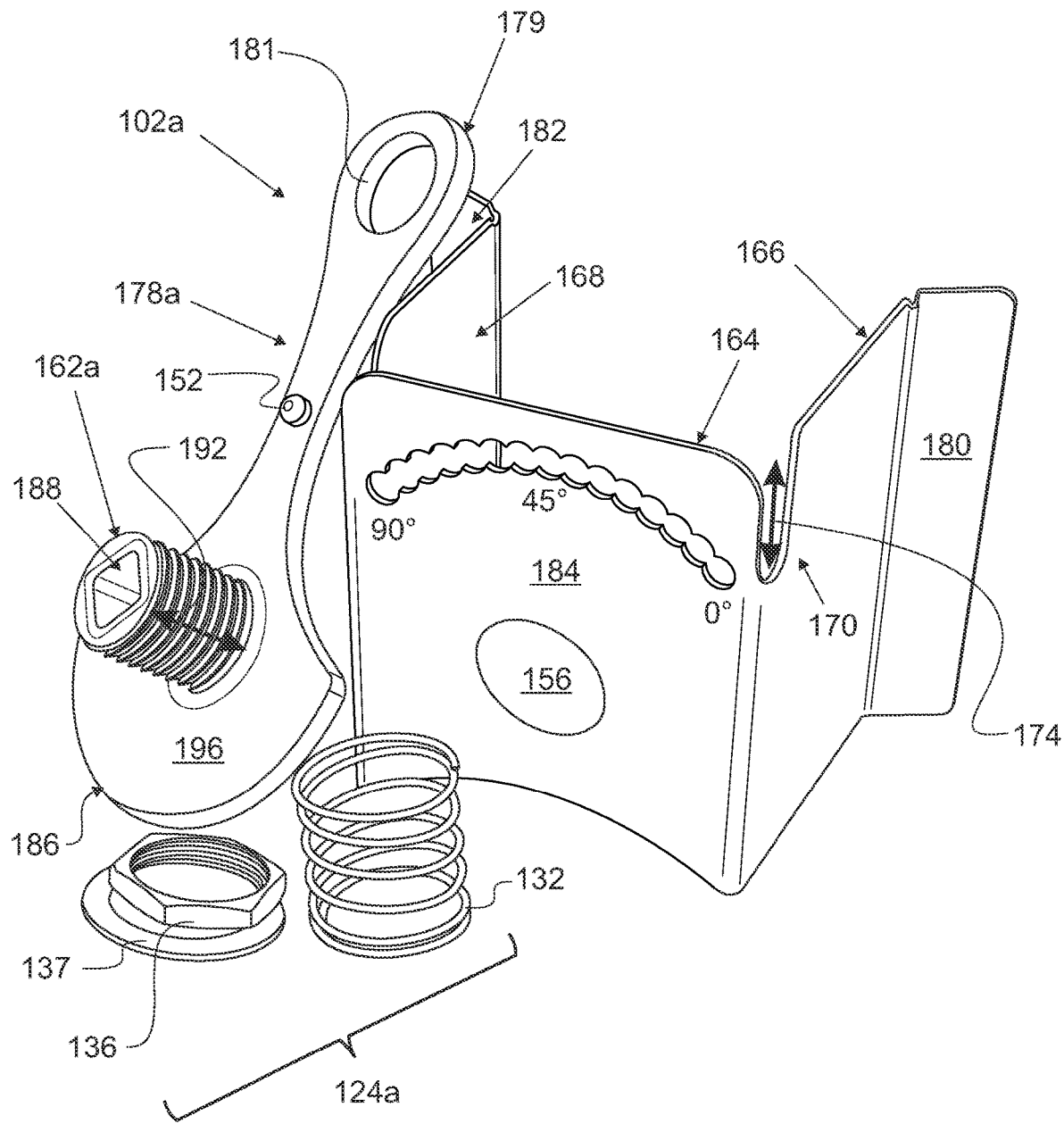
Figure 5D:
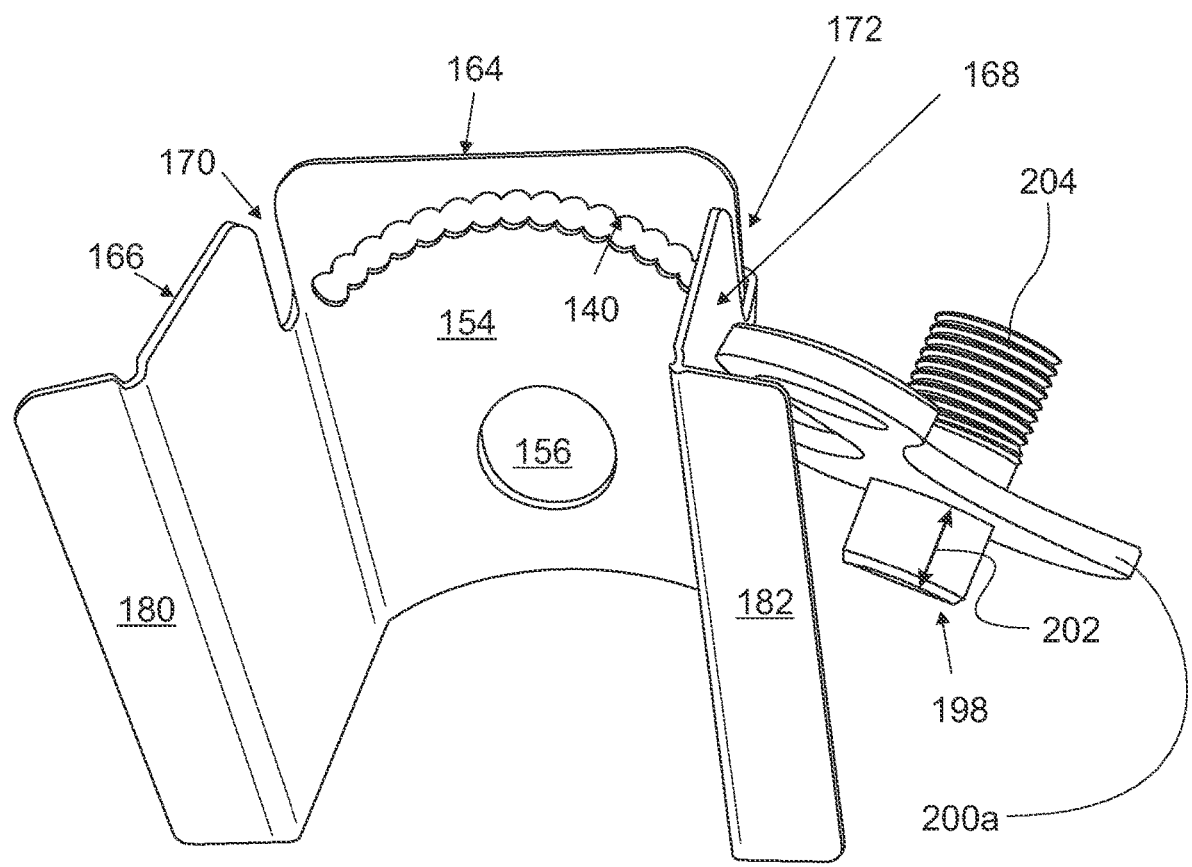
Figure 5E:
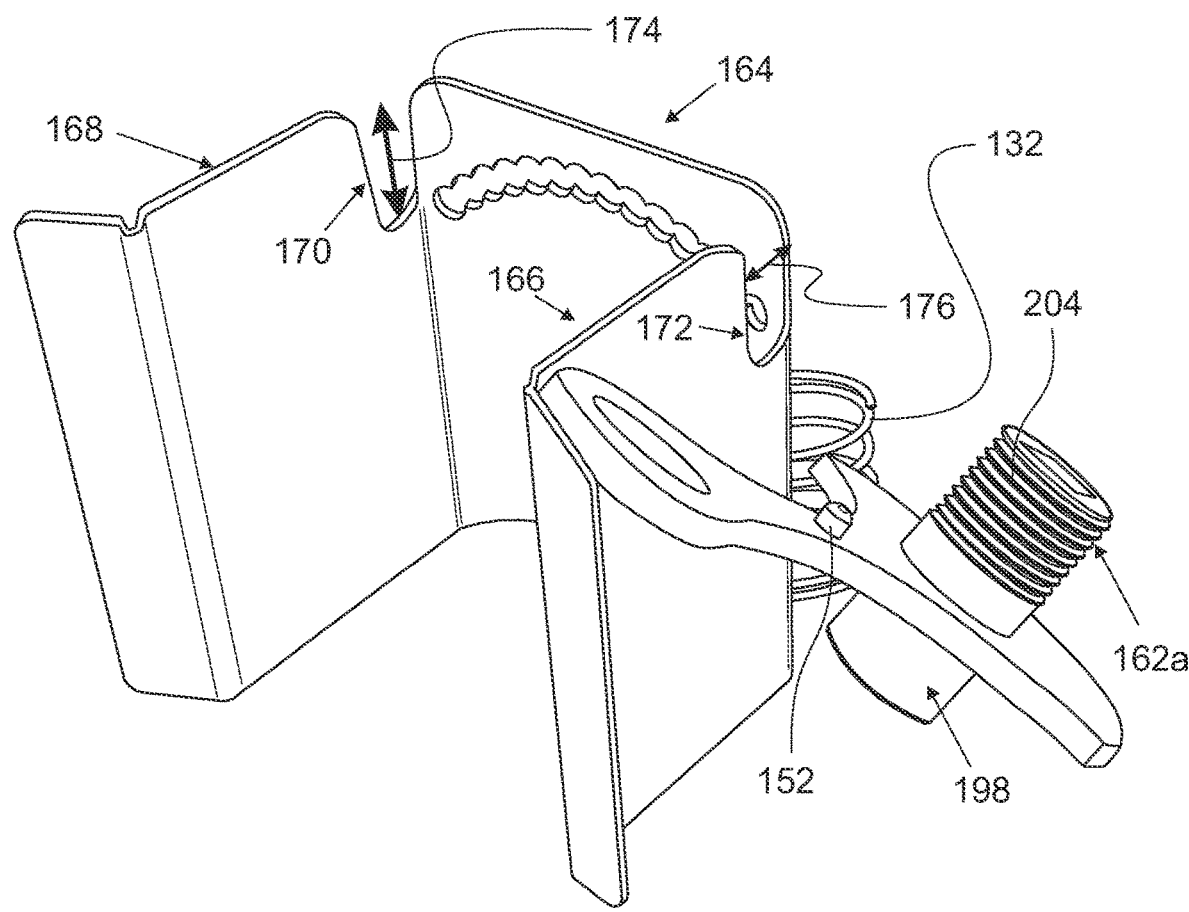

As illustrated in FIGS. 1A-1 to 5E, standoff regulator 100a is comprised of the adaptor in a form of bracket 122 that enables the components of standoff regulator 100a to be mounted on sleeve 108. A first side 164 of bracket 122 includes position-setting opening 140 that is optimized in granularity in terms of degrees of separation to provide all standardized degree settings for proper orientation of damper blade 104, such as 0°, 25°, 45°, 75°, 90°, etc. The number of degree settings may be varied. Accordingly, each position setting is a representative of a degree setting. For example, position-setting serration 146 (FIG. 5B) may represent 45° angle. Handle 102a set at this position (best shown in FIGS. 1B-1 to 1B-3) represents damper blade 104 at a 45° angle.

Position-setting opening 140 is comprised of an upper serrated edge 148 and a lower serrated edge 150 that define position-setting opening 140. Each concaved or curved portion defined by two lateral points (teeth) of serrated edges 148 and 150 represent an angular orientation (a degree) of damper blade 104.

The configuration of position-setting opening 140 is such that it functions as a "keeper" where it enables insertion and latching of a latch-index 152 within position-setting opening 140 while preventing lateral movement 126 (e.g., from an serration 142 to an adjacent serration 144). This way, handle 102a remains latched in relation to a single position-setting opening 140.

It should be noted that bracket 122 may instead, include a continuous (rather than a discrete) opening in a form of a continuous, smooth curved slit within which the latch-index 152 of handle 102a is moved, with slit having external markings for appropriate angular settings of damper blade 104 orientation. In other words, position-setting opening 140 need not be serrated, but may be smooth, curved slit instead.

Given adjustable coupler assembly 124a, handle 102a may be moved to any marked position (indicated along exterior side 184 of first side 164) and will, remain stationary at that position due to self-latching of the handle 102a with or without a serrated opening. That is, biasing mechanism 132 tension from adjustable coupler assembly 124a enables handle 102a to snap-back against interior side 154 of first side 164 (FIG. 5D) of bracket 122 in addition to being fixed at that position at a desired torque. Biasing mechanism 132 of adjustable coupler assembly 124a would hold and maintains the position of handle 102a at any position within the smooth non-serrated opening under tension (which is also quantifiably adjusted by coupler 136 of adjustable coupler assembly 124a) until handle 102a is tightened. Accordingly, the discrete position-setting openings 140 shown by serrations in all the figures may be optional and a continuous, non-serrated curved slit may be used instead.

As further illustrated, first side 164 of bracket 122 also includes a mounting opening 156 that enables mounting of handle 102a and adjustable coupler assembly 124a onto bracket 122 in addition to associating handle 102a and adjustable coupler assembly 124a with shaft 120 of damper blade assembly 118. Mounting opening 156 has diameter 158 that is slightly larger than an outer diameter 160a of engagement portion 162a of handle 102a that is inserted and secured within mounting opening 156. Larger diameter 158 of mounting opening 156 enables handle 102a to be adjustably associated with bracket 122 (as detailed in relation to FIGS. 4A to 4G), with handle 102a self-latching in relation to bracket 122 at a desired position.

Bracket 122 is further comprised of second and third lateral sides 166 and 168 that are used for connection with sleeve 108. Second and third lateral sides 166 and 168 near first side 164 have indentations 170 and 172 with height 174 and width 176 that function as reliefs to enable lateral movement 126 of handle 102a to extreme ends (0° and 90° damper orientations). Indentations 170 and 172 have sufficient height 174 and width 176 to receive and accommodate general upper mid-section 178a (FIG. 3E) of handle 102a, and have sufficient width 176 to enable actuation of handle 102a along path 128 while handle 102a is still positioned within indentations 170 and 172. Second and third lateral sides 166 and 168 further include extended bent connection ends 180 and 182 for connecting bracket 122 to sleeve 108 by welding, for example.

Handle 102a is comprised of single piece body rather than multiple components with no other parts that may fail or cause failure of handle 102a. Handle 102a includes a protuberance in a form of latch-index 152 (FIG. 5B) that may be any shape and need not be a protuberance or bulging as illustrated. Latch-index 152 latches, handle 102a at the desired position within a position-setting opening 140 while providing indexing information to indicate the angular position of handle 102a and damper blade 104. Latch-index 152 is located near general upper mid-section 178a of handle 102a and is an engagement, probe that is inserted into the desired position-setting opening 140 on bracket 122.

As further illustrated, handle 102a further includes an upper portion 179 (FIG. 5C) with an opening 181 for gripping handle 102a with fingers for adjusting position of handle 102a (best shown in FIGS. 3A to 4G). Further included with handle 102a is an attachment section 186 (defining a lower section or base of handle 102a) that includes engagement section 162a for mounting onto, bracket 122 and also accommodating adjustable coupler assembly 124a. Attachment section 186 is positioned at the lower end of handle 102a, and forms a "base" of handle 102a.

Attachment section 186 of handle 102a may comprise of any shape and should not be, limited to the semi-circular or "bell" silhouette configuration illustrated so long as attachment section 186 has a size with sufficient expanse that covers over mounting opening 156 of bracket 122.

As best illustrated in FIG. 1B-3, as air passes over damper 108, depending on rate of volume of air (CFM) being passed, damper 108 may vibrate back and forth as shown by arrows 217, with the vibration force experienced at engagement portion 162a (via shaft 120) as it includes distal end 206 of shaft 120, but with no mechanical advantage benefiting the translated force from damper blade 104 vibrations. The location of attachment section 186 and in particularly, engagement portion 162a at the base of handle 102a is advantageous in that it is at the point of application of vibration torque (distant=0) from shaft 120 (due to shaft 120 vibrations caused by damper blade 104 vibrations) and hence, there is no mechanical advantage translated from shaft 120 to attachment section 186 and hence, engagement portion 162a thereof.

Application of slight torque 134 on coupler 136 allows the self-latching operation to snap-back handle 102a against interior side 154 of first side 164 of bracket 122 (FIGS. 4B and 4D) and further tightening would simply fix or tightly secure, handle 102a at the desired position and hold strength while biasing mechanism 132 continuously dampens any vibrations experienced by handle 102a at the attachment point 162a with shaft. 102, with no mechanical advantage benefiting the translated force from damper blade 104 vibrations.

The base (or attachment section 186) of handle 102a includes engagement portion 162a, which is a first elongated hollow section comprised of a through-hole opening 188 with an inner width 190 (FIG. 5A) having an internal configuration index commensurate with cross-sectional profile of shaft 120 (generally polygonal, such as square) of damper blade assembly 118. It should be noted that the shaft may also have a non-polygonal (e.g., rounded) cross-sectional profile. First elongated hollow section or engagement portion 162a extends longitudinally (with length shown by arrow 192) through attachment section 186 of handle 102a, transverse a longitudinal axis 194a of handle 102a, and receives a distal end 206 of shaft 120.

As best illustrated in FIGS. 5D and 5E, first elongated hollow section (or engagement portion 162a) has threading 204 and extends from a first side 196 of attachment section 186 of handle 102a and allows mounting of adjustable coupler assembly 124a. A second elongated hollow section 198 extends from a second side 200a of attachment section 186 of handle 102a. Second elongated hollow section 198 extends longitudinally (as shown by arrow 202) through attachment section 186 of handle 102a, transverse a longitudinal axis 194a of handle 102a, and enables passage of distal end 206 of shaft 120. First and second sections 162a and 198 form through-hole opening 188.

In this non-limiting, exemplary instance, second elongated hollow section 198 (second side 200a of attachment section 186) includes a lateral opening 228a (e.g., FIG. 3G) for insertion of a fastener 230 in a form of a set screw, and end of which reaches and contacts a side of shaft 120 for reducing shaft vibrations at standoff 100a. It should be noted that the location of the opening 228a may be varied (as detailed below in relation to opening 228b).

The overall length 192 of first elongated hollow section or engagement portion 162a is sufficiently long to accommodate adjustable coupler assembly 124a and also, allow for potential variances in diameter 208 (FIG. 1A-3) of duct (or sleeve) 108 (detailed below). This way, the extended length 192 of first elongated hollow portion 162a would still continuously support shaft 120, providing greater tolerances for potential variances in diameter 208 of sleeve 108 due to pressure variances. That is, due to variations in air pressure caused by airflow 106 through sleeve 108, its body may flex and collapse (as shown by arrows 212) towards (and perpendicular to) longitudinal axis 210 of shaft 120 of damper blade assembly 124a, dynamically lengthening, diameter 208 parallel along shaft axis 210. This change in diameter length 208 in one direction would generate regular oval (e.g., an ellipse) configuration. This would cause shaft 120 to slip or pop off of at least one shaft attachment opening 214 of sleeve 108 due to diameter length 208 of damper sleeve 108 becoming greater than the overall length 216 (FIG. 1B-3) of shaft 120 when damper sleeve 108 is under airflow pressure. Accordingly, handle attachment section (and in particular, elongated hollow portion 162a) is provided with sufficient depth structure (length 192) to allow for flexing or collapsing tolerances (dynamically changing diameter 208) of the duct so that shaft 120 cannot pop off duct 108. In other words, first section 162a of attachment point extend from first side 196 of handle 102a to a point to fully compensate for any potential variations in diameter length 208 of duct 108 in relation to shaft 120 so that shaft 120 will no longer pop off duct 108.

As further illustrated, standoff regulator 100a further includes adjustable coupler assembly 124a that allows handle 102a to self-latch at the desired position as well as at a desired quantifiable torque in relation to bracket 122. Adjustable coupler assembly 124a is comprised of biasing mechanism 132, a well known coupler in a form of fastener 136, and (optional, but preferable) a well known flat washer 137 that adjustably secures basing mechanism 132 onto engagement portion 162a of handle 102a at the desired quantifiable torque in relation to bracket 122.

Biasing mechanism 132 may comprise of a resilient member in a form of non-limiting, exemplary spring as shown. In general, biasing mechanism 132 dampens potential external vibrations experienced at engagement portion 162a of handle 102a and thereby, prevents handle 102a from becoming loose.

It should be noted that spring failure is also substantially reduced (increasing spring life) when fastener 136 is tightened to a point where spring 132 is compressed. The advantage of having both biasing mechanism 132 and a torque applicator such as the non-limiting, exemplary illustrated fastener 136 is that both self-latch and fix position functions may be tightened at a desired quantifiable torque in relation to bracket 122.

Figures 1, 6A:
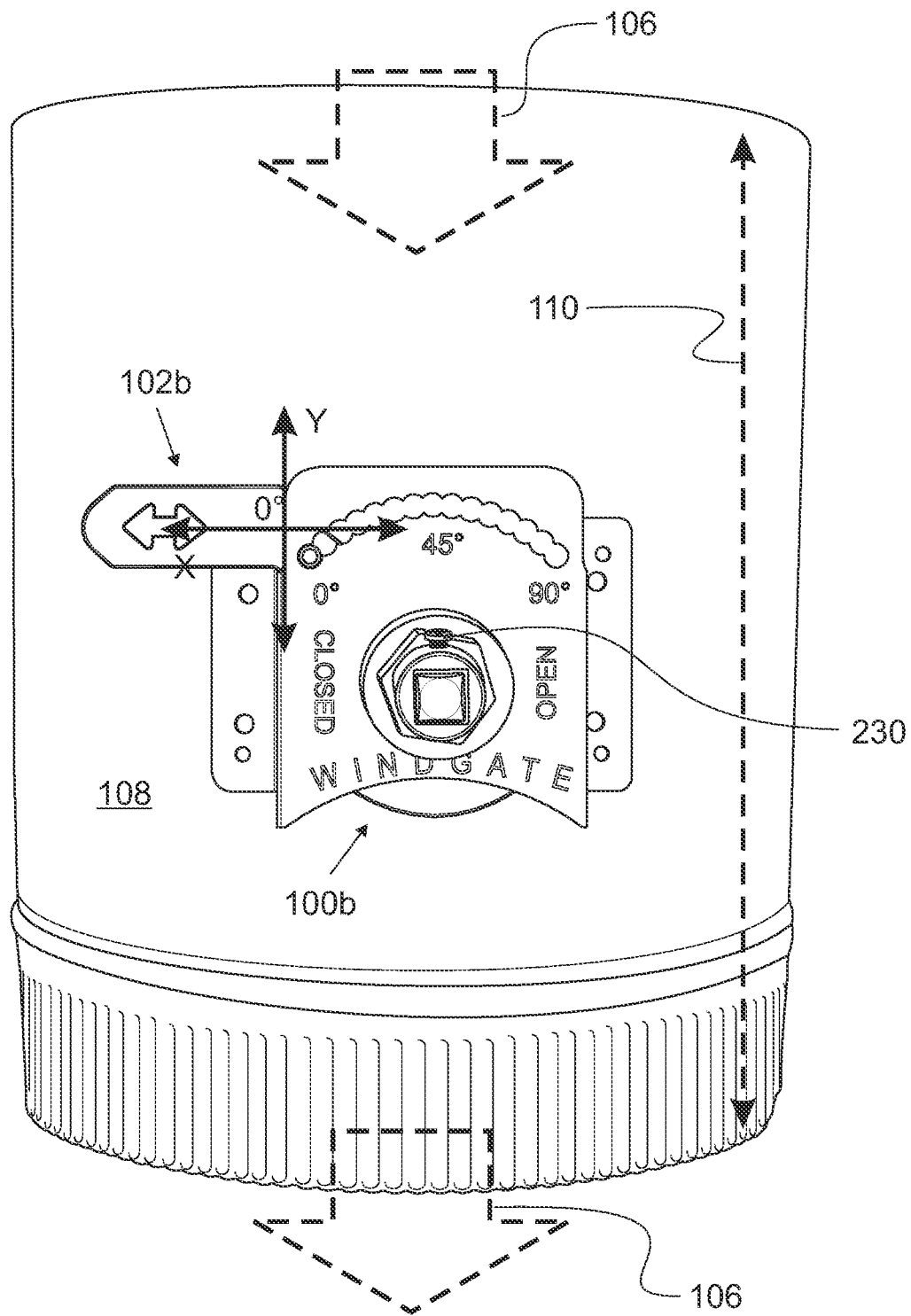
Figures 2, 6A:
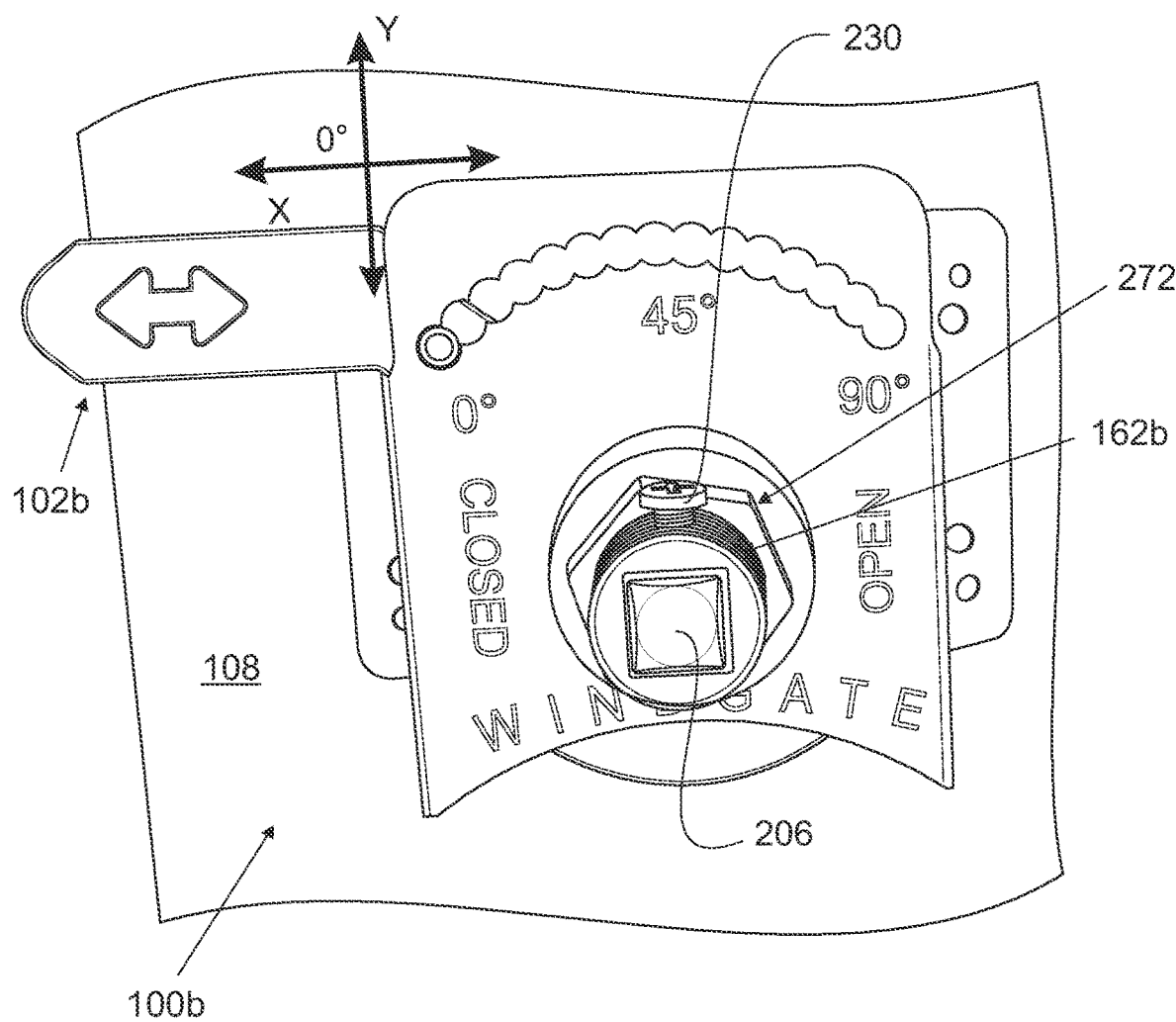
Figures 3, 6A:
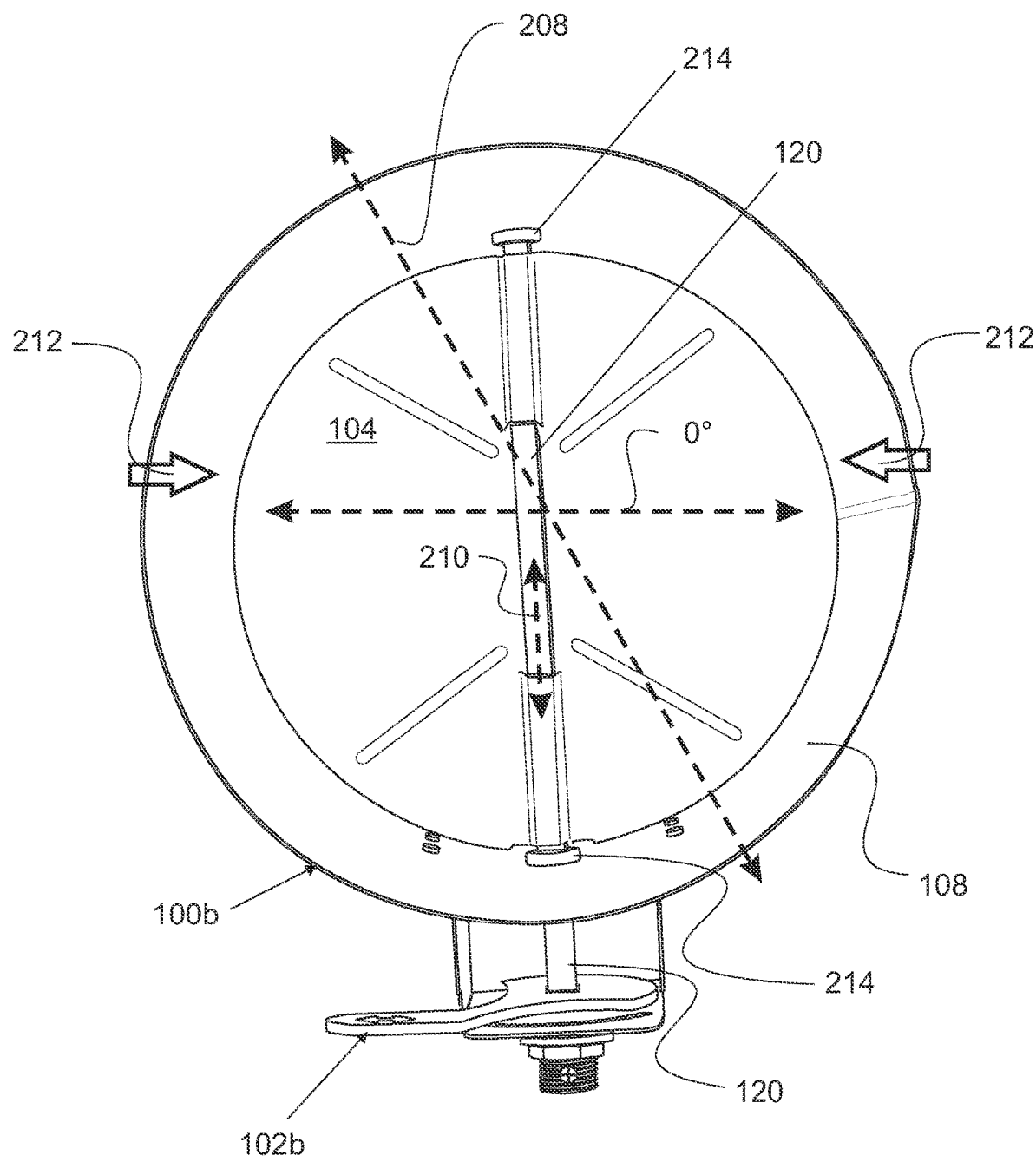
Figure 9A:
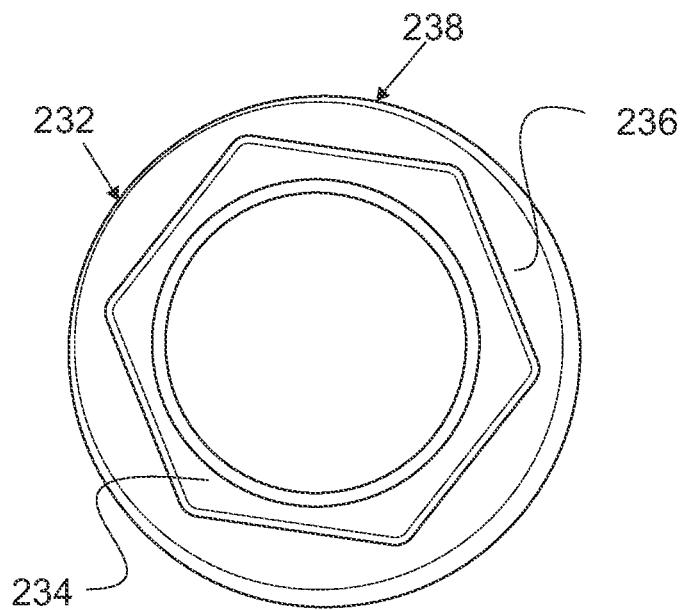
Figure 9B:
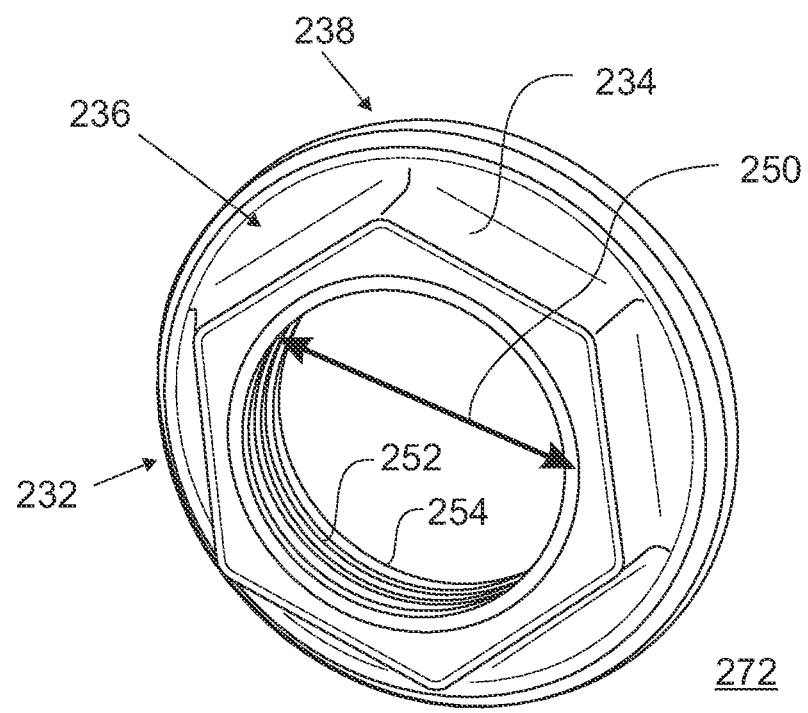
Figure 9C:
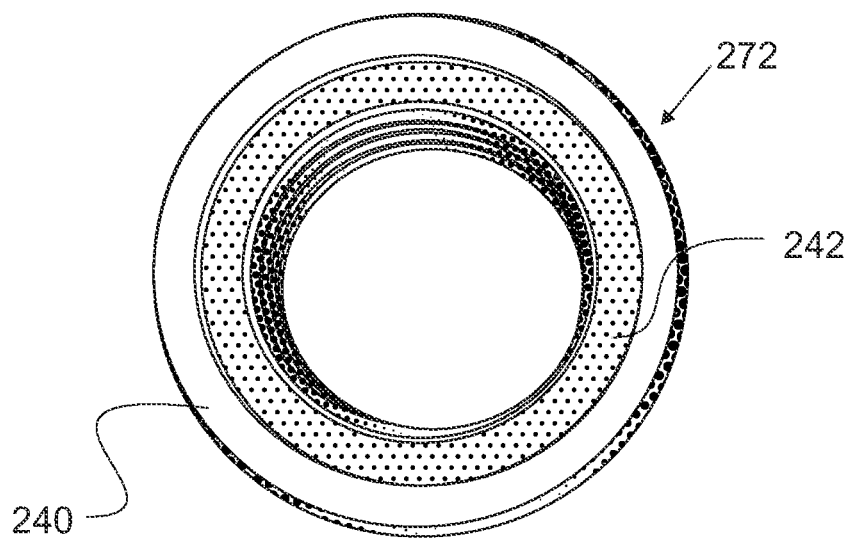
Figure 9D:
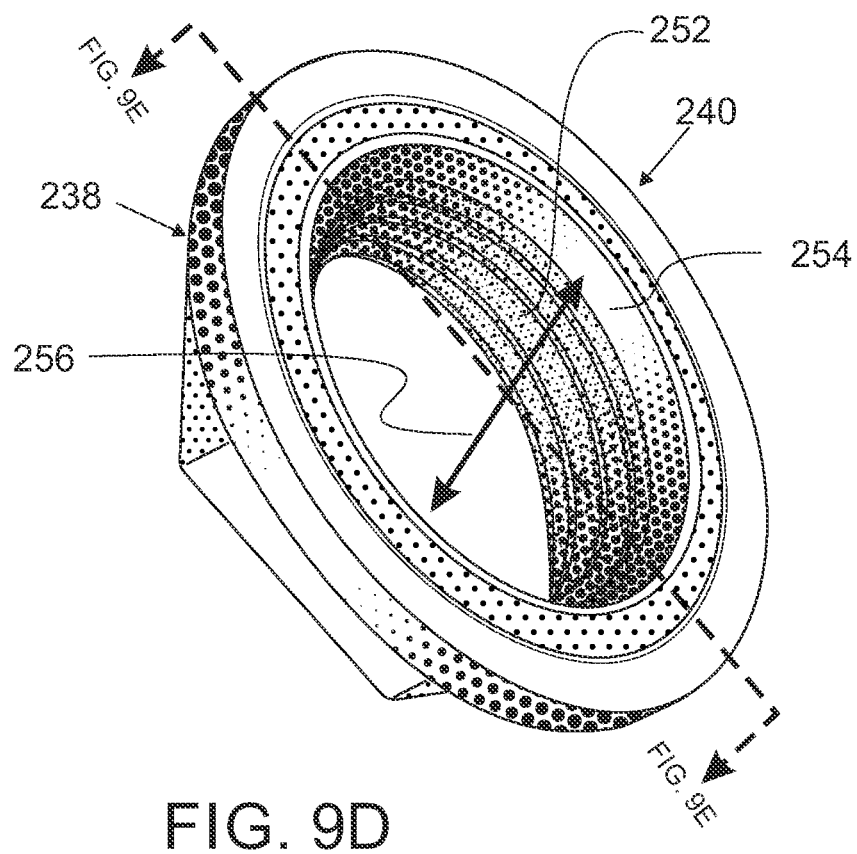
Figure 9E:
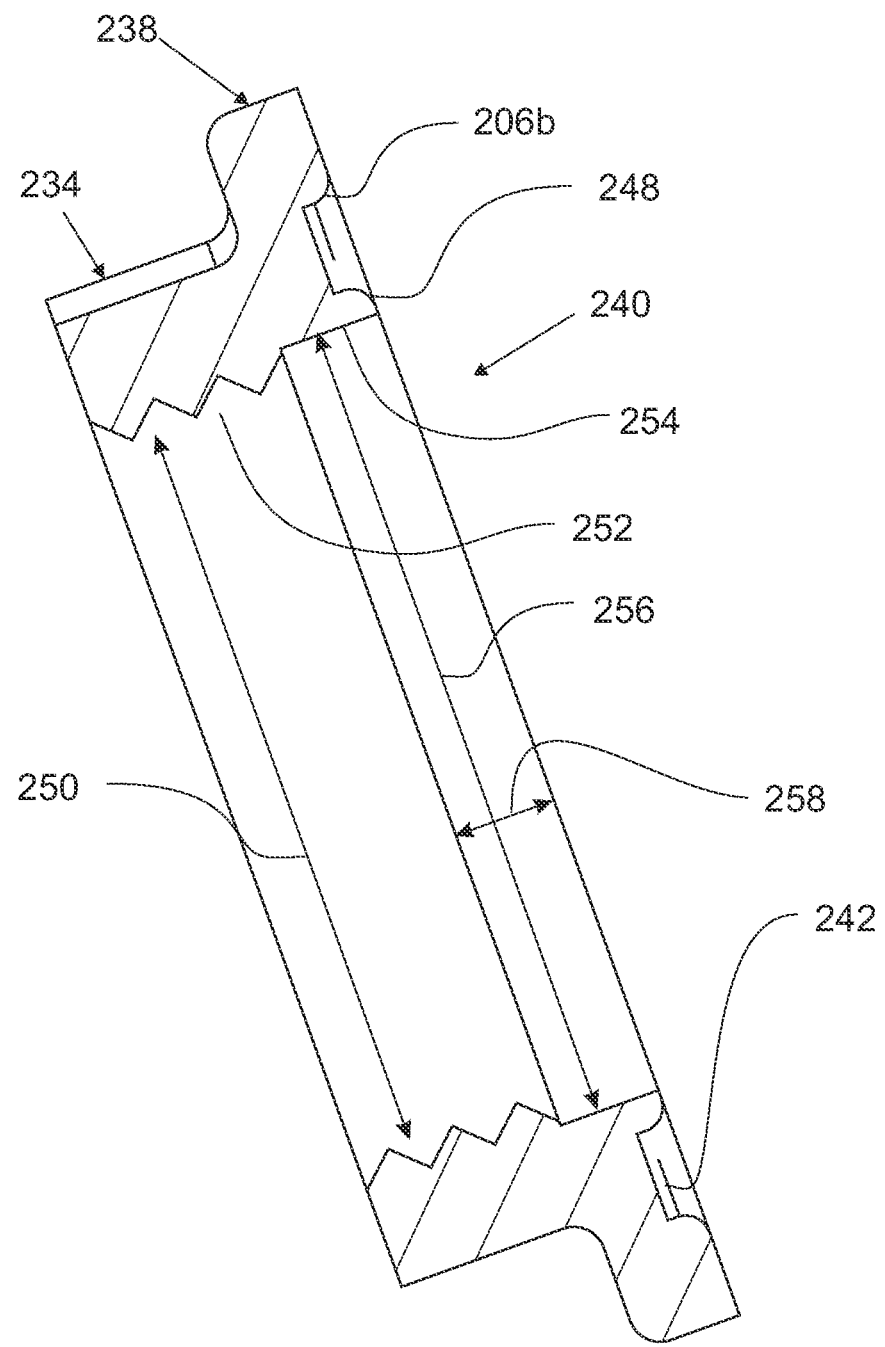
Figure 9F:
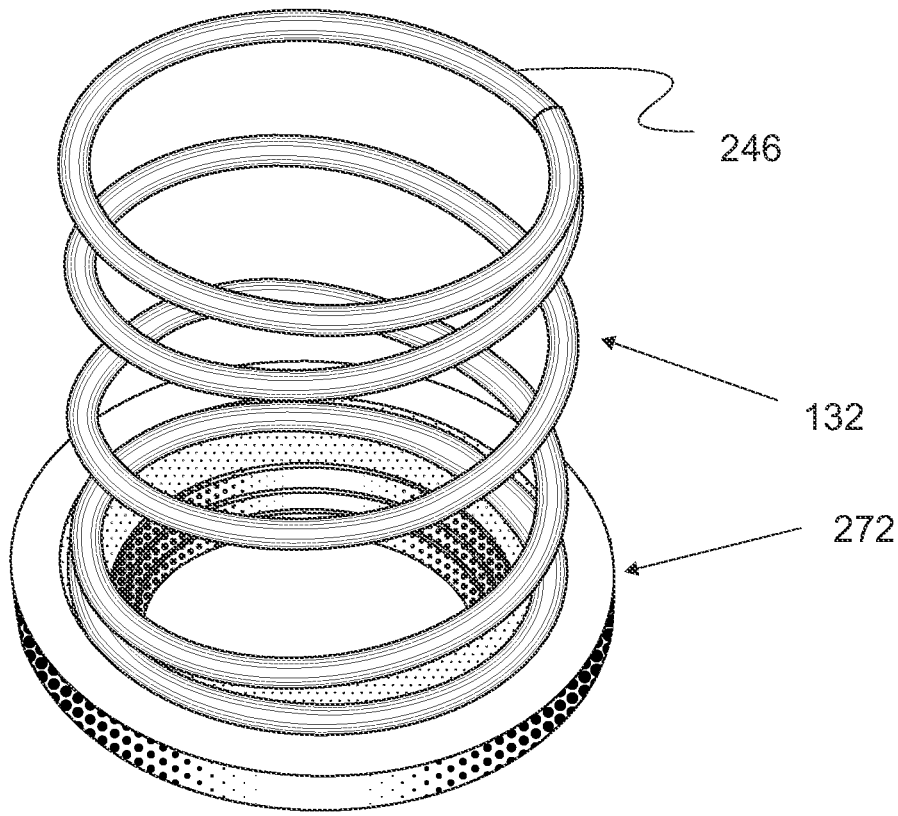
Figure 9G:
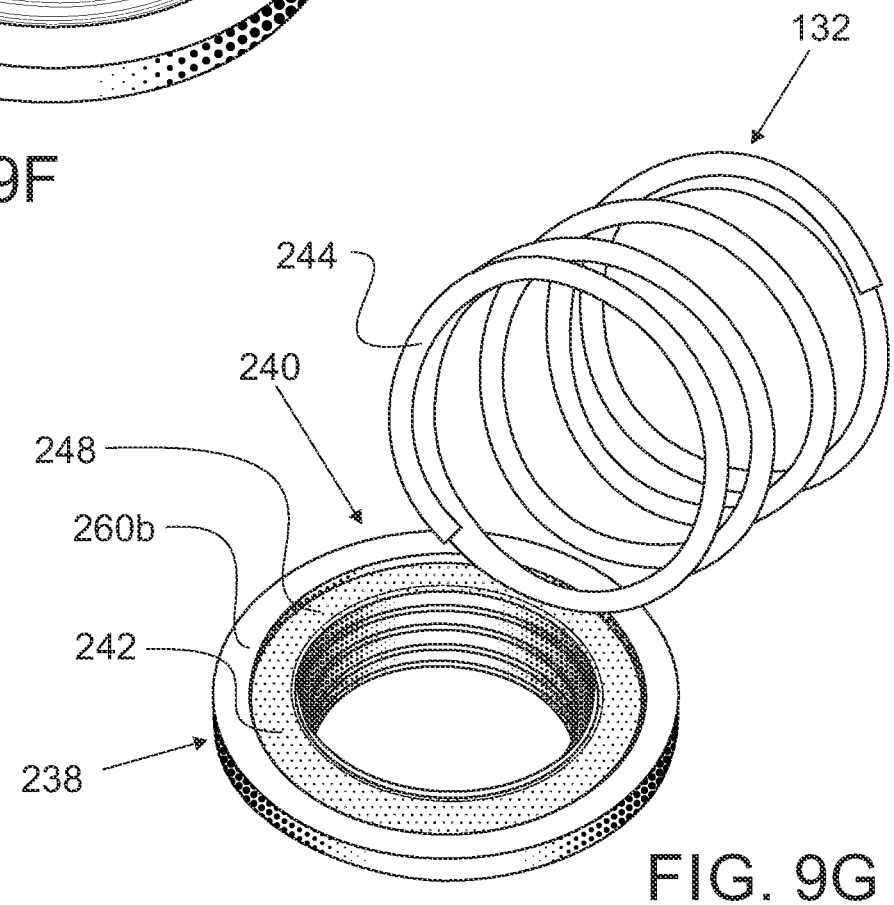
Figure 10A:
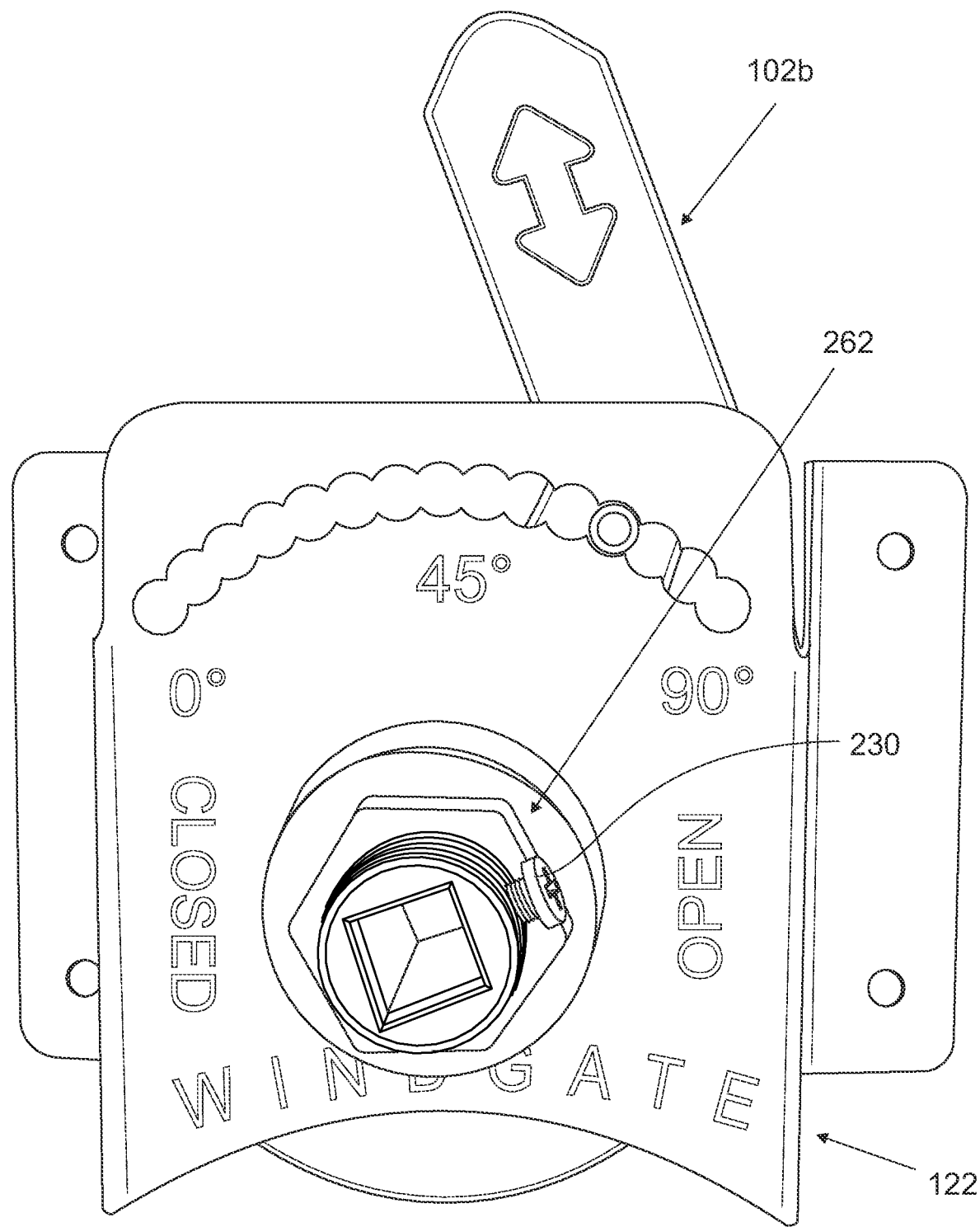
FIGS. 10A to 11D are non-limiting, exemplary illustrations of a standoff with a different coupler in accordance with one or more embodiments of the present invention.
Figure 10B:
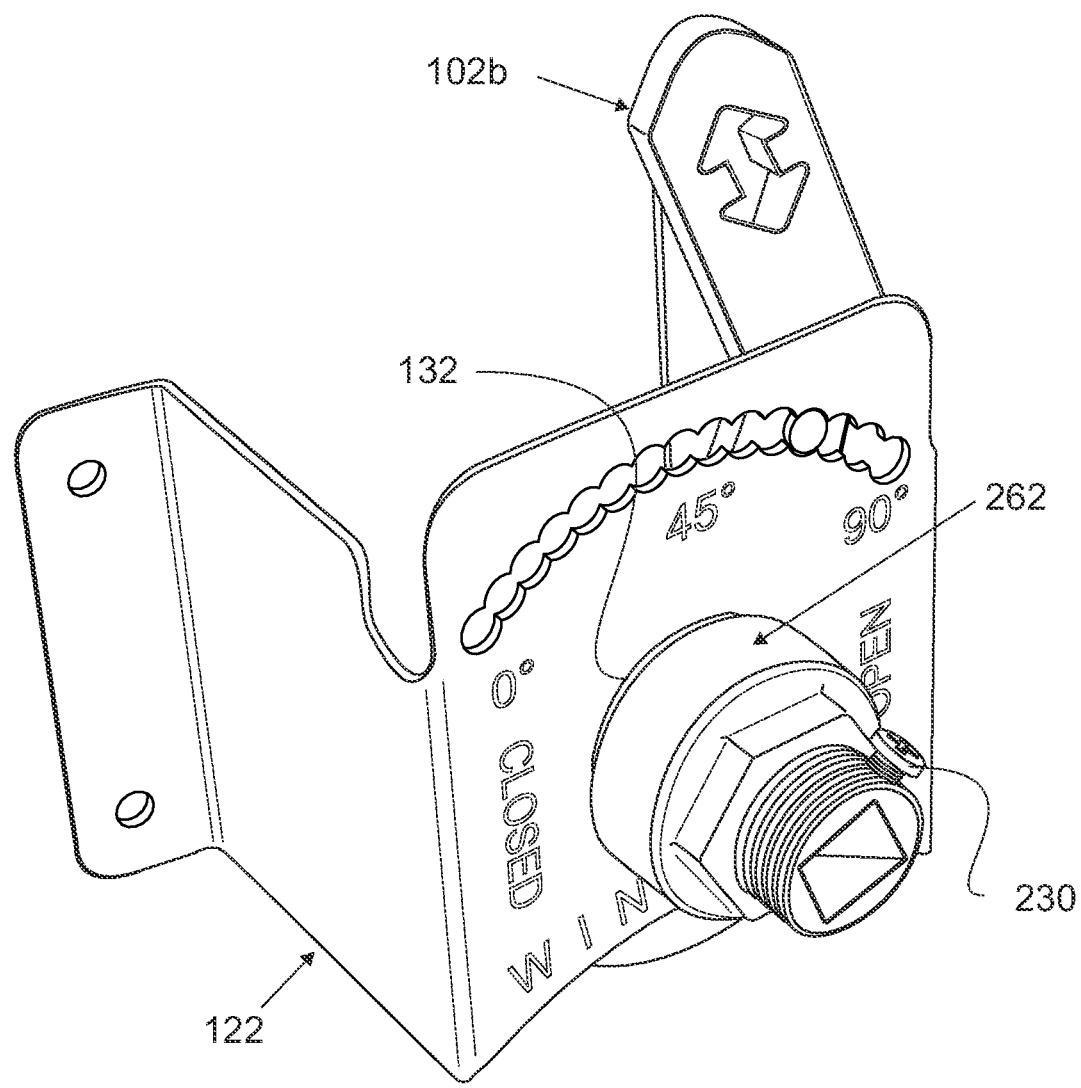
Figure 10C:
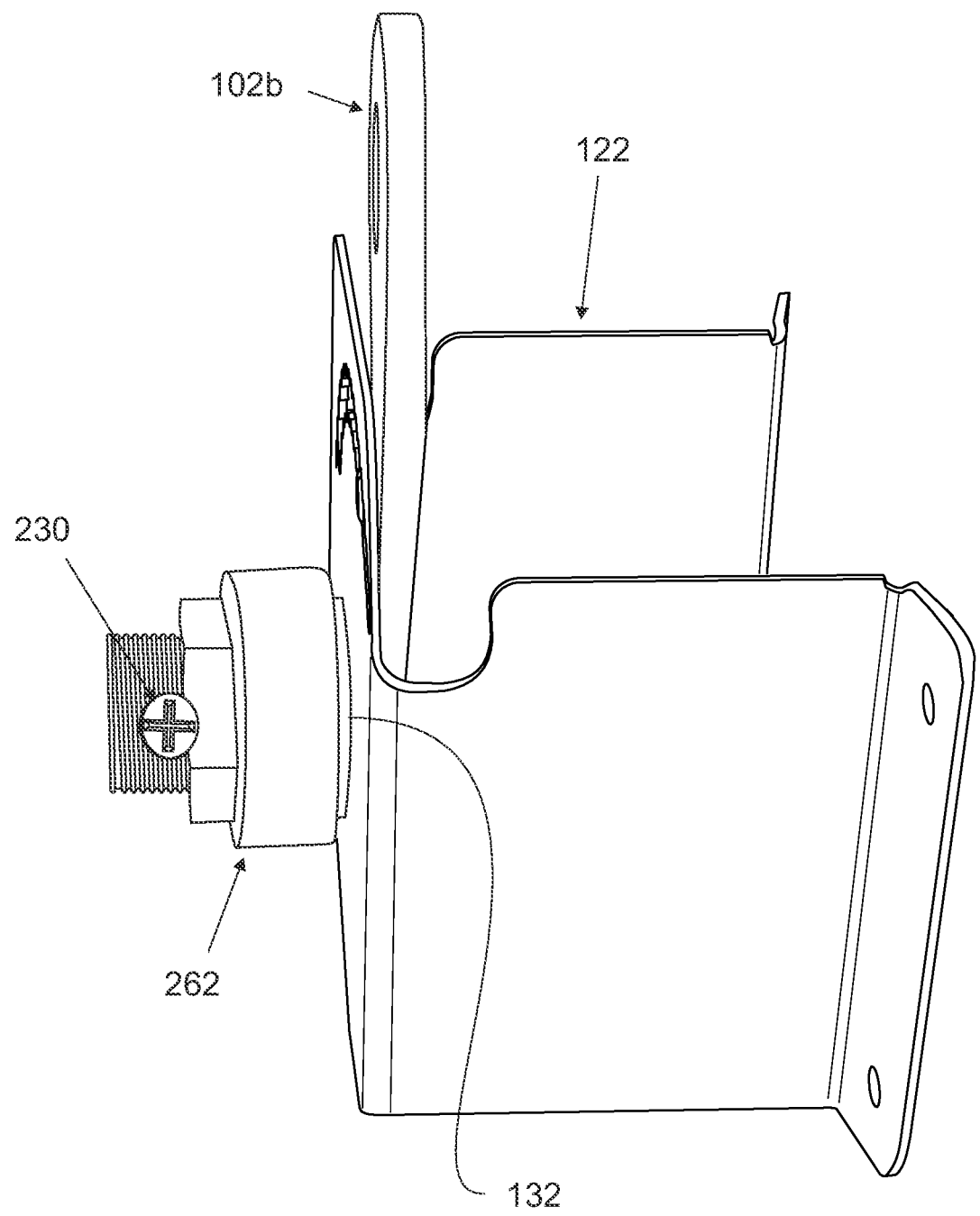
Figure 11A:
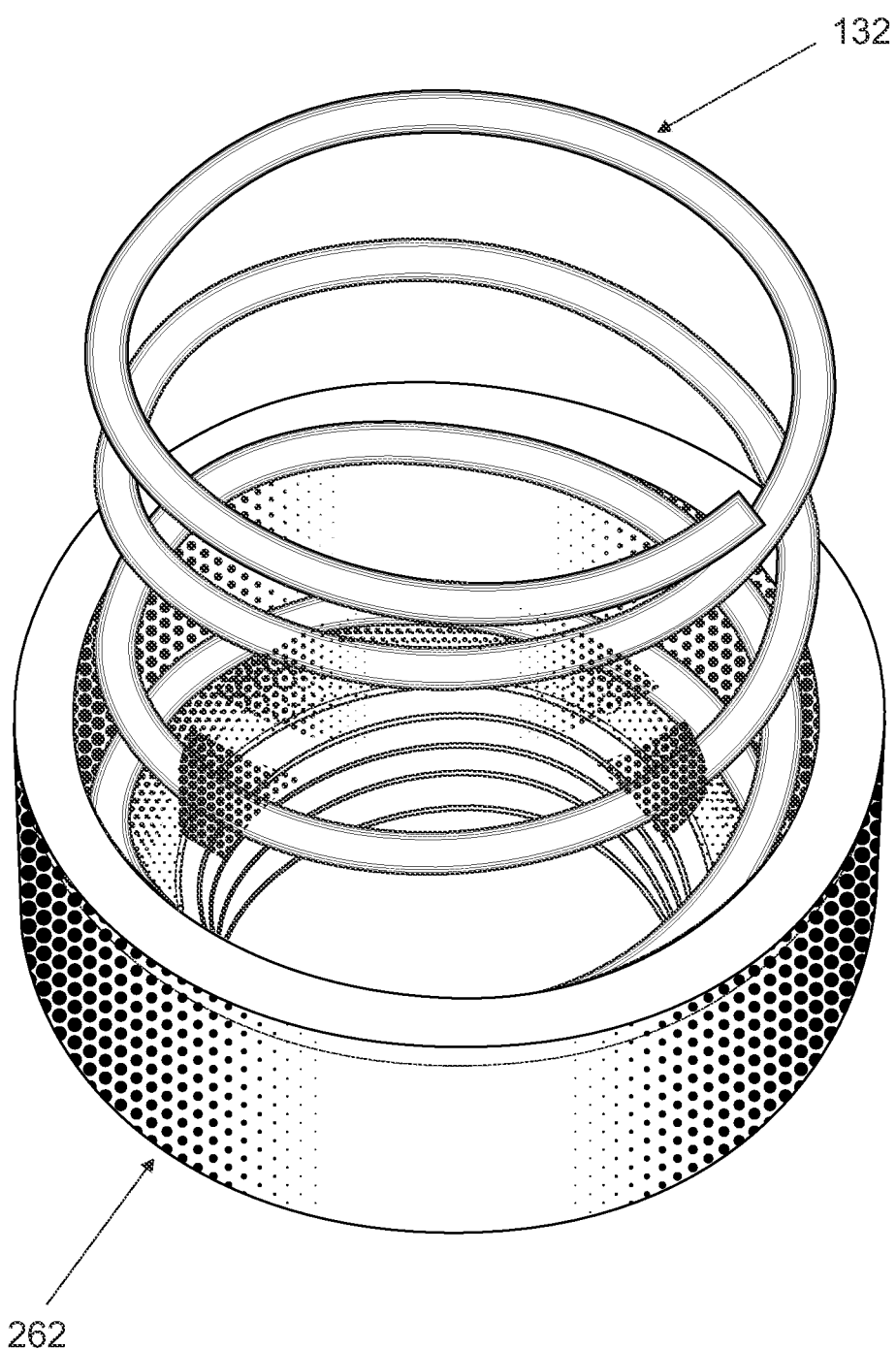

FIGS. 6A-1 to 9G are non-limiting, exemplary illustrations of a standoff with a different handle and a coupler in accordance with one or more embodiments of the present invention. The standoff 100b illustrated in FIGS. 6A-1 to 9G includes similar corresponding or equivalent components, interconnections, functional, operational, and or cooperative relationships as standoff 100a that is shown, in FIGS. 1A-1 to 5E, and described above. Therefore, for the sake of brevity, clarity, convenience, and to avoid duplication, the general description of FIGS. 6A-1 to 9G will not repeat every corresponding or equivalent component, interconnections, functional, operational, and or cooperative relationships that has already been described above in relation to standoff 100a that is shown in FIGS. 1A-1 to 5E but instead, are incorporated by reference herein.

Figures 1, 6B:
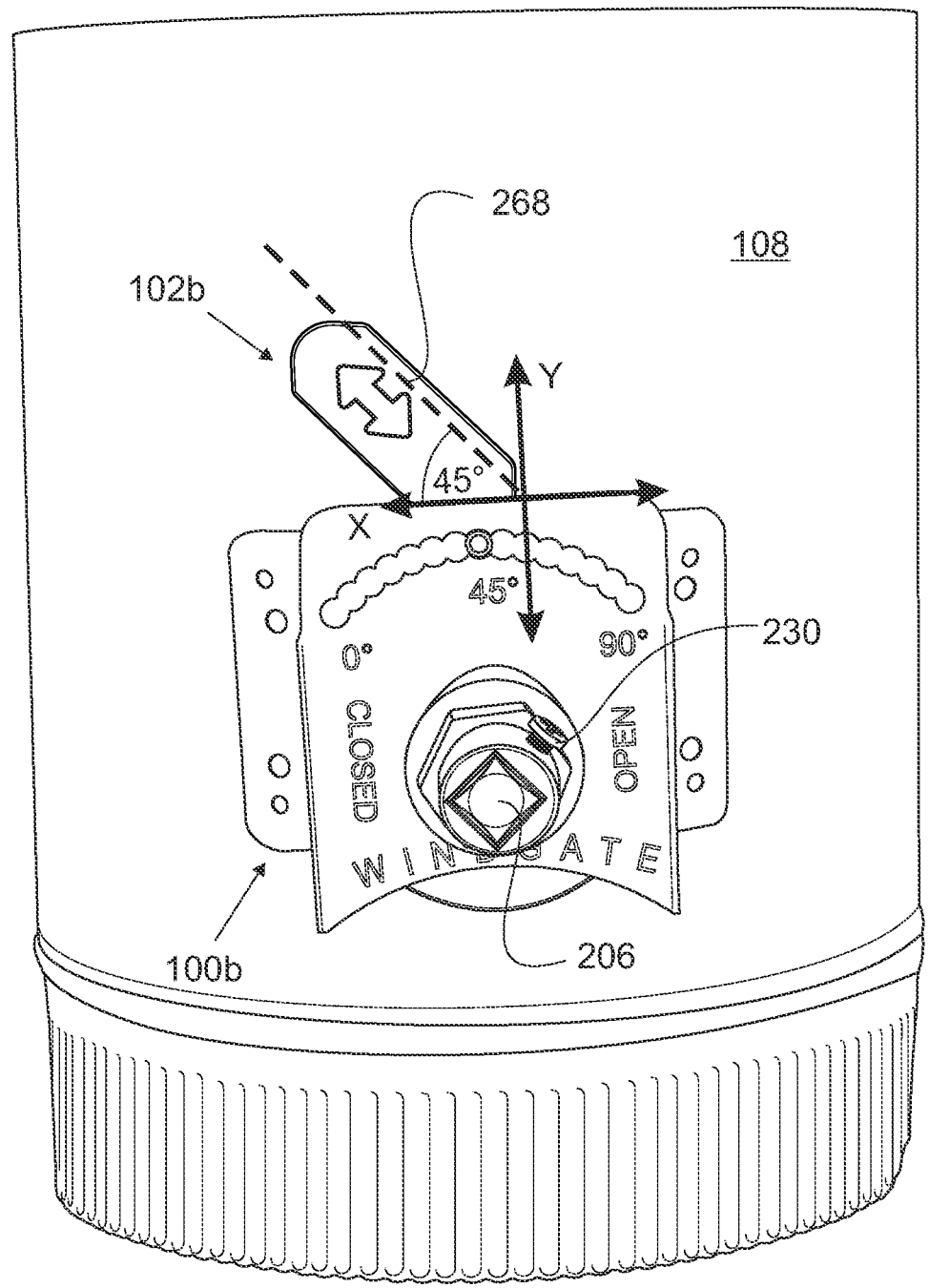
Figures 2, 6B:
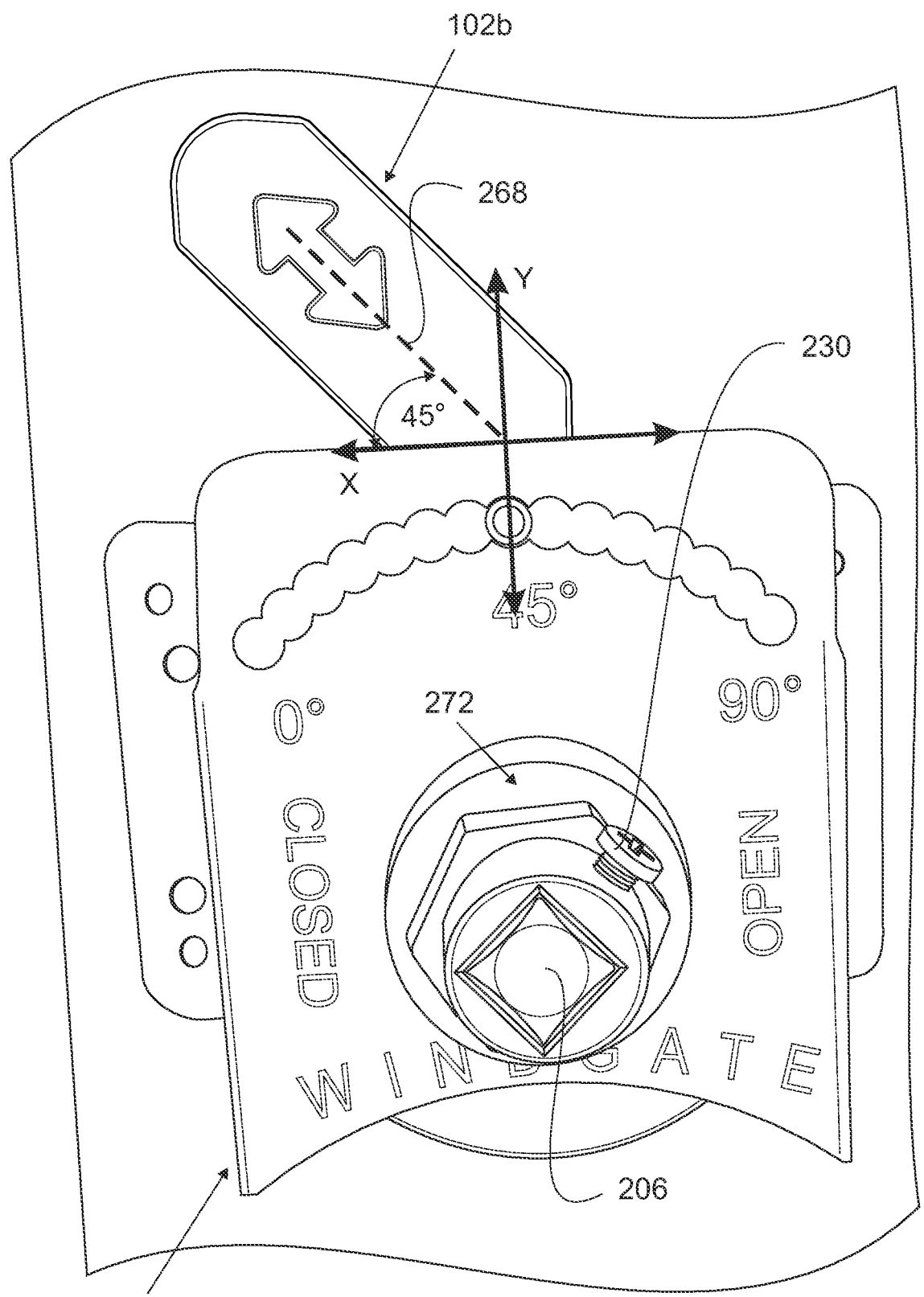
Figures 3, 6B:
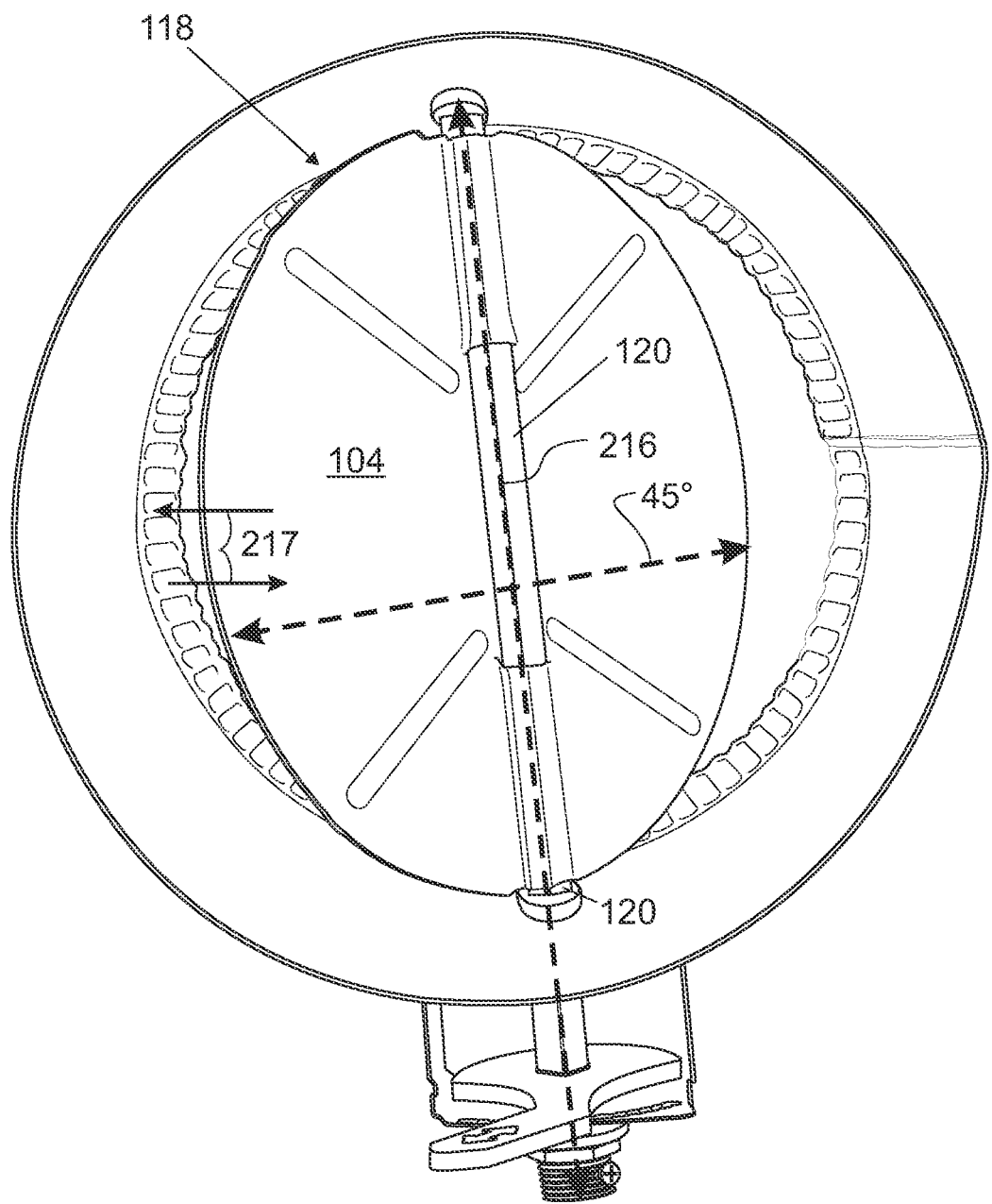
Figures 1, 6C:
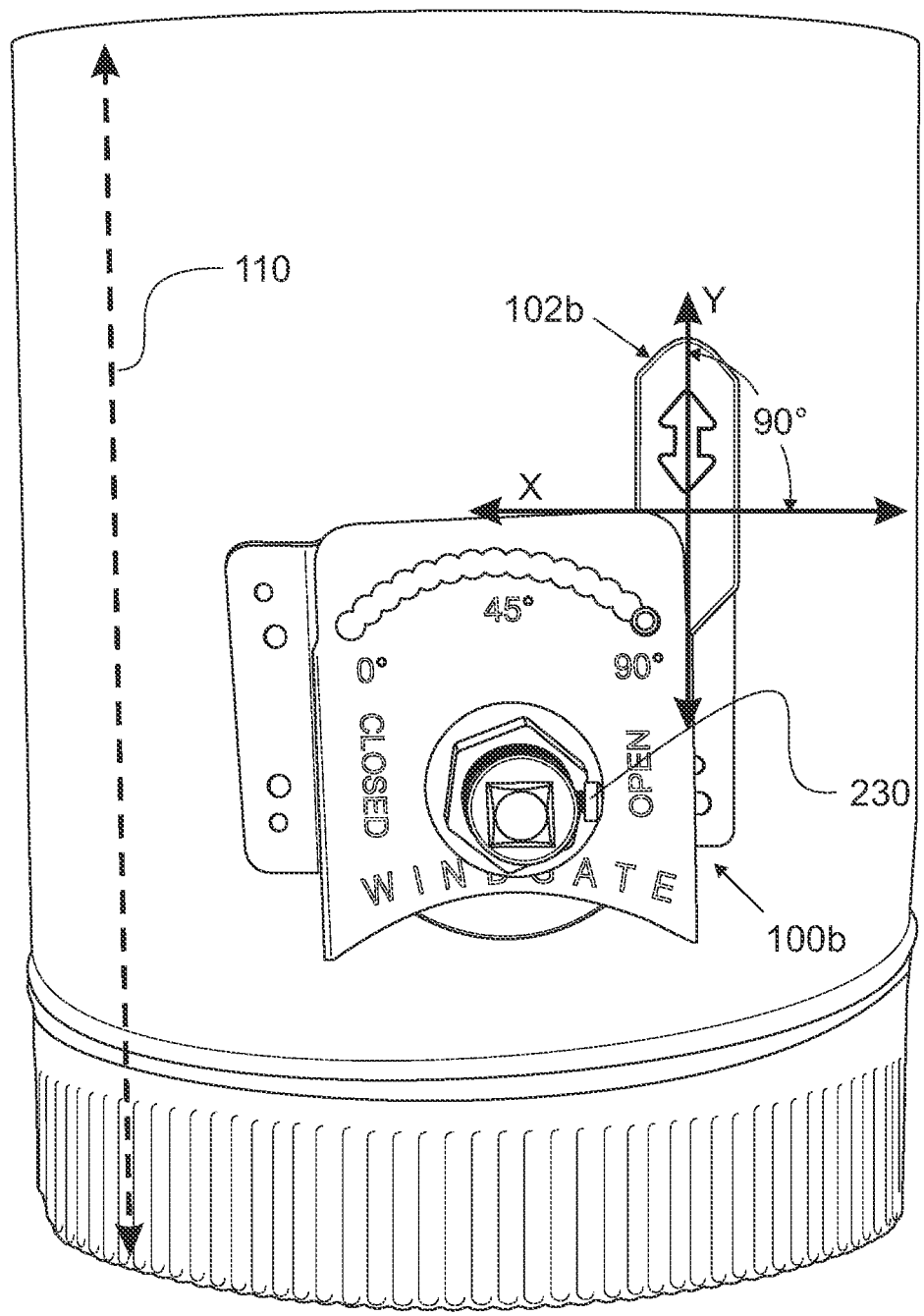
Figures 2, 6C:
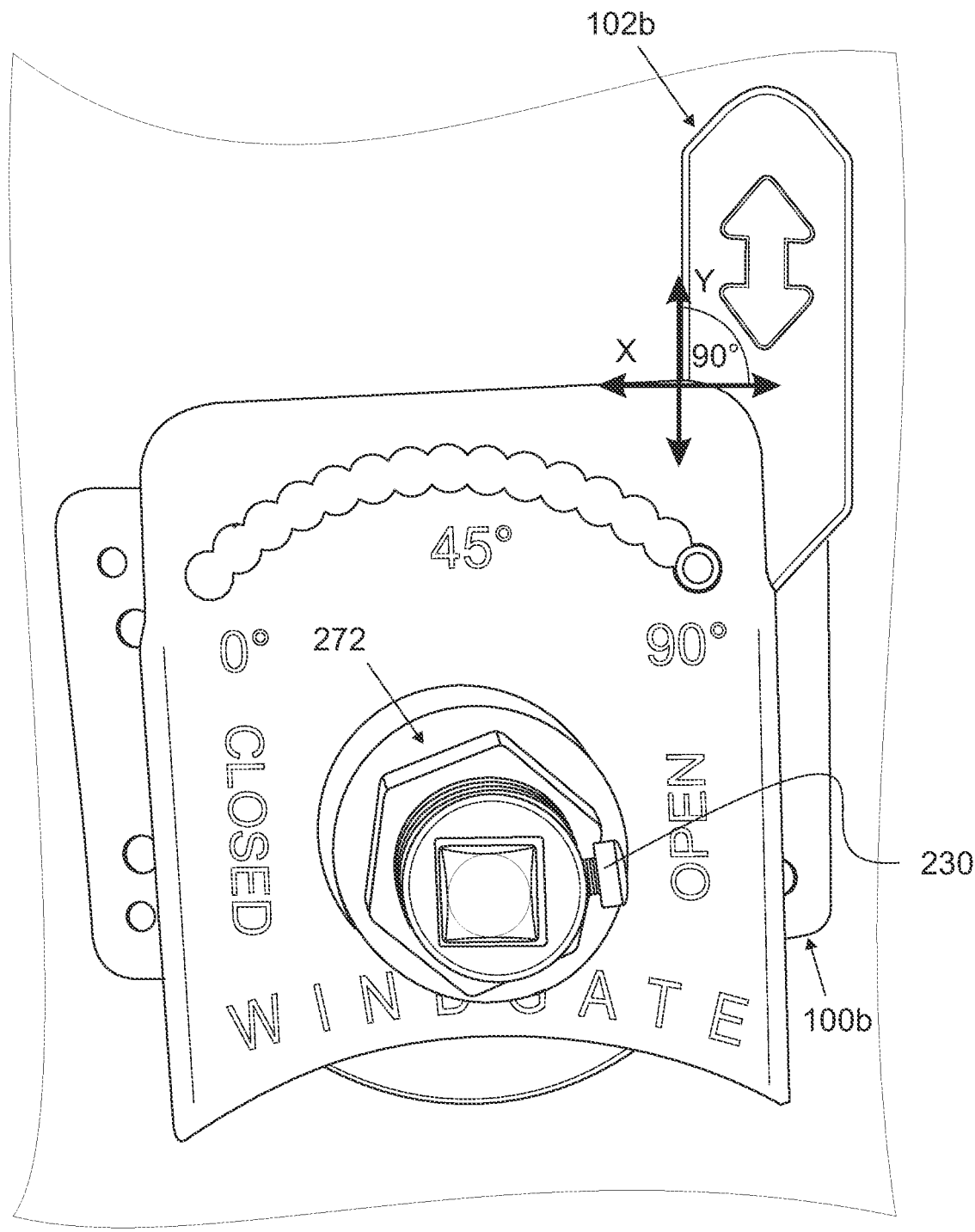
Figures 3, 6C:
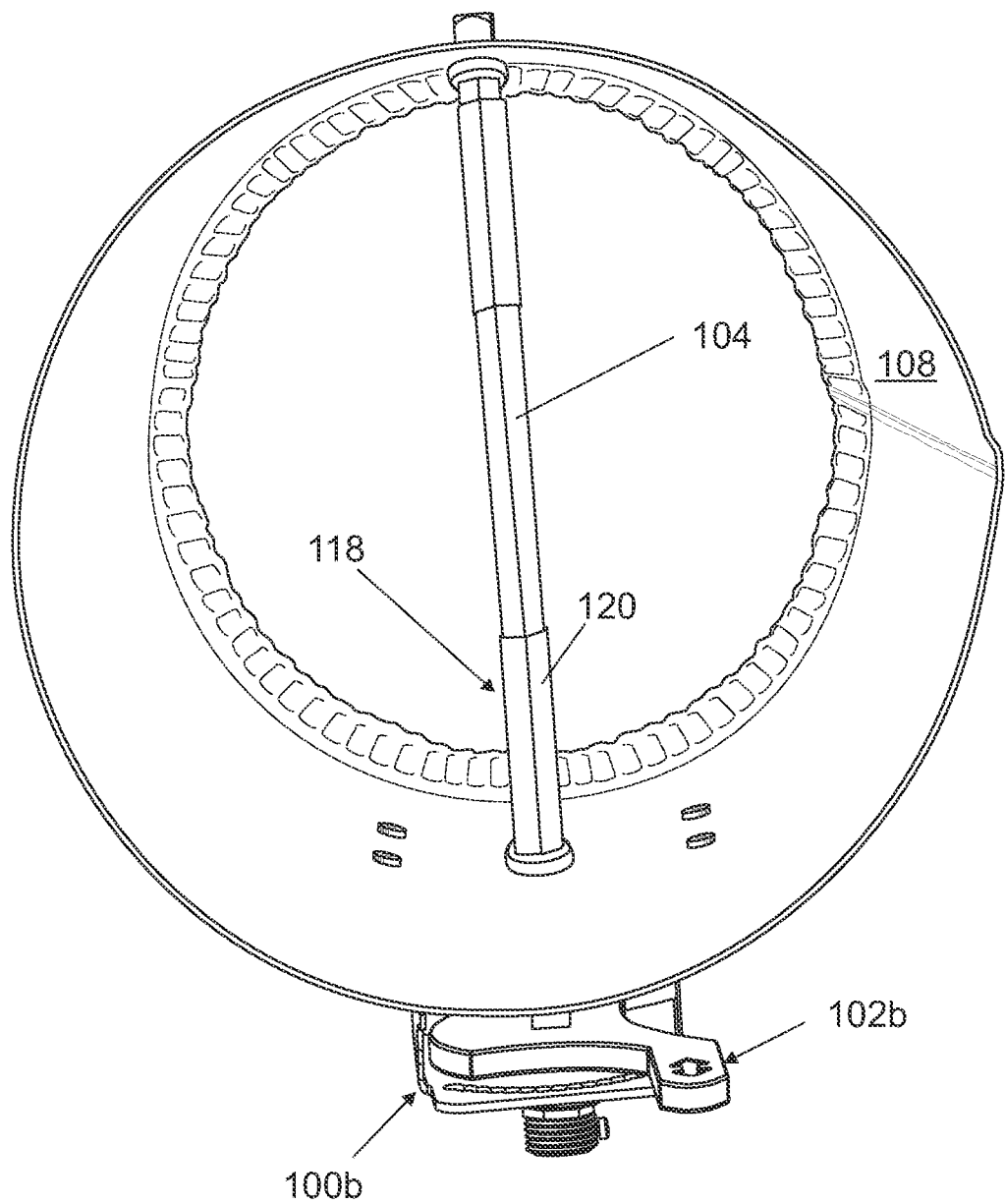

FIGS. 6A-1 to 6C-3 are non-limiting, exemplary illustrations of various views of a standoff regulator mounted on a damper sleeve in accordance with one or more embodiments of the present invention. FIGS. 6A-1 to 6C-3 progressively illustrate a movement of a handle 102b of standoff regulator 100b to move damper blade 104 in various corresponding views from a closed position (FIGS. 6A-1 to 6A-3) that close-off airflow 106 through sleeve 108, to a fully open position (FIGS. 6C-1 to 6C-3).

FIGS. 6A-1 to 6A-3 are various views of standoff regulator 100b and damper blade 104 in a fully closed position (plane of damper blade 104 and hence, damper blade 104 itself is oriented at 0° angle) in accordance with one or more embodiments of the present invention. In other words, when fully closed, damper blade 104 is oriented perpendicular central longitudinal axis 110 of sleeve 108 (FIG. 6A-3). In this non-limiting, exemplary embodiment, when damper blade 104 is at 0° and fully closed, handle 102b is oriented also at 0° as shown in FIGS. 6A-1 and 6A-2 where X-axis is superimposed on part of handle 102b.

FIGS. 6B-1 to 6B-3 are various views of standoff regulator 100b and damper blade 104, with damper blade 104 partially open and oriented at about 45° angle (as shown by line 268) in accordance with one or more embodiments of the present invention. That is when partially open, plane of damper blade 104 and hence, damper blade 104 itself is oriented at 45° angle (FIG. 6B-3) in relation to central longitudinal axis 110 of sleeve 108. In this non-limiting, exemplary embodiment, when damper blade 104 is at 45° and partially closed (or partially open), handle 102b is also oriented at 45° (between 0° and 90°) as best shown in FIGS. 6B-1 and 6B-2 where line 268 is superimposed on part of handle 102b.

FIGS. 6C-1 to 6C-3 are various views of standoff regulator 100b and damper blade 104 in a fully open position (damper at 90° angle) in accordance with one or more embodiments of the present invention. In other words, when fully open, plane of damper blade 104 and hence, damper blade 104 itself is oriented at 90° angle (FIG. 6C-3), parallel central longitudinal axis 110 of sleeve 108. In this non-limiting, exemplary embodiment, when damper blade 104 is at 90° and fully open, handle 102b is oriented at 90° (opposite the fully closed side of bracket 122) as best shown by Y-axis superimposed on part of handle 102b in FIGS. 6C-1 and 6C-2.

In particular, FIGS. 6A-1, 6B-1, 6C-1 exemplarily illustrate from a perspective front view the progressive movement and position-setting of handle 102b of standoff regulator 100b from a fully closed position damper blade 104 orientation (FIG. 6A-1) to a fully open position damper blade 104 orientation (FIG. 6C-1).

FIGS. 6A-2, 6B-2, 6C-2 are close-up views of standoff 100b of FIGS. 6A-1, 6B-1, 6C-1 and are used to exemplary illustrate the progressive movement and position-setting of handle 102b of standoff regulator 100b in the exact corresponding opening positions shown in the perspective, front views of FIGS. 6A-1, 6B-1, 6C-1, from a fully closed position (FIG. 6A-2) to a fully open position (FIG. 6C-2).

Figure 7A:
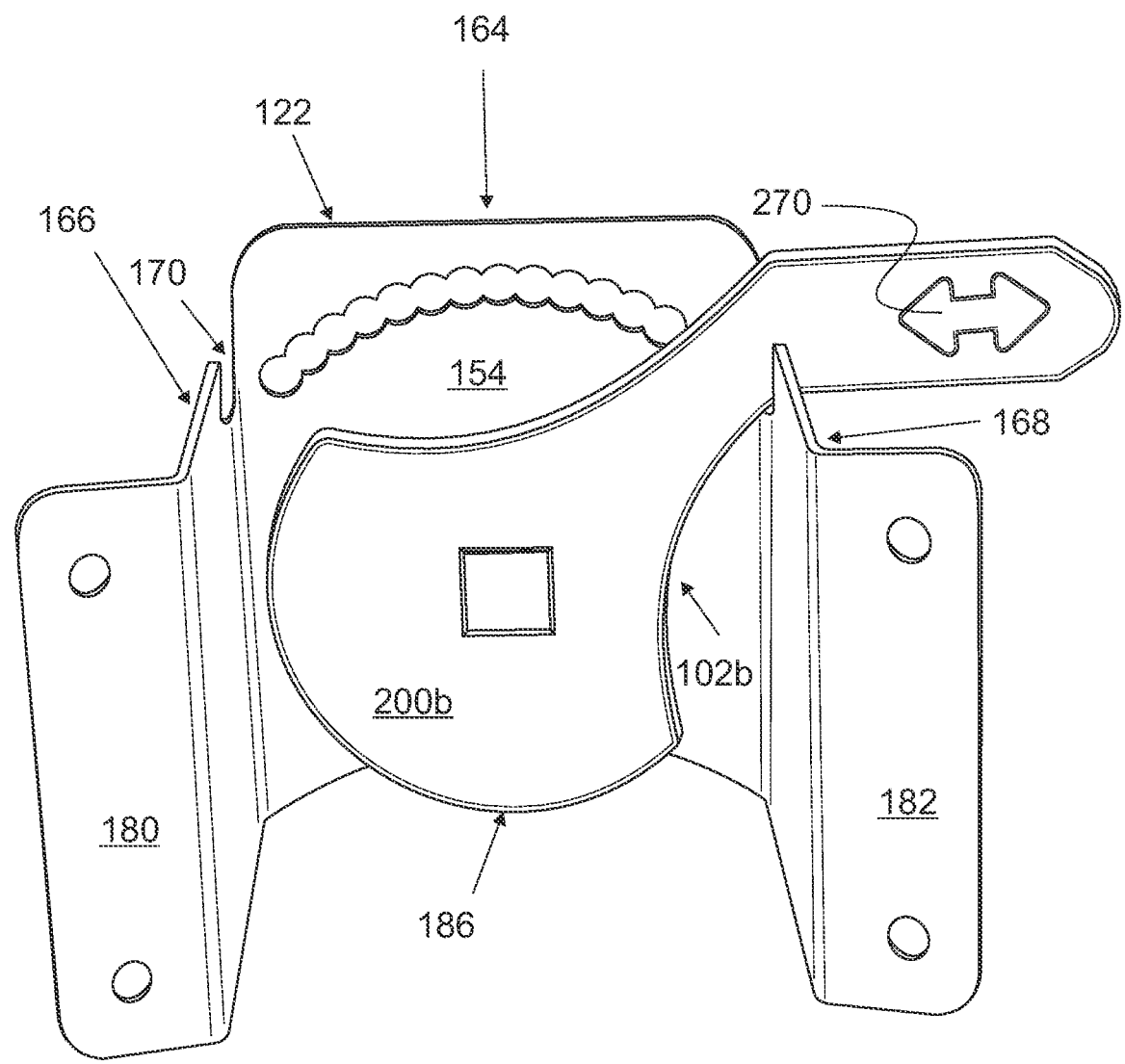
FIGS. 7A to 7C are non-limiting, exemplary back or interior facing side views of standoff in accordance with one or more embodiments of the present invention from a fully closed position (FIG. 7A) to fully open position (FIG. 7C)
Figure 7B:
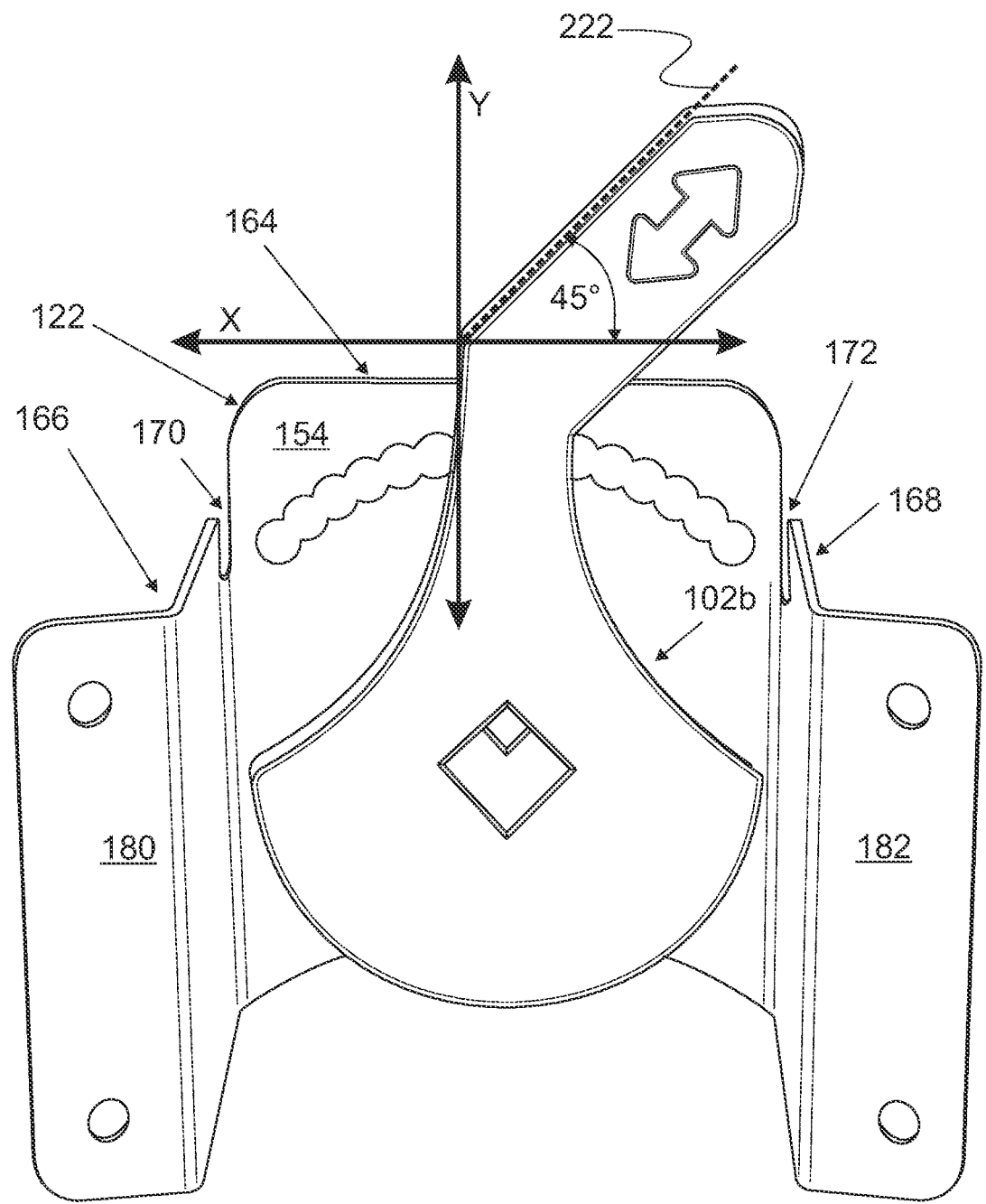
Figure 7C:
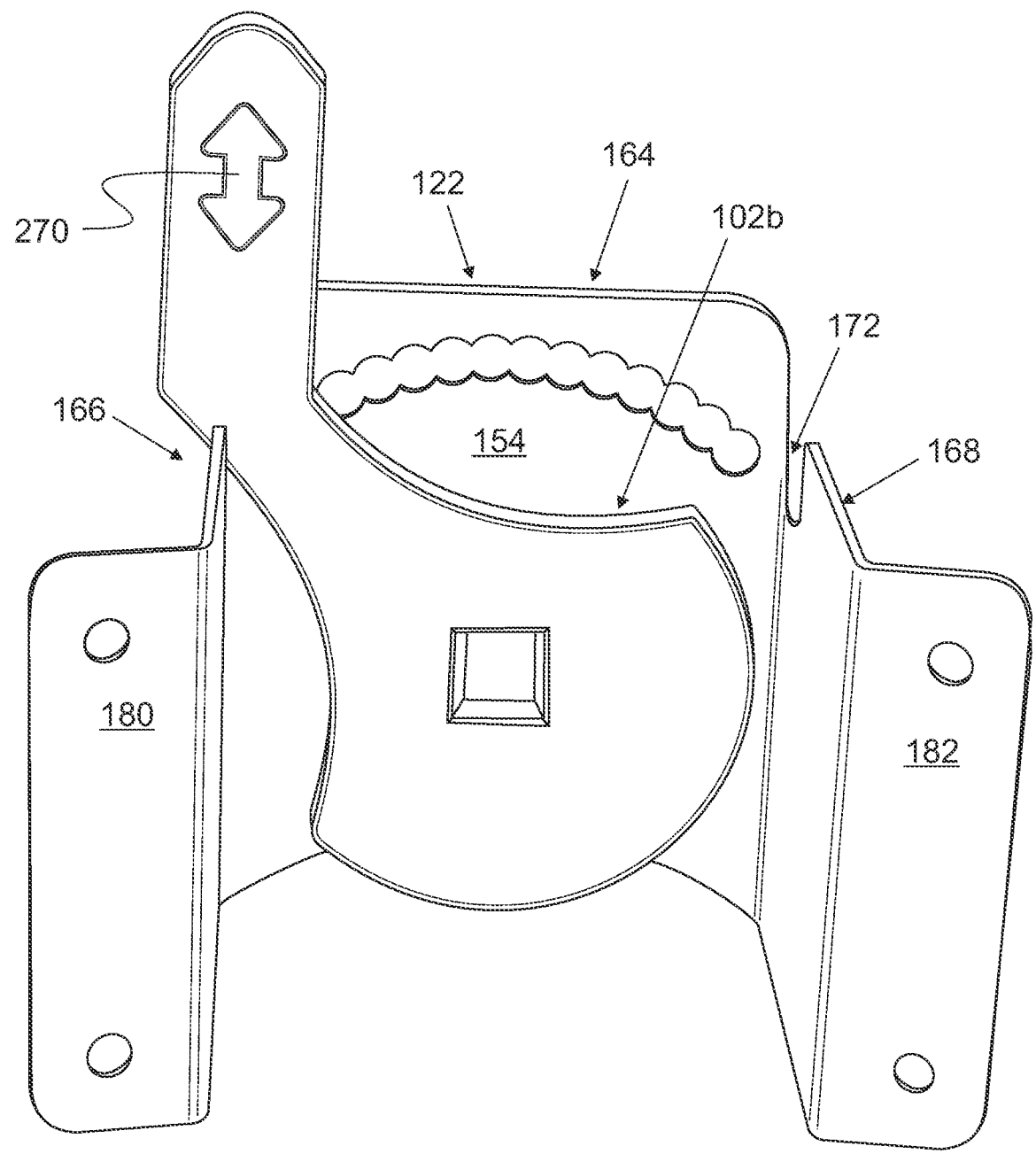

FIGS. 6A-3, 6B-3, 6C-3 are perspective top views of standoff 100b and damper blade 104, and are used to exemplary illustrate the progressive opening of damper blade 104 in the exact corresponding opening positions shown in the perspective front views of FIGS. 6A-1, 6B-1, 6C-1 from a fully closed position (FIG. 6A-3) to a fully open position (FIG. 6C-3). FIGS. 7A to 7C are non-limiting, exemplary back or interior facing side views of standoff 100b in accordance with one or more embodiments of the present invention from a fully closed position (FIG. 7A) to fully open position (FIG. 7C).

FIGS. 8A to 8D are non-limiting, exemplary views of handle 102b in accordance with one or more, embodiments, of the present invention. As illustrated in FIGS. 6A-1 to 8D, handle 102b is comprise of single piece, having a first portion 218 that is oriented (or bent) at an angle 220 (general at 45° as shown by line 222 in FIG. 7B) in relation to a second portion 224.

First portion 218 is angled to be indicative of the position of damper blade 104 orientations as described in relation to FIGS. 6A1- to 6C-3. In other words, the plane of damper blade 104 is generally aligned and oriented with the orientation of first portion 218 of handle 102b. This way, the position of handle 102b will indicate the position of the orientation of damper blade 104 within sleeve 108. Simply stated, the position of first portion 218 of handle 102b reflects or mimics the actual physical position of the orientation of damper blade 104 inside sleeve 108, with arrow-shaped openings 270 of handle 102b reaffirming the same.

When first portion 218 of handle 102b is oriented transverse central longitudinal axis 110 of sleeve 108, damper blade 104 is also oriented transverse central longitudinal axis 110 of sleeve (0° degrees at X-axis). When first portion 218 of handle 102b is oriented at 45° degrees in, relation to central longitudinal axis 110 of sleeve 108, damper blade 104 is also oriented at 45° degrees in relation to central longitudinal axis 110 of sleeve 108. When first portion 218 of handle 102b is oriented parallel central longitudinal axis 110 of sleeve 108, damper blade 104 is also oriented parallel central longitudinal axis 110 of sleeve 108 (90° degrees at Y-axis). Accordingly, angling first portion 218 of handle 102b enables easy reading of damper position within sleeve 108 from far, without having to physical inspect (or have a close-up visual inspection) of damper blade 104 (generally, sleeves 108 are installed above 15 ft or so above ground). Therefore, unlike other conventional regulators, standoff 100b of the present invention is made to mimic the common orientation language within construction industries where transverse orientation of first portion 218 of handle 102b in relation to a longitudinal axis of some conduit or known flow axis or direction connotes closure (no flow) whereas parallel orientation of first portion 218 of handle 102b in relation to longitudinal axis of some conduit or known flow axis or direction connotes open (full flow).

As further illustrated, handle 102b also includes a second portion 224 that has latch-index 152 that latches handle 102b at the desired position while providing indexing information to indicate an angular position of handle 102b. Second portion 224 further includes an attachment section 186 for accommodating an adjustable coupler assembly 124b.

Attachment section 186 includes a first side 196 and a second side 200b. Attachment section 186 has an engagement portion 162b having an elongated hollow portion comprised of a through-hole opening 188 with an internal configuration commensurate with cross-sectional profile of shaft 120 of a damper blade 104.

Engagement portion 162b extends longitudinally (with length shown by arrow 192) through handle 102b, transverse the plane of attachment section 186 of handle 102b, protruding from first side 196 of attachment section 186. The through-hole opening 188 at second side 200b ends at and is flush with second side 200b of attachment section 186 as best shown in FIGS. 7A to 7C and 8C.

Engagement portion 162b is adapted to receive adjustable coupler assembly 124b. Engagement portion 162b has an outer cylindrical configuration that is threaded, and an inner polygonal configuration (shaped to receive polygonal shaft 120).

In this non-limiting, exemplary instance, engagement portion 162b includes a lateral opening 228b for insertion of a fastener 230 in a form of a set screw, and end of which reaches and contacts a side of a shaft 120 for reducing shaft vibrations at the standoff 100b. Moving the set screw from second elongated hollow section 198 (second side 200a of attachment section 186) to first side 196 on engagement portion 162b provides easier access unhindered or unobstructed by bracket 122 for setting and securing the set screw. Accordingly, the location and position of the set-screw opening may be varied.

FIGS. 9A to 9G are non-limiting, exemplary illustrations of a coupler illustrated in FIGS. 6A-1 to 8D in accordance with one or more embodiments of the present invention. As illustrated, coupler 272 has a first side 232 comprised of a grip portion 234 for fastening (or application of torque to) coupler 272, and a first side 236 of an annular base 238. As detailed below, the combined grip portion 234 and annular base 238 forms new and novel washer-nut in accordance with an embodiment of the present invention.

As, further illustrated in FIGS. 9C to 9G, annular base 238 has a second side 240 (or the engagement side) that includes an annular groove 242 that accommodates and houses a first end 244 of biasing mechanism 132 while a second end 246 engages or contacts bracket 122. Proximal and distal annular walls 248 and 260b of annular groove 242 support end 244 of biasing mechanism 132 so to reduce lateral movement (sliding, swaying or tilting) of biasing mechanism 132 in relation to coupler 272 while tightening coupler 272 onto engagement portion 162b. In other words, body of biasing mechanism 132 (a resilient member in a form of spring shown) remains substantially parallel a center longitudinal axis of biasing mechanism 132 during tightening operation, applying a general equal or uniform force onto biasing mechanism 132 through the rotating motion of coupler 272.

As further illustrated, a first inner diameter 250 of coupler 272 includes threading 252 (at grip portion 234), whereas a second inner diameter 256 has a relief-support (or clearance) 254 (at annular base 238), which facilitates easy mounting and fastening of coupler 272. Relief-support 254 does not have threading but instead has sufficient length (depth) 258 to enable partial insertion of engagement portion 162b within coupler 272 prior to fastening coupler 272 onto engagement portion 162. That is, top end of engagement portion 162b (which is threaded 204) passes through relief-support 254 of coupler 272, enabling users to properly balance coupler 272 onto the top end of engagement portion 162b (supported by relief-support 254) while pressing and turning coupler 272 against the exerted force of biasing mechanism 132.

Once the top end of engagement portion 162b passes relief support 254, its threads 204 align with and engage internal threads 252 of coupler 272 due to balance of coupler 272 thereon provided by relief support 254. Accordingly, relief support 254 in combination with annular groove 242 allows biasing mechanism 112 to first be compressed and coupler 272 be balanced onto engagement portion 162b (which results in the alignment of the threading 204 and 252 of engagement portion 162b and, coupler 272), prior to turning (or application of increased torque) onto coupler 272, which would commence exertion of compression force onto basing mechanism 132.

FIGS. 10A to 11D are non-limiting, exemplary illustrations of standoff with a different coupler in accordance with one or more embodiments of the present invention. The standoff 100c illustrated in FIGS. 10A to 11D includes similar corresponding or equivalent components, interconnections, functional, operational, and or cooperative relationships as standoff 100a, 100b, that is shown in FIGS. 1A-1 to 9G, and described above. Therefore, for the sake of brevity, clarity, convenience, and to avoid duplication, the general description of FIGS. 10A to 11D will not repeat every corresponding or equivalent component, interconnections, functional, operational, and or cooperative relationships that has already been described above in relation to standoff 100a, 100b that are shown in FIGS. 1A-1 to 9G but instead, are incorporated by reference herein.

As illustrated in FIGS. 10A to 11D, standoff 100c uses coupler 262 with an annular base 238 that has a second side 240 that includes a distal annularly wall 260b extending from distal periphery 264 of annular base 238, forming an annular cylinder (distal wall 260b). Height 264 of annular cylinder defines a predetermined torque value that is applied to provide a predetermined quantifiable compression force on biasing mechanism 132. That is, once free edge 266 of annular cylinder reach and contact bracket 122 (best shown in FIGS. 10A to 10C), coupler 262 can no longer be turned to be further tightened. Varying height 266 of annular cylinder (distal wall 260b) will vary the amount of turns and hence, the amount of overall torque applied to biasing mechanism 132 and hence, the overall standoff 100c.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Further, the specification is not confined to the disclosed embodiments. Therefore, while exemplary illustrative embodiments of the invention have been described, numerous variations and alternative embodiments will occur to those skilled in the art. For example, the standoff may be comprised of a variety of different materials, non-limiting examples of which may include steel, aluminum, plastic, copper, glass, ceramic, etc. Further, individual components need not be made from the same material. For example, the handle may be made from plastic or copper, but the bracket from aluminum or steel. Use of different materials enables the standoff regulator of the present invention to be used in various specialized settings with stringent requirements such as hospitals, clean rooms, etc. where for example they may require that all materials be composed of aluminum or stainless steel, etc. Such variations and alternate embodiments are contemplated, and can be made without departing from the spirit and scope of the invention.

It should further be noted that throughout the entire disclosure, the labels such as left, right, front, back, top, inside, outside, bottom, forward, reverse, clockwise, counter clockwise, up, down, or other similar terms, such as upper, lower, aft, fore, vertical, horizontal, oblique, proximal, distal, parallel, perpendicular, transverse, longitudinal, etc. have been used for convenience purposes only and are not intended to imply any particular fixed direction, orientation, or position. Instead, they are used to reflect relative locations/positions and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

Further the terms "a" and "an" throughout the disclosure (and in particular, claims) do not denote a limitation of quantity, but rather denote the presence of at least one of the referenced item.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of" or "operational act of" in the claims herein is not intended to invoke the provisions of 35 U.S.C. 112, Paragraph 6.

What is claimed is:

1. A standoff regulator, comprising:
a bracket;
a handle for moving a damper;
the handle is adjustably associated with the bracket, with the handle self-latching in relation to the bracket at an adjusted position;
an adjustable coupler assembly that allows the handle to self-latch at the adjusted position, but adjustably fixed at that position at an adjustable holding strength in relation to the bracket.

2. The standoff regulator as set forth in claim 1, wherein:
the position of the handle indicates a degree of restriction of flow rate of volume of air.

3. The standoff regulator as set forth in claim 1, wherein:
the handle is comprised of a single piece, having:
a first portion that is oriented at an angle in relation to a second portion;
the second portion includes a latch-index that latches the handle at the adjusted position while providing indexing information to indicate an angular position of the handle; and
an attachment section for accommodating the adjustable coupler assembly.

4. The standoff regulator as set forth in claim 3, wherein:
the attachment section includes:
a first side and a second side;
an engagement portion having an elongated hollow portion comprised of a through-hole opening with an internal configuration commensurate with cross-sectional profile of a shaft of the damper;
the elongated hollow portion extends longitudinally through the handle, transverse a longitudinal axis of the handle, protruding from first side of the attachment section;
the elongated hollow portion is adapted to receive the adjustable coupler assembly.

5. The standoff regulator as set forth in claim 3, wherein:
the engagement portion has an outer cylindrical configuration that is threaded, and an inner polygonal configuration.

6. The standoff regulator as set forth in claim 3, wherein:
the engagement portion includes a lateral opening for insertion of a fastener in a form of a set screw, and end of which reaches and contacts a side of a shaft for reducing shaft vibrations;
wherein: the set screw is moved with a movement of the handle.

7. The standoff regulator as set forth in claim 4, wherein:
the damper is oriented aligned with a first portion of handle.

8. The standoff regulator as set forth in claim 3, wherein:
the adjustable coupler assembly is comprised of:
a coupler that has:
a grip portion for fastening the coupler, and an annular base;
the annular base includes an annularly extending walls that protrude from the base;
the engagement side of the annular base includes an annular groove defined by annularly extending walls that accommodates and houses a first end of a biasing mechanism while a second end engages the bracket;
the engagement side includes threading and a relief-support that is not threaded, which facilitates easy mounting and fastening of the coupler.

9. The standoff regulator as set forth in claim 3, wherein:
the adjustable coupler assembly is comprised of:

a coupler that has:
a grip portion for fastening the coupler, and an annular base;
the annular base includes an annularly extending wall that protrude from the base, forming an annular cylinder on an engagement side of the coupler;
the engagement side of the annular base includes an annular groove that accommodates and houses a first end of a biasing mechanism while a second end engages the bracket;
the engagement side includes threading that commences a relief-support that is not threaded, which facilitates easy mounting and fastening of the coupler.

10. A standoff regulator, comprising:
a bracket;
a handle that is adjustably associated with the bracket by an engagement portion, with the handle self-latching in relation to the bracket at an adjusted position;
the handle includes a first portion that is oriented at an angle in relation to a second portion, with the first portion of the handle identical in orientation to an orientation position of a damper; and
an adjustable coupler assembly that allows the handle to self-latch at the adjusted position, but adjustably fixed at that position at an adjustable holding strength in relation to the bracket.

11. The standoff regulator as set forth in claim 10, wherein:
the adjustable coupler assembly is comprised of:
a coupler that has:
a grip portion for fastening the coupler, and an annular base;
an engagement side of the annular base includes an annular groove that accommodates and houses a first end of a biasing mechanism while a second end engages the bracket;
the engagement side includes threading and a relief-support that is not threaded, which facilitate easy mounting and fastening of the coupler.

12. A standoff regulator, comprising:
a handle that is moveably associated with a bracket, with the handle self-latching to the bracket at an adjustable position and at an adjustable holding strength in relation to the bracket;
wherein: the angular orientation of the adjusted position of the handle is identical to an angular orientation of a position of a damper blade and
wherein: the holding strength of the handle at the adjusted position is varied by an application of torque to a coupler, which changes a compression force of a biasing mechanism to adjust the holding strength of the handle at the adjusted position in relation to the bracket.

* * * * *